United States Patent
Masuda

(10) Patent No.: US 10,401,146 B2
(45) Date of Patent: Sep. 3, 2019

(54) INFORMATION PROCESSING DEVICE, INFORMATION PROCESSING METHOD, AND PROGRAM

(71) Applicant: FUJIFILM CORPORATION, Minato-ku, Tokyo (JP)

(72) Inventor: Tomonori Masuda, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/044,524

(22) Filed: Jul. 25, 2018

(65) Prior Publication Data

US 2018/0328718 A1 Nov. 15, 2018

Related U.S. Application Data

(63) Continuation of application No. PCT/JP2016/082145, filed on Oct. 28, 2016.

(30) Foreign Application Priority Data

Feb. 4, 2016 (JP) .................................. 2016-020225

(51) Int. Cl.
G01B 11/02 (2006.01)
H04N 5/232 (2006.01)
(Continued)

(52) U.S. Cl.
CPC .......... *G01B 11/026* (2013.01); *G01B 11/002* (2013.01); *G01S 17/023* (2013.01);
(Continued)

(58) Field of Classification Search
CPC ................ G01B 11/026; G01B 11/002; H04N 5/232127; H04N 5/232121; H04N 5/2254; H04N 5/23229; G01S 17/023
(Continued)

(56) References Cited

U.S. PATENT DOCUMENTS

2006/0017938 A1 1/2006 Ohtomo et al.
2016/0103209 A1 4/2016 Masuda et al.
(Continued)

FOREIGN PATENT DOCUMENTS

JP 2006-003132 A 1/2006
JP 2012-27000 A 2/2012
(Continued)

OTHER PUBLICATIONS

International Search Report issued in International Application No. PCT/JP2016/082145 dated Dec. 27, 2016.
(Continued)

*Primary Examiner* — Roy M Punnoose
(74) *Attorney, Agent, or Firm* — Solaris Intellectual Property Group, PLLC

(57) ABSTRACT

An execution unit executes a derivation process of deriving an imaging position distance, on the basis of a plurality of pixel coordinates which are present in the same planar region as an irradiation position where the directional light is emitted on the real space and which are equal to or more than three pixels specifiable at positions corresponding to each other in respective first and second captured images, irradiation position real space coordinates, a focal length, and dimensions of imaging pixels, in a case where the position of a pixel specified by the irradiation position pixel coordinates is the position of a pixel different from a pixel which is specifiable at positions corresponding to each other in the respective first and second captured images.

15 Claims, 33 Drawing Sheets

(51) Int. Cl.
*G01B 11/00* (2006.01)
*H04N 5/225* (2006.01)
*G01S 17/02* (2006.01)

(52) U.S. Cl.
CPC ....... *H04N 5/2254* (2013.01); *H04N 5/23229* (2013.01); *H04N 5/232121* (2018.08); *H04N 5/232127* (2018.08)

(58) Field of Classification Search
USPC ........................................................ 356/624
See application file for complete search history.

(56) References Cited

U.S. PATENT DOCUMENTS

| | | | |
|---|---|---|---|
| 2016/0189362 A1 | 6/2016 | Evers-Senne et al. | |
| 2018/0180735 A1* | 6/2018 | Masuda | G01S 17/08 |
| 2018/0180736 A1* | 6/2018 | Masuda | G01S 17/08 |
| 2018/0180737 A1* | 6/2018 | Masuda | G01S 17/08 |
| 2018/0203116 A1* | 7/2018 | Sugimoto | G01S 17/10 |
| 2018/0232897 A1* | 8/2018 | Masuda | G09G 5/14 |

FOREIGN PATENT DOCUMENTS

| | | |
|---|---|---|
| JP | 2013-122434 A | 6/2013 |
| WO | 97/06406 A1 | 2/1997 |
| WO | 2014/195000 A1 | 12/2014 |
| WO | 2015/008587 A1 | 1/2015 |

OTHER PUBLICATIONS

Written Opinion of the ISA issued in International Application No. PCT/JP2016/082145 dated Dec. 27, 2016.

* cited by examiner

INFORMATION PROCESSING DEVICE, INFORMATION PROCESSING METHOD, AND PROGRAM

CROSS-REFERENCE TO RELATED APPLICATIONS

This application is a continuation application of International Application No. PCT/JP2016/082145, filed Oct. 28, 2016, the disclosure of which is incorporated herein by reference in its entirety. Further, this application claims priority from Japanese Patent Application No. 2016-020225, filed Feb. 4, 2016, the disclosure of which is incorporated herein by reference in its entirety.

BACKGROUND

1. Technical Field

The technique of the present disclosure relates to an information processing device, an information processing method, and a program.

2. Related Art

JP2012-27000A discloses an image measurement processing device that derives three-dimensional positional coordinates of a feature point on an object to be measured by a single camera. In the image measurement processing device disclosed in JP2012-27000A, three-dimensional positional coordinates are derived by the following steps 1 to 5.

In step 1, the image measurement processing device stores an internal standardization element of the camera and the real coordinates of at least four feature points of the object to be measured in advance. In step 2, the image measurement processing device fetches an image which is captured by the camera and includes the four feature points within a field of view of the camera. In step 3, the image measurement processing device corrects a distortion on the image on the basis of the internal standardization element with respect to camera view coordinates of the feature point on the fetched image. In step 4, the image measurement processing device derives a camera position and a camera angle in a coordinate system based on the object to be measured during imaging from the camera view coordinates and the real coordinates of the feature point. In step 5, the image measurement processing device executes coordinate conversion for setting the derived camera position and camera angle to be a reference position and a reference angle to derive three-dimensional coordinates of the feature point in a camera-based coordinate system.

JP2013-122434A discloses a three-dimensional position measurement device that includes a monocular imaging device to which irradiation means including an irradiation light source, emitting a laser beam, is fixed.

The three-dimensional position measurement device disclosed in JP2013-122434A captures an image of a calibration plate as a subject by moving the calibration plate while irradiating the calibration plate with a laser beam or captures an image of the calibration plate as a subject from two imaging positions by moving an imaging device. In addition, the three-dimensional position measurement device disclosed in JP2013-122434A calculates three-dimensional coordinates of an irradiation position of a laser beam in each image from the captured images, and calculates a direction vector or a plane equation of the laser beam. The three-dimensional position measurement device disclosed in JP2013-122434A calculates three-dimensional coordinates of an object to be irradiated with a laser beam by using the calculated direction vector or plane equation.

WO97/06406A discloses a distance measurement device that measures a distance from a reference surface to an irradiation position of a laser beam. The distance measurement device disclosed in WO97/06406A generates an edge image of a captured image, focusing on the occurrence of an error in measurement in accordance with features of the surface of an object to be measured, and specifies a coordinate position indicating the contour of the object from coordinate positions of elements in a space on the basis of the generated edge image.

SUMMARY

However, all of the techniques disclosed in JP2012-27000A, JP2013-122434A, and WO97/06406A are techniques devised on the assumption that a specifiable feature point is present within a captured image obtained by imaging. In a case where imaging is performed on a subject that does not include a specifiable feature point, it is possible to derive three-dimensional coordinates. Meanwhile, the "three-dimensional coordinates" as mentioned herein refers to three-dimensional coordinates for specifying a position designated in the subject.

As another method of deriving three-dimensional coordinates, a method is considered in which three-dimensional coordinates are derived on the basis of a first captured image, a second captured image, and an imaging position distance by a distance measurement device having a function of performing distance measurement and imaging. Meanwhile, the distance measurement refers to the measurement of a distance to a subject based on a reciprocating time of a laser beam emitted toward the subject serving as an object to be measured. In addition, the first captured image refers to an image obtained by imaging the subject from a first imaging position, and the second captured image refers to an image obtained by imaging a subject, including the subject imaged from the first imaging position, from a second imaging position different from the first imaging position. In addition, the imaging position distance refers to a distance between the first imaging position and the second imaging position.

Incidentally, in a case where three-dimensional coordinates are derived on the basis of the first captured image, the second captured image, and the imaging position distance, it is necessary to derive the imaging position distance with a high level of accuracy. In a case where the subject includes a specifiable feature point, distance measurement is performed by setting the specifiable feature point to be an object to be measured, and it is possible to derive the imaging position distance when the subject including the specifiable feature point can be imaged from each of different imaging positions.

However, the specifiable feature point is not necessarily included in the subject. Even when the specifiable feature point is included in the subject, it is considered that the real irradiation position of a laser beam is not consistent with the specifiable feature point in the subject due to the exchange of parts in the distance measurement device, the change of an angle of view, or the like. On contrary, it is also considered that the real irradiation position of the laser beam is consistent with the specifiable feature point in the subject. When the imaging position distance is derived without considering the irradiation position of the laser beam regardless of a possibility that such a different condition occurs, there is a concern that the imaging position distance without accuracy is provided for the derivation of three-dimensional coordinates.

One embodiment of the invention provides an information processing device, an information processing method, and a program which are capable of deriving an imaging position distance with a high level of accuracy, as compared to a case where the irradiation position of the directional light is not considered.

An information processing device of a first aspect of the invention includes an acquisition unit that acquires a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light, a derivation unit that derives irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the distance acquired by the acquisition unit, and an execution unit that executes a derivation process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the respective first and second captured images, the irradiation position real space coordinates, and a focal length of an imaging lens used in the imaging of the subject, and dimensions of imaging pixels included in an imaging pixel group for imaging the subject, in a case of a position unspecifiable state where the position of the pixel specified by the irradiation position pixel coordinates is a position of a pixel different from a pixel which is specifiable at positions corresponding to each other in the respective first and second captured images.

Therefore, according to the information processing device of the first aspect of the invention, it is possible to derive the imaging position distance with a high level of accuracy, as compared to a case where the irradiation position of the directional light is not considered.

In the information processing device of a second aspect of the invention according to the information processing device of the first aspect of the invention, the execution unit further executes a position unspecifiable state notification process of giving notice of being the position unspecifiable state in a case of the position unspecifiable state.

Therefore, according to the information processing device of the second aspect of the invention, it is possible to make a user recognize that the position of the pixel specified by the irradiation position pixel coordinates is the position of a pixel different from a pixel which is specifiable at positions corresponding to each other in the respective first and second captured images.

In the information processing device of a third aspect of the invention according to the information processing device of the first or second aspect of the invention, the execution unit executes a process of deriving designated pixel real space coordinates which are coordinates on the real space corresponding to a position of a designated pixel which is designated as a pixel corresponding to a position on the real space in each of the first and second captured images, on the basis of the imaging position distance.

Therefore, according to the information processing device of the third aspect of the invention, it is possible to derive the designated pixel real space coordinates with a high level of accuracy, as compared to a case where the imaging position distance is derived without considering the irradiation position of the directional light.

In the information processing device of a fourth aspect of the invention according to the information processing device of the third aspect of the invention, the designated pixel real space coordinates are specified on the basis of the imaging position distance, designated pixel coordinates for specifying a pixel which is specifiable as the designated pixel at positions corresponding to each other in the respective first and second captured images, the focal length, and the dimensions.

Therefore, according to the information processing device of the fourth aspect of the invention, it is possible to derive the designated pixel real space coordinates with a high level of accuracy, as compared to a case where the designated pixel real space coordinates are not specified on the basis of the imaging position distance, the designated pixel coordinates, the focal length of the imaging lens, and the dimensions of the imaging element.

In the information processing device of a fifth aspect of the invention according to the information processing device of any one of the first to fourth aspects of the invention, the derivation process is a process of deriving a direction of a plane specified by a plane equation indicating the plane including coordinates on the real space which correspond to the plurality of pixel coordinates on the basis of the plurality of pixel coordinates, the focal length, and the dimensions, deciding the plane equation on the basis of the derived direction and the irradiation position real space coordinates, and deriving the imaging position distance on the basis of the decided plane equation, the plurality of pixel coordinates, the focal length, and the dimensions.

Therefore, according to the information processing device of the fifth aspect of the invention, it is possible to derive the imaging position distance in the derivation process with a high level of accuracy, as compared to a case where the imaging position distance is derived without using the plane equation in the derivation process.

An information processing device of a sixth aspect of the invention includes an acquisition unit that acquires a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light, a derivation unit that derives irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the distance acquired by the acquisition unit, and an execution unit that executes a derivation process of deriving an imaging position distance on the basis of the irradiation position real space coordinates, the irradiation position pixel coordinates, a focal length of an imaging lens used in the imaging of the subject, and dimensions of imaging pixels included in an imaging pixel group for imaging the subject, in a case of a position specifiable state where the position of the pixel specified by the irradiation position pixel coordinates is a position of a pixel which is specifiable at positions corresponding to each other in the respective first and second captured images.

Therefore, according to the information processing device of the sixth aspect of the invention, it is possible to derive the imaging position distance with a high level of accuracy, as compared to a case where the imaging position distance is derived without considering the irradiation position of the directional light.

In the information processing device of a seventh aspect of the invention according to the information processing device of the sixth aspect of the invention, the execution unit executes a derivation process using a plurality of pixels, the derivation process being a process of deriving the imaging position distance on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the respective first and second captured images, the irradiation position real space coordinates, the focal length, and the dimensions, in a case of a position unspecifiable state where the position of the pixel specified by the irradiation position pixel coordinates is a position of a pixel different from a pixel which is specifiable at positions corresponding to each other in the respective first and second captured images, and the derivation process is a process of deriving the imaging position distance on the basis of plural parameters smaller than the number of parameters used for the derivation of the imaging position distance by the derivation process using a plurality of pixels.

Therefore, according to the information processing device of the seventh aspect of the invention, it is possible to derive the imaging position distance with a low load, as compared to a case where the imaging position distance is derived by the derivation process using a plurality of pixels at all times.

In the information processing device of an eighth aspect of the invention according to the information processing device of the sixth or seventh aspect of the invention, the execution unit further executes a position specifiable state notification process of giving notice of being the position specifiable state in a case of the position specifiable state.

Therefore, according to the information processing device of the eighth aspect of the invention, it is possible to make the user recognize that the position of the pixel specified by the irradiation position pixel coordinates is the position of a pixel which is specifiable at positions corresponding to each other in the respective first and second captured images.

The information processing device of a ninth aspect of the invention according to the information processing device of any one of the first to eighth aspects of the invention further includes a measurement unit that measures the distance by emitting the directional light and receiving the reflected light, in which the acquisition unit acquires the distance measured by the measurement unit.

Therefore, according to the information processing device of the ninth aspect of the invention, it is possible to use the distance measured by the measurement unit for the derivation of the irradiation position coordinates and the irradiation position pixel coordinates.

The information processing device of a tenth aspect of the invention according to the information processing device of any one of the first to ninth aspects of the invention further includes an imaging unit that images the subject, in which the acquisition unit that acquires the first captured image obtained by imaging the subject by the imaging unit from the first imaging position, and the second captured image obtained by imaging the subject by the imaging unit from the second imaging position.

Therefore, according to the information processing device of the tenth aspect of the invention, it is possible to use the first captured image and the second captured image, which are obtained by the imaging of the imaging unit, for the derivation of the imaging position distance.

The information processing device of an eleventh aspect of the invention according to the information processing device of any one of the first to tenth aspects of the invention further includes a control unit that performs control for displaying derivation results obtained by the execution unit on a display unit.

Therefore, according to the information processing device of the eleventh aspect of the invention, it is possible to make the user easily recognize the derivation results obtained by the execution unit, as compared to a case where the derivation results obtained by the execution unit are not displayed on the display unit.

An information processing method of a twelfth aspect of the invention includes acquiring a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light, deriving irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the acquired distance, and executing a derivation process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the respective first and second captured images, the irradiation position real space coordinates, a focal length of an imaging lens used in the imaging of the subject, and dimensions of imaging pixels included in an imaging pixel group for imaging the subject, in a case of a position unspecifiable state where the position of the pixel specified by the irradiation position pixel coordinates is a position of a pixel different from a pixel which is specifiable at positions corresponding to each other in the respective first and second captured images.

Therefore, according to the information processing method of the twelfth aspect of the invention, it is possible to derive the imaging position distance with a high level of accuracy, as compared to a case where the irradiation position of the directional light is not considered.

An information processing method of a thirteenth aspect of the invention includes acquiring a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light, deriving irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the acquired distance, and executing a derivation process of deriving an imaging position distance on the basis of the irradiation position real space coordinates, the irradiation position pixel coordinates, a focal length of an imaging lens used in the imaging of the subject, and dimensions of imaging pixels included in an imaging pixel group for imaging the subject, in a case of a position specifiable state where the position of the pixel specified by the irradiation position pixel coordinates is a position of a pixel which is specifiable at positions corresponding to each other in the respective first and second captured images.

Therefore, according to the information processing method of the thirteenth aspect of the invention, it is possible to derive the imaging position distance with a high level of accuracy, as compared to a case where the irradiation position of the directional light is not considered.

A program of a fourteenth aspect of the invention causes a computer to execute a process including acquiring a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light, deriving irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the acquired distance, and executing a derivation process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the respective first and second captured images, the irradiation position real space coordinates, a focal length of an imaging lens used in the imaging of the subject, and dimensions of imaging pixels included in an imaging pixel group for imaging the subject, in a case of a position unspecifiable state where the position of the pixel specified by the irradiation position pixel coordinates is a position of a pixel different from a pixel which is specifiable at positions corresponding to each other in the respective first and second captured images.

Therefore, according to the program of the fourteenth aspect of the invention, it is possible to derive the imaging position distance with a high level of accuracy, as compared to a case where the irradiation position of the directional light is not considered.

A program of a fifteenth aspect of the invention causes a computer to execute a process including acquiring a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light, deriving irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the acquired distance, and executing a derivation process of deriving an imaging position distance on the basis of the irradiation position real space coordinates, the irradiation position pixel coordinates, a focal length of an imaging lens used in the imaging of the subject, and dimensions of imaging pixels included in an imaging pixel group for imaging the subject, in a case of a position specifiable state where the position of the pixel specified by the irradiation position pixel coordinates is a position of a pixel which is specifiable at positions corresponding to each other in the respective first and second captured images.

Therefore, according to the program of the fifteenth aspect of the invention, it is possible to derive the imaging position distance with a high level of accuracy, as compared to a case where the irradiation position of the directional light is not considered.

According to one embodiment of the invention, it is possible to obtain an effect that an imaging position distance can be derived with a high level of accuracy, as compared to a case where the irradiation position of the directional light is not considered.

BRIEF DESCRIPTION OF THE DRAWINGS

Exemplary embodiments according to the technique of the present disclosure will be described in detail based on the following figures, wherein.

DESCRIPTION

Hereinafter, an example of an embodiment according to a technique of this disclosure will be described with reference to the accompanying drawings. Meanwhile, in this embodiment, for convenience of description, a distance from a distance measurement device 10A to a subject to be measured will be also simply referred to as a "distance" or a "distance to a subject". In this embodiment, an angle of view with respect to a subject will be also simply referred to as an "angle of view".

First Embodiment

Figure 1:
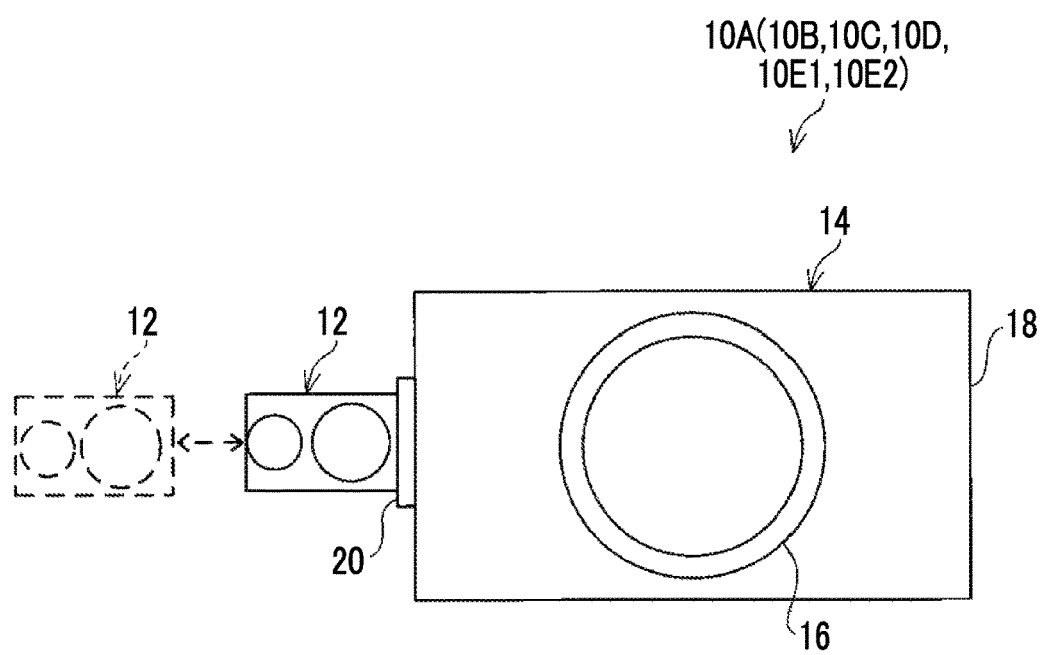
FIG. 1 is a front view illustrating an example of the appearance of a distance measurement device according to first to fifth embodiments.

As illustrated in FIG. 1 as an example, the distance measurement device 10A which is an example of an information processing device according to the technique of this disclosure includes a distance measurement unit 12 and an imaging device 14. Meanwhile, in this embodiment, the distance measurement unit 12 and a distance measurement control unit 68 to be described later (see FIG. 2) are examples of a measurement unit according to the technique of this disclosure, and the imaging device 14 is an example of an imaging unit according to the technique of this disclosure.

The imaging device 14 includes a lens unit 16 and an imaging device main body 18, and the lens unit 16 is detachably attached to the imaging device main body 18.

A hot shoe (Hot Shoe) 20 is provided on the left surface of the imaging device main body 18 in a front view, and the distance measurement unit 12 is detachably attached to the hot shoe 20.

The distance measurement device 10A has a distance measurement system function of emitting a laser beam for distance measurement to the distance measurement unit 12 to perform distance measurement and an imaging system function of causing the imaging device 14 to image a subject to obtain a captured image. Meanwhile, hereinafter, a captured image will be also simply referred to as an "image". In addition, hereinafter, for convenience of description, a description will be given on the assumption that the height of an optical axis L1 (see FIG. 2) of a laser beam emitted from the distance measurement unit 12 is the same as the height of an optical axis L2 (see FIG. 2) of the lens unit 16 in the vertical direction.

The distance measurement device 10A operates the distance measurement system function to perform a measurement sequence (see FIG. 3) once in accordance with one instruction, and one distance is finally output by the measurement sequence being performed once.

The distance measurement device 10A has a still image imaging mode and a movie imaging mode as an operation mode of the imaging system function. The still image imaging mode is an operation mode for capturing a still image, and the movie imaging mode is an operation mode for capturing a moving image. The still image imaging mode and the movie imaging mode are selectively set in accordance with a user's instruction.

Figure 2:
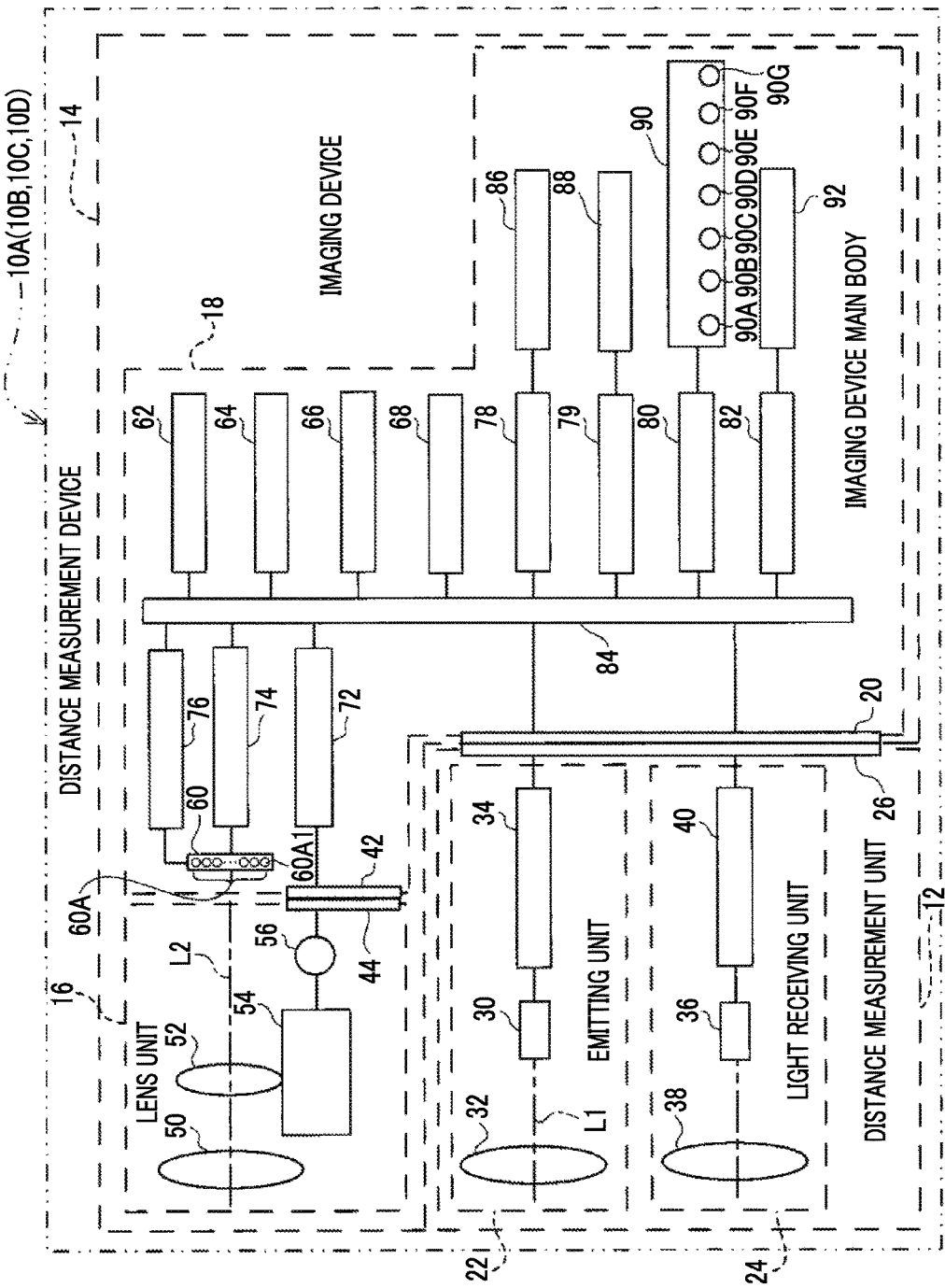
FIG. 2 is a block diagram illustrating an example of a hardware configuration of the distance measurement device according to the first to fourth embodiments.

As illustrated in FIG. 2 as an example, the distance measurement unit 12 includes an emitting unit 22, a light receiving unit 24, and a connector 26.

The connector 26 can be connected to the hot shoe 20, and the distance measurement unit 12 is operated under the control of the imaging device main body 18 in a state where the connector 26 is connected to the hot shoe 20.

The emitting unit 22 includes a Laser Diode (LD) 30, a condensing lens (not shown), an objective lens 32, and an LD driver 34.

The condensing lens and the objective lens 32 are provided along the optical axis L1 of a laser beam emitted by the LD 30, and are disposed in this order along the optical axis L1 from the LD 30 side.

The LD 30 emits a laser beam for distance measurement which is an example of a directional light according to the technique of this disclosure. The laser beam emitted by the LD 30 is a colored laser beam, and an irradiation position of the laser beam is visually recognized on the real space and is also visually recognized from a captured image obtained by the imaging device 14, for example, within a range of approximately several meters from the emitting unit 22.

The condensing lens condenses a laser beam emitted by the LD 30, and transmits the condensed laser beam. The objective lens 32 faces a subject, and emits the laser beam passing through the condensing lens to the subject.

The LD driver 34 is connected to the connector 26 and the LD 30, and drives the LD 30 in accordance with an instruction of the imaging device main body 18 to emit a laser beam.

The light receiving unit 24 includes a Photo Diode (PD) 36, an objective lens 38, and a light receiving signal processing circuit 40. The objective lens 38 is disposed on a light receiving surface side of the PD 36, and a reflected laser beam which is a laser beam emitted by the emitting unit 22 and reflected from the subject is incident on the objective lens 38. The objective lens 38 transmits the reflected laser beam and guides the reflected laser beam to the light receiving surface of the PD 36. The PD 36 receives the reflected laser beam having passed through the objective lens 38, and outputs an analog signal based on the amount of light received, as a light receiving signal.

The light receiving signal processing circuit 40 is connected to the connector 26 and the PD 36, amplifies the light receiving signal, which is input from the PD 36, by an amplifier (not shown), and performs Analog/Digital (A/D) conversion on the amplified light receiving signal. The light receiving signal processing circuit 40 outputs the light receiving signal digitalized by the A/D conversion to the imaging device main body 18.

The imaging device 14 includes mounts 42 and 44. The mount 42 is provided in the imaging device main body 18, and the mount 44 is provided in the lens unit 16. The lens unit 16 is exchangeably mounted on the imaging device main body 18 by the mount 44 being coupled to the mount 42.

The lens unit 16 includes an imaging lens 50, a zoom lens 52, a zoom lens moving mechanism 54, and a motor 56.

Subject light which is light reflected from the subject is incident on the imaging lens 50. The imaging lens 50 transmits the subject light and guides the subject light to the zoom lens 52.

The zoom lens 52 is attached to the zoom lens moving mechanism 54 so as to be slidable with respect to the optical axis L2. In addition, the motor 56 is connected to the zoom lens moving mechanism 54, and the zoom lens moving mechanism 54 receives the power of the motor 56 to make the zoom lens 52 slide along the direction of the optical axis L2.

The motor 56 is connected to the imaging device main body 18 through the mounts 42 and 44, and driving is controlled in accordance with a command from the imaging device main body 18. Meanwhile, in this embodiment, a stepping motor is applied as an example of the motor 56. Therefore, the motor 56 is operated in synchronization with a pulse power on the basis of a command from the imaging device main body 18.

The imaging device main body 18 includes an imaging element 60, a main control unit 62, an image memory 64, an image processing unit 66, a distance measurement control unit 68, a motor driver 72, an imaging element driver 74, an image signal processing circuit 76, and a display control unit 78. In addition, the imaging device main body 18 includes a touch panel interface (I/F) 79, a reception I/F 80, and a media I/F 82.

The main control unit 62, the image memory 64, the image processing unit 66, the distance measurement control unit 68, the motor driver 72, the imaging element driver 74, the image signal processing circuit 76, and the display control unit 78 are connected to a bus line 84. In addition, the touch panel I/F 79, the reception I/F 80, and the media I/F 82 are also connected to the bus line 84.

The imaging element 60 is a Complementary Metal Oxide Semiconductor (CMOS) type image sensor, and includes color filters (not shown). The color filters include a G filter corresponding to green (G), an R filter corresponding to red (R), and a B filter corresponding to blue (B) which most contribute to the obtainment of a brightness signal. The imaging element 60 includes an imaging pixel group 60A including a plurality of imaging pixels 60A1 arranged in a matrix. Any one filter of the R filter, the G filter, and the B filter included in the color filters is allocated to each of the imaging pixels 60A1, and the imaging pixel group 60A receives the subject light to image the subject.

That is, the subject light having passed through the zoom lens 52 is imaged on an imaging surface which is the light receiving surface of the imaging element 60, and charge based on the amount of subject light received is accumulated in the imaging pixels 60A1. The imaging element 60 outputs the charge accumulated in the imaging pixels 60A1 as an image signal indicating an image equivalent to a subject image which is obtained by imaging the subject light on the imaging surface.

The main control unit 62 controls the entire distance measurement device 10A through the bus line 84.

The motor driver 72 is connected to the motor 56 through the mounts 42 and 44, and controls the motor 56 in accordance with an instruction of the main control unit 62.

The imaging device 14 has a viewing angle changing function. The viewing angle changing function is a function of changing an angle of view by moving the zoom lens 52, and is realized by the zoom lens 52, the zoom lens moving mechanism 54, the motor 56, the motor driver 72, and the main control unit 62 in this embodiment. Meanwhile, in this embodiment, an optical viewing angle changing function of the zoom lens 52 is described. However, the technique of this disclosure is not limited thereto, an electronic viewing angle changing function not using the zoom lens 52 may be used.

The imaging element driver 74 is connected to the imaging element 60, and provides a driving pulse to the imaging element 60 under the control of the main control unit 62. The imaging pixels 60A1 included in the imaging pixel group 60A are driven in accordance with the driving pulse supplied to the imaging element 60 by the imaging element driver 74.

The image signal processing circuit 76 is connected to the imaging element 60, and reads out an image signal for one frame from the imaging element 60 for each imaging pixel 60A1 under the control of the main control unit 62. The image signal processing circuit 76 performs various processing, such as correlative double sampling processing, automatic gain control, and A/D conversion, on the read-out image signal. The image signal processing circuit 76 outputs an image signal, which is digitalized by performing various processing on the image signal, to the image memory 64 for each frame at a specific frame rate (for example, several tens of frames per second) which is specified by a clock signal supplied from the main control unit 62. The image memory 64 temporarily holds the image signal which is input from the image signal processing circuit 76.

The imaging device main body 18 includes a display unit 86, a touch panel 88, a reception device 90, and a memory card 92.

The display unit 86 is connected to the display control unit 78, and displays various information under the control of the display control unit 78. The display unit 86 is realized by, for example, a Liquid Crystal Display (LCD).

The touch panel 88 which is an example of a reception unit according to the technique of this disclosure is superimposed on a display screen of the display unit 86, and receives a touch of a user's finger or an indicator such as a touch pen. The touch panel 88 is connected to the touch panel I/F 79, and outputs positional information indicating a position touched by the indicator to the touch panel I/F 79. The touch panel I/F 79 operates the touch panel 88 in accordance with an instruction of the main control unit 62, and outputs the positional information, which is input from the touch panel 88, to the main control unit 62. Meanwhile, in this embodiment, the touch panel 88 is described as an example of the reception unit according to the technique of this disclosure, but the invention is not limited thereto. A mouse (not shown) used by being connected to the distance measurement device 10A may be applied instead of the touch panel 88, or the touch panel 88 and the mouse may be used in combination.

The reception device 90 includes a measurement imaging button 90A, an imaging button 90B, an imaging system operation mode switching button 90C, a wide angle instruction button 90D, and a telephoto instruction button 90E. In addition, the reception device 90 also includes an imaging position distance derivation button 90F, a three-dimensional coordinate derivation button 90Q and the like, and receives the user's various instructions. The reception device 90 is connected to the reception I/F 80, and the reception I/F 80 outputs an instruction content signal indicating contents of an instruction received by the reception device 90 to the main control unit 62.

The measurement imaging button 90A is a pressing type button that receives an instruction for starting measurement and imaging. The imaging button 90B is a pressing type button that receives an instruction for starting imaging. The imaging system operation mode switching button 90C is a pressing type button that receives an instruction for switching between a still image imaging mode and a movie imaging mode.

The wide angle instruction button 90D is a pressing type button that receives an instruction for setting an angle of view to be a wide angle, and the amount of change of the angle of view to the wide angle side is determined depending on a pressing time for which the pressing of the wide angle instruction button 90D is continuously performed within an allowable range.

The telephoto instruction button 90E is a pressing type button that receives an instruction for setting an angle of view to be at a telephoto side, the amount of change of the angle of view to the telephoto side is determined depending on a pressing time for which the pressing of the telephoto instruction button 90E is continuously performed within an allowable range.

The imaging position distance derivation button 90F is a pressing type button that receives an instruction for starting an imaging position distance derivation process to be described later. The three-dimensional coordinate derivation button 90G is a pressing type button that receives an instruction for starting an imaging position distance derivation process to be described later and a three-dimensional coordinate derivation process to be described later.

Meanwhile, hereinafter, for convenience of description, the measurement imaging button 90A and the imaging button 90B will be referred to as a "release button" in a case where it is not necessary to give a description by distinguishing between the buttons. In addition, hereinafter, for convenience of description, the wide angle instruction button 90D and the telephoto instruction button 90E will be referred to as an "angle of view instruction button" in a case where it is not necessary to give a description by distinguishing between the buttons.

Meanwhile, in the distance measurement device 10A according to this embodiment, a manual focus mode and an autofocus mode are selectively set in accordance with the user's instruction through the reception device 90. The release button receives two-stage pressing operations of an imaging preparation instruction state and an imaging instruction state. The imaging preparation instruction state refers to, for example, a state where the release button is pressed to an intermediate position (half pressing position) from a waiting position, and the imaging instruction state refers to a state where the release button is pressed to a final pressing position (full pressing position) beyond the intermediate position. Meanwhile, hereinafter, for convenience of description, the "state where the release button is pressed to the half pressing position from the waiting position" will be referred to as a "half pressing state", and the "state where the release button is pressed to the full pressing position from the waiting position" will be referred to as a "full pressing state".

In the autofocus mode, the adjustment of imaging conditions is performed by the release button being set to be in a half pressing state. Thereafter, when the release button is subsequently set to be in a full pressing state, the actual exposure is performed. That is, after exposure adjustment is performed by the operation of an Automatic Exposure (AE) function by the release button being set to be in a half pressing state prior to the actual exposure, focus adjustment is performed by the operation of an Auto-Focus (AF) function, and the actual exposure is performed when the release button is set to be in a full pressing state.

Here, the actual exposure refers to exposure performed to obtain a still image file to be described later. In this embodiment, the exposure means exposure performed to obtain a live view image to be described later and exposure performed to obtain a moving image file to be described later, in addition to the actual exposure. Hereinafter, for convenience of description, the exposures will be simply referred to as "exposure" in a case where it is not necessary to give a description by distinguishing between the exposures.

Meanwhile, in this embodiment, the main control unit 62 performs exposure adjustment based on an AE function and focus adjustment based on an AF function. In this embodiment, a case where the exposure adjustment and the focus adjustment are performed is described. However, the technique of this disclosure is not limited thereto, and the exposure adjustment or the focus adjustment may be performed.

The image processing unit 66 acquires an image signal for each frame from the image memory 64 at a specific frame rate, and performs various processing, such as gamma correction, brightness color difference conversion, and compression processing, on the acquired image signal.

The image processing unit 66 outputs the image signal, which is obtained by performing various processing, to the display control unit 78 for each frame at a specific frame rate. In addition, the image processing unit 66 outputs the image signal, which is obtained by performing various processing, to the main control unit 62 in accordance with a request of the main control unit 62.

The display control unit 78 outputs the image signal, which is input from the image processing unit 66, to the display unit 86 for each frame at a specific frame rate under the control of the main control unit 62.

The display unit 86 displays an image, character information, and the like. The display unit 86 displays an image shown by the image signal, which is input from the display control unit 78 at a specific frame rate, as a live view image. The live view image is a consecutive frame image which is obtained by consecutive imaging, and is also referred to as a through-image. In addition, the display unit 86 also displays a still image which is a single frame image obtained by performing imaging using a single frame. Further, the display unit 86 also displays a reproduced image, a menu screen, and the like, in addition to the live view image.

Meanwhile, in this embodiment, the image processing unit 66 and the display control unit 78 are realized by an Application Specific Integrated Circuit (ASIC), but the technique of this disclosure is not limited thereto. For example, each of the image processing unit 66 and the display control unit 78 may be realized by a Field-Programmable Gate Array (FPGA). In addition, the image processing unit 66 may be realized by a computer including a Central Processing Unit (CPU), a Read Only Memory (ROM), and a Random Access Memory (RAM). In addition, the display control unit 78 may also be realized by a computer including a CPU, a ROM, and a RAM. Further, each of the image processing unit 66 and the display control unit 78 may be realized by a combination of a hardware configuration and a software configuration.

The main control unit 62 controls the imaging element driver 74 to cause the imaging element 60 to perform exposure for each frame in a case where an instruction for capturing a still image is received by the release button under a still image imaging mode. The main control unit 62 acquires an image signal, which is obtained by performing the exposure for each frame, from the image processing unit 66 and performs compression processing on the acquired image signal to generate a still image file having a specific still image format. Meanwhile, here, the specific still image format refers to, for example, Joint Photographic Experts Group (JPEG).

The main control unit 62 acquires an image signal, which is output to the display control unit 78 as a signal for a live view image by the image processing unit 66, for each frame at a specific frame rate in a case where an instruction for capturing a moving image is received by the release button under a movie imaging mode. The main control unit 62 performs compression processing on the image signal acquired from the image processing unit 66 to generate a moving image file having a specific moving image format. Meanwhile, here, the specific moving image format refers to, for example, Moving Picture Experts Group (MPEG). Meanwhile, hereinafter, for convenience of description, the still image file and the moving image file will be referred to as an image file in a case where it is not necessary to give a description by distinguishing between the image files.

The media I/F 82 is connected to the memory card 92, and performs the recording and read-out of the image file on the memory card 92 under the control of the main control unit 62. Meanwhile, the image file which is read out from the memory card 92 by the media I/F 82 is subjected to extension processing by the main control unit 62 to be displayed on the display unit 86 as a reproduced image.

Meanwhile, the main control unit 62 stores distance information, which is input from the distance measurement control unit 68, in the memory card 92 through the media I/F 82 in association with the image file. The distance information is read out together with the image file by the main control unit 62 from the memory card 92 through the media I/F 82, and a distance indicated by the read-out distance information is displayed on the display unit 86 together with the reproduced image based on the associated image file.

The distance measurement control unit 68 controls the distance measurement unit 12 under the control of the main control unit 62. Meanwhile, in this embodiment, the distance measurement control unit 68 is realized by an ASIC, but the technique of this disclosure is not limited thereto. For example, the distance measurement control unit 68 may be realized by a FPGA. In addition, the distance measurement control unit 68 may be realized by a computer including a CPU, a ROM, and a RAM. Further, the distance measurement control unit 68 may be realized by a combination of a hardware configuration and a software configuration.

The hot shoe 20 is connected to the bus line 84, and the distance measurement control unit 68 controls the LD driver 34 to control the emission of a laser beam by the LD 30 under the control of the main control unit 62 and acquires a light receiving signal from the light receiving signal processing circuit 40. The distance measurement control unit 68 derives a distance to the subject on the basis of a timing when the laser beam is emitted and a timing when the light receiving signal is acquired, and outputs distance information indicating the derived distance to the main control unit 62.

Here, the measurement of a distance to the subject by the distance measurement control unit 68 will be described in more detail.

Figure 3:
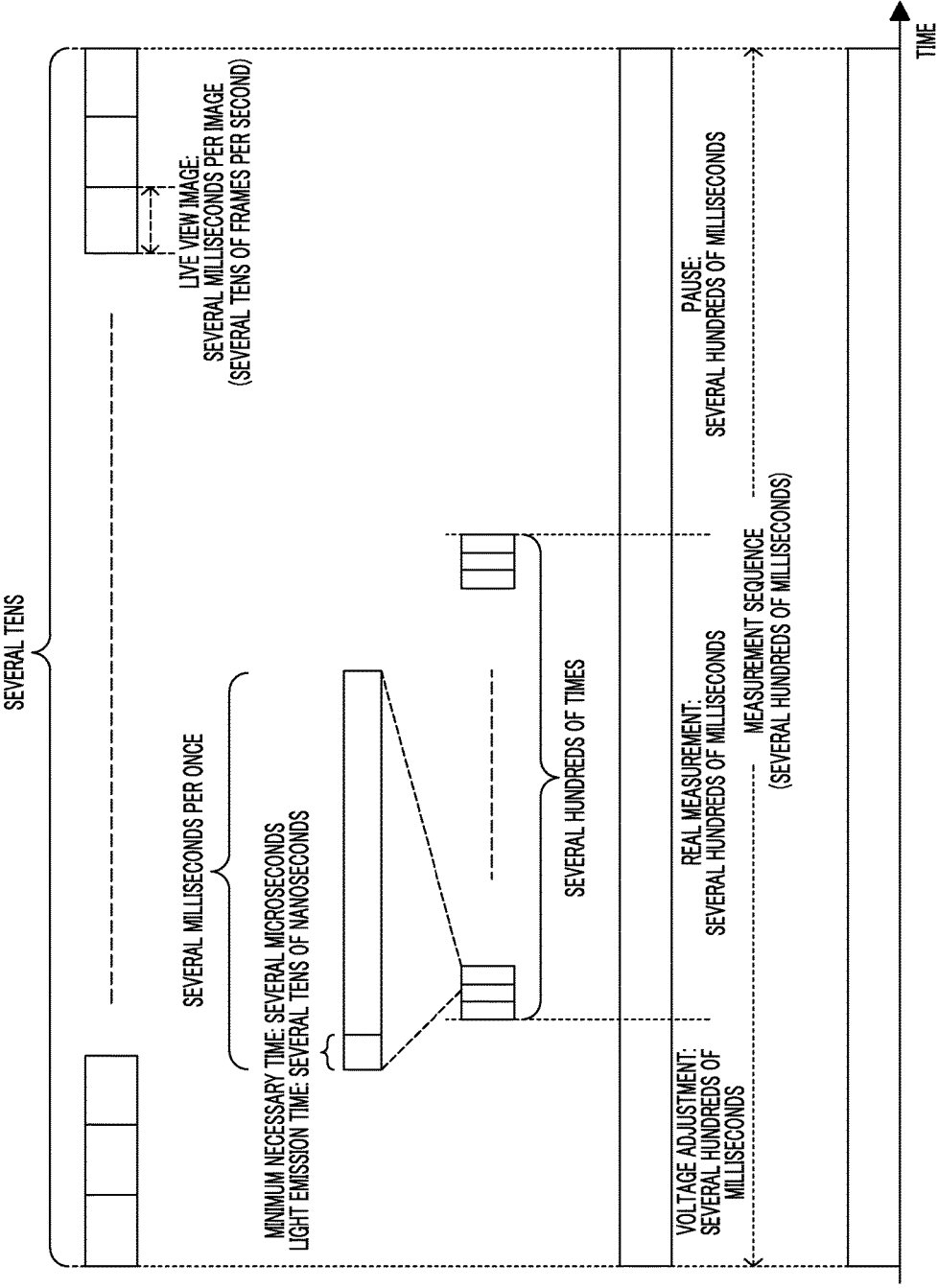
FIG. 3 is a time chart illustrating an example of a measurement sequence of the distance measurement device according to the first to sixth embodiments.

As illustrated in FIG. 3 as an example, one measurement sequence by the distance measurement device 10A is specified by a voltage adjustment period, a real measurement period, and a pause period.

The voltage adjustment period is a period in which driving voltages of the LD 30 and the PD 36 are adjusted. The real measurement period is a period in which a distance to the subject is actually measured. In the real measurement period, an operation of causing the LD 30 to emit a laser beam and causing the PD 36 to receive the reflected laser beam is repeated several hundred times, and a distance to the subject is derived on the basis of a timing when the laser beam is emitted and a timing when the light receiving signal is acquired. The pause period is a period for stopping the driving of the LD 30 and the PD 36. Accordingly, in one measurement sequence, the measurement of a distance to the subject is performed several hundred times.

Meanwhile, in this embodiment, each of the voltage adjustment period, the real measurement period, and the pause period is set to be several hundred milliseconds.

Figure 4:
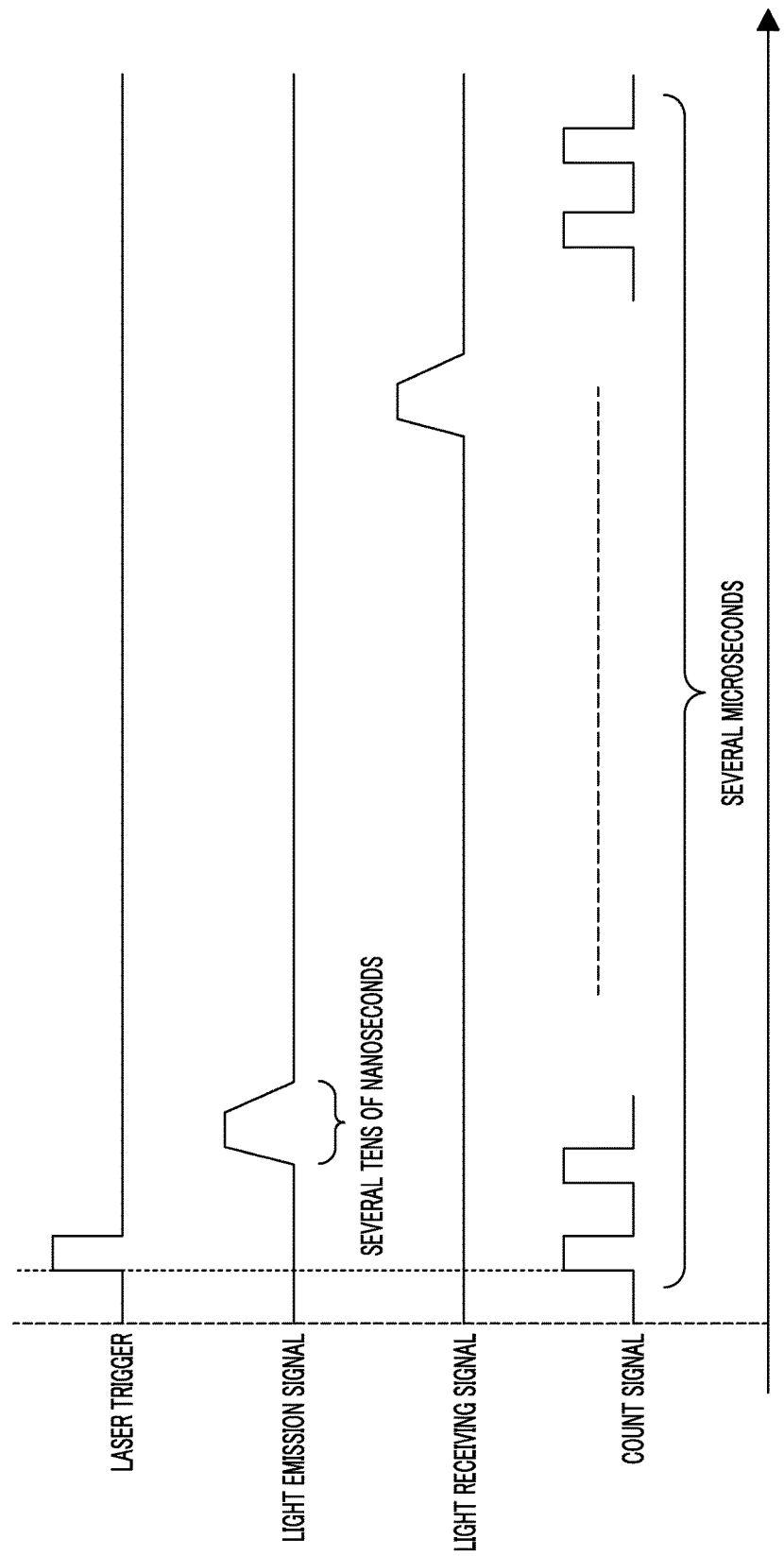
FIG. 4 is a time chart illustrating an example of a laser trigger, a light emission signal, a light receiving signal, and a count signal which are required in a case where measurement is performed once by the distance measurement device according to the first to sixth embodiments.

As illustrated in FIG. 4 as an example, a count signal for specifying a timing when the distance measurement control unit 68 gives an instruction for emitting a laser beam and a timing when a light receiving signal is acquired is provided to the distance measurement control unit 68. In this embodiment, the count signal is generated by the main control unit 62 and is supplied to the distance measurement control unit 68. However, the invention is not limited thereto, and the count signal may be generated by a dedicated circuit, such as a time counter, which is connected to the bus line 84, and may be supplied to the distance measurement control unit 68.

The distance measurement control unit 68 outputs a laser trigger for emitting a laser beam to the LD driver 34 in accordance with the count signal. The LD driver 34 drives the LD 30 to emit a laser beam in accordance with the laser trigger.

In the example illustrated in FIG. 4, a light emission time of a laser beam is set to be several tens of nanoseconds. In this case, a time until the laser beam, which is emitted toward a subject positioned several kilometers ahead by the emitting unit 22, is received by the PD 36 as a reflected laser beam is set to be "several kilometers×2/speed of light" several microseconds. Therefore, as illustrated in FIG. 3 as an example, a time of several microseconds is required as a minimum necessary time in order to measure a distance to the subject positioned several kilometers ahead.

Meanwhile, in this embodiment, as illustrated in FIG. 3 as an example, one measurement time is set to be several milliseconds in consideration of a reciprocating time of the laser beam, and the like. However, the reciprocating time of the laser beam varies depending on a distance to the subject, and thus one measurement time may vary in accordance with an assumed distance.

In a case where a distance to the subject is derived on the basis of measured values obtained from several hundred times of measurement in one measurement sequence, the distance measurement control unit 68 analyzes, for example, a histogram of the measured values obtained from several hundred times of measurement to derive a distance to the subject.

Figure 5:
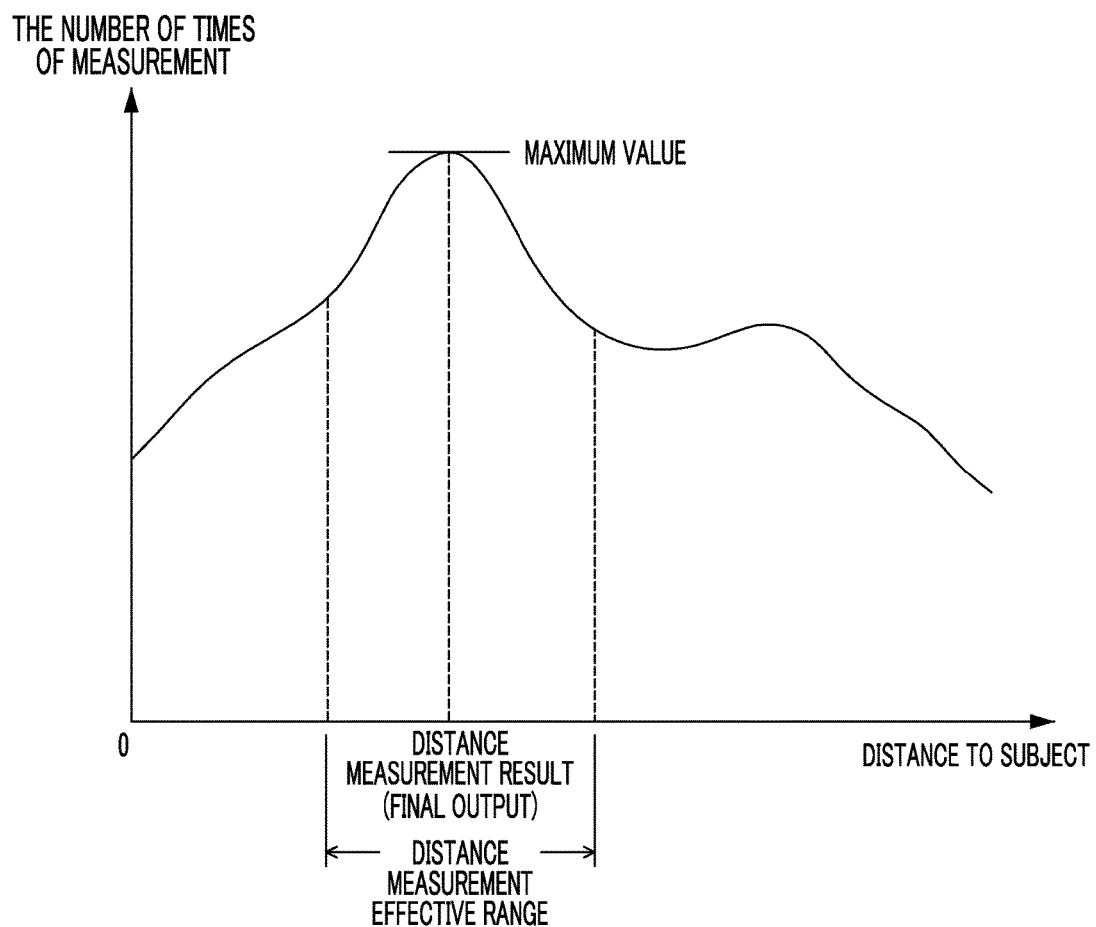
FIG. 5 is a graph illustrating an example of a histogram (histogram in a case where a distance (measured value) to a subject is represented by a lateral axis and the number of times of measurement is represented by a vertical axis) of measured values obtained by the measurement sequence of the distance measurement device according to the first to sixth embodiments.

As illustrated in FIG. 5 as an example, in a histogram of measured values obtained from several hundred times of measurement in one measurement sequence, the lateral axis represents a distance to a subject, the vertical axis represents the number of times of measurement, and a distance corresponding to a maximum value of the number of times of measurement is derived by the distance measurement control unit 68 as a distance measurement result. Meanwhile, the histogram illustrated in FIG. 5 is just an example, and a histogram may be generated on the basis of a reciprocating time (an elapsed time from the emission of light to the reception of light) of a laser beam, half of the reciprocating time of the laser beam, or the like, instead of the distance to the subject.

Figure 6:
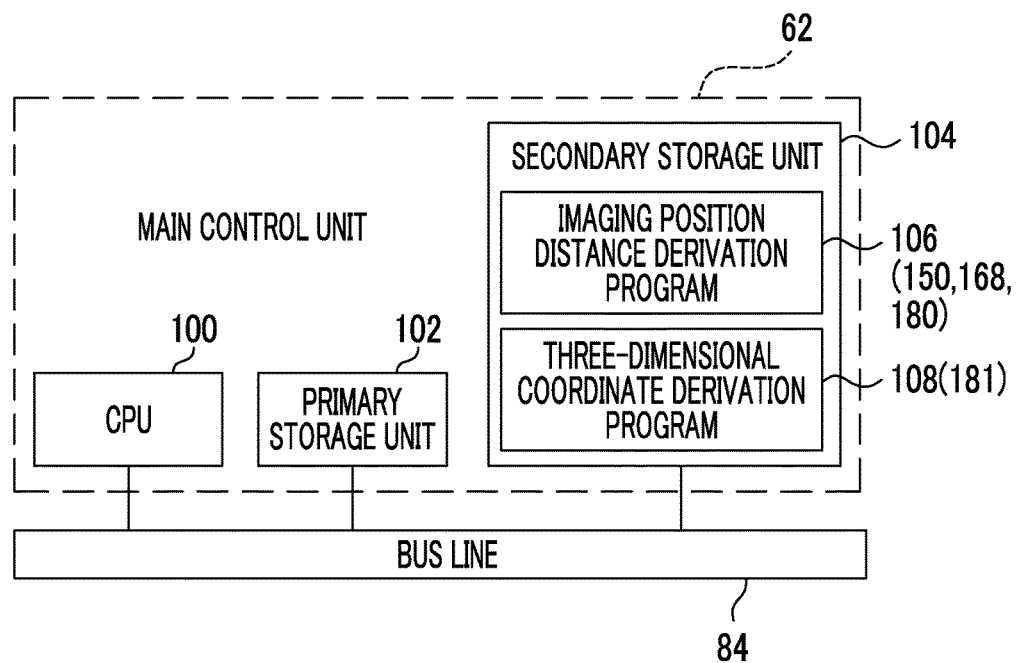
FIG. 6 is a block diagram illustrating an example of a hardware configuration of a main control unit included in the distance measurement device according to the first to sixth embodiments.

As illustrated in FIG. 6 as an example, the main control unit 62 includes a CPU 100, a primary storage unit 102, and a secondary storage unit 104 which are examples of an acquisition unit, a derivation unit, and an execution unit according to the technique of this disclosure. The CPU 100 controls the entire distance measurement device 10A. The primary storage unit 102 is a volatile memory which is used as a work area during the execution of various programs, and the like. An example of the primary storage unit 102 is a RAM. The secondary storage unit 104 is a non-volatile memory that stores control programs, various parameters, and the like for controlling the operation of the distance measurement device 10A in advance. An example of the secondary storage unit 104 is an Electrically Erasable Programmable Read Only Memory (EEPROM), a flash memory, or the like. The CPU 100, the primary storage unit 102, and the secondary storage unit 104 are connected to each other through the bus line 84.

The distance measurement device 10A has a three-dimensional coordinate derivation function. The three-dimensional coordinate derivation function refers to a function of deriving designated pixel three-dimensional coordinates to be described later, on the basis of Expression (1) from first designated pixel coordinates to be described later, second designated pixel coordinates to be described later, an imaging position distance to be described later, a focal length of the imaging lens 50, and the dimensions of the imaging pixel 60A1.

$$X = \frac{B}{u_L - u_R} u_L, \ Y = \frac{B}{u_L - u_R} v_L, \ Z = \frac{B}{u_L - u_R} f \qquad (1)$$

Meanwhile, in Expression (1), "uL" denotes an X coordinate of the first designated pixel coordinates. In Expression (1), "vL" denotes a Y coordinate of the first designated pixel coordinates. In Expression (1), "uR" denotes an X coordinate of the second designated pixel coordinates. In Expression (1), "B" denotes the imaging position distance (see FIGS. 7 and 8). In Expression (1), "f" denotes (focal length of the imaging lens 50)/(dimensions of the imaging pixel 60A1). In Expression (1), (X, Y, Z) denotes the designated pixel three-dimensional coordinates.

The first designated pixel coordinates are two-dimensional coordinates for specifying a first designated pixel (equivalent to a "designated pixel" according to the technique of this disclosure) which is designated as a pixel corresponding to a position on the real space in a first captured image to be described later. The second designated pixel coordinates are two-dimensional coordinates for specifying a second designated pixel (equivalent to a "designated pixel" according to the technique of this disclosure) which is designated as a pixel corresponding to a position on the real space in a second captured image to be described later. That is, the first designated pixel and the second designated pixel are pixels that are designated as pixels of which the positions on the real space correspond to each other, and are pixels capable of being specified at the positions corresponding to each other in each of the first captured image and the second captured image. The first designated pixel coordinates are two-dimensional coordinates on the first captured image, and the second designated pixel coordinates are two-dimensional coordinates on the second captured image.

The designated pixel three-dimensional coordinates refer to three-dimensional coordinates which are coordinates on the real space which correspond to the first designated pixel coordinates and the second designated pixel coordinates. Meanwhile, the designated pixel three-dimensional coordinates are an example of designated pixel real space coordinates according to the technique of this disclosure.

Figure 7:
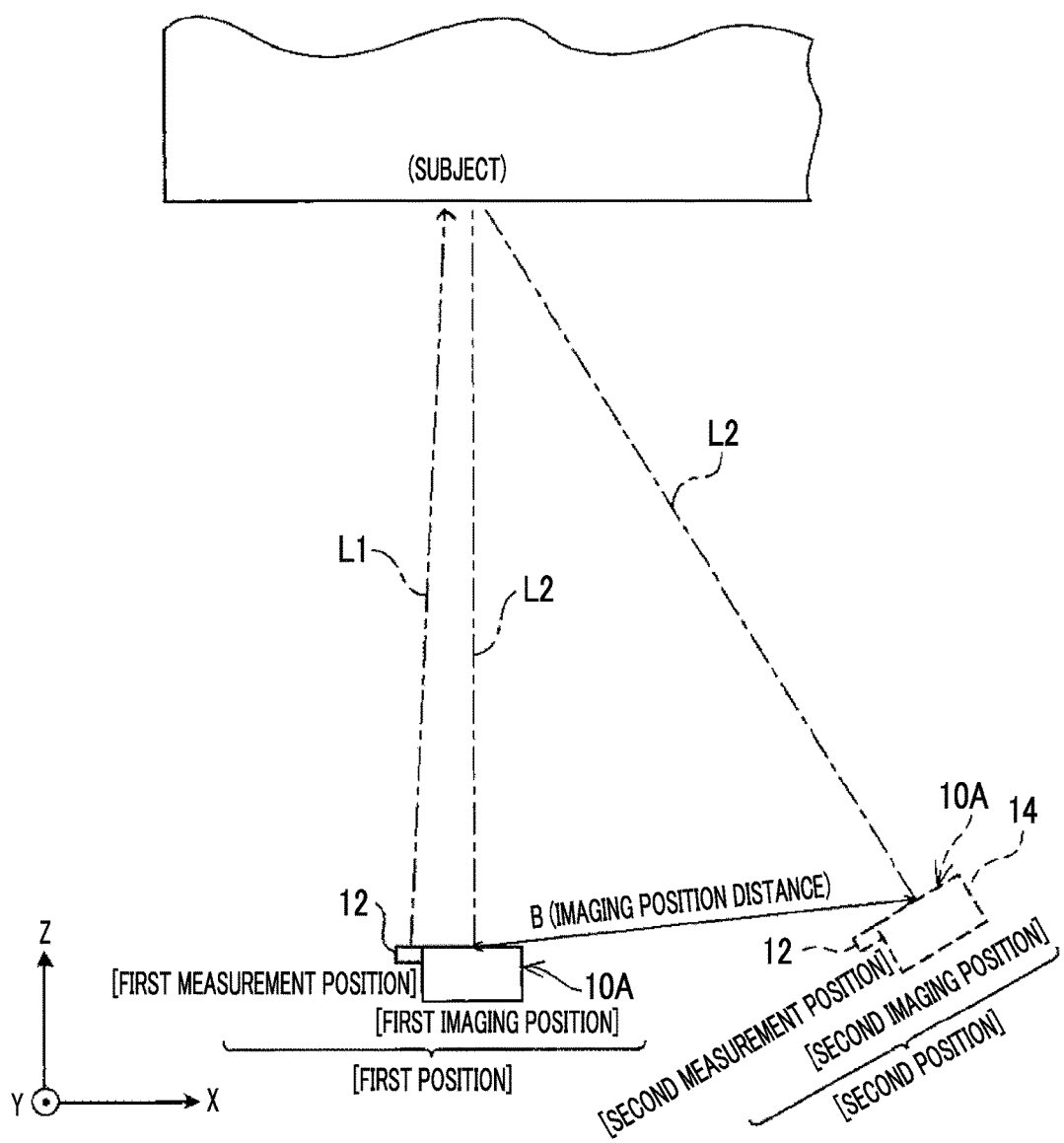
FIG. 7 is a schematic plan view illustrating an example of a positional relationship between the distance measurement device and the subject according to the first to fourth embodiments and the sixth embodiment.
Figure 8:
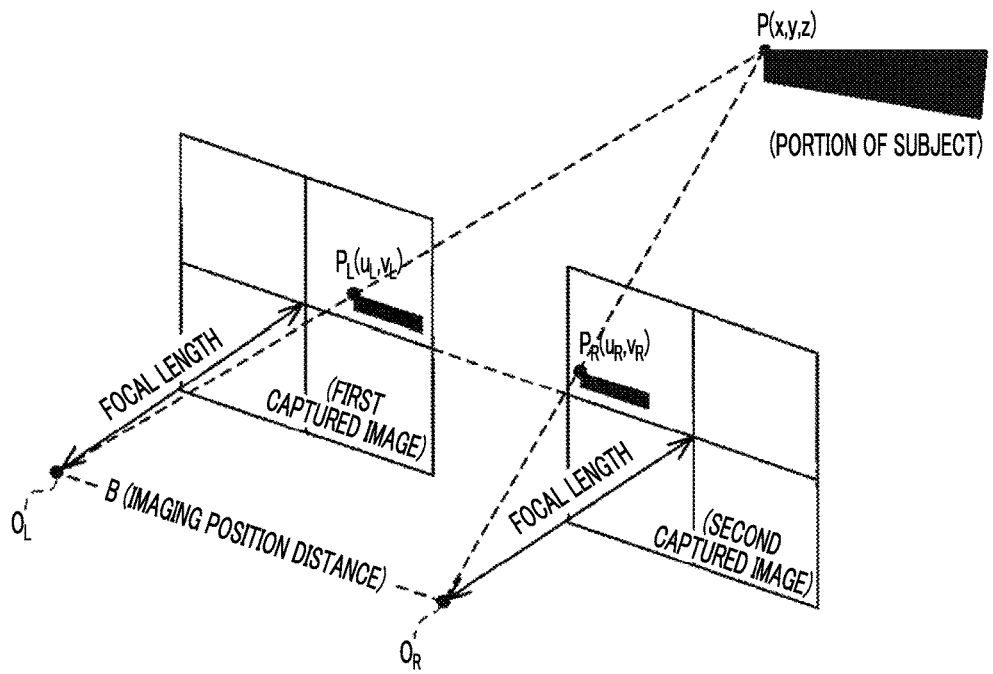
FIG. 8 is a conceptual diagram illustrating an example of a positional relationship between a portion of the subject, a first captured image, a second captured image, a principal point of an imaging lens at a first imaging position, and a principal point of the imaging lens at a second imaging position.

Here, as illustrated in FIGS. 7 and 8 as examples, the first captured image refers to a captured image obtained by imaging the subject by the imaging device 14 from the first imaging position. In addition, as an example, as illustrated in FIGS. 7 and 8, the second captured image indicates a captured image obtained by imaging a subject, including the subject imaged from the first imaging position, by the imaging device 14 from the second imaging position different from the first imaging position. Meanwhile, the invention is not limited to the first captured image and the second captured image. In this embodiment, for convenience of description, captured images obtained by the imaging of the imaging device 14, inclusive of a still image and a moving image, will be simply referred to as a "captured image" in a case where it is not necessary to give a description by distinguishing between the captured images.

Meanwhile, in the example illustrated in FIG. 7, a first measurement position and a second measurement position are shown as positions of the distance measurement unit 12. The first measurement position is an example of a "position corresponding to the first imaging position" according to the technique of this disclosure. The first measurement position indicates the position of the distance measurement unit 12 in a case where the subject is imaged by the imaging device 14 from the first imaging position in a state where the distance measurement unit 12 is correctly attached to the imaging device 14. The second measurement position refers to the position of the distance measurement unit 12 in a case where the subject is imaged by the imaging device 14 from the second imaging position in a state where the distance measurement unit 12 is correctly attached to the imaging device 14.

The imaging position distance refers to a distance between the first imaging position and the second imaging position. As illustrated in FIG. 8, an example of the imaging position distance is a distance between a principal point $O_L$ of the imaging lens 50 of the imaging device 14 at the first imaging position and a principal point $O_R$ of the imaging lens 50 of the imaging device 14 at the second imaging position, but the technique of this disclosure is not limited thereto. For example, a distance between the imaging pixel 60A1 positioned in the middle of the imaging element 60 of the imaging device 14 at the first imaging position and the imaging pixel 60A1 positioned in the middle of the imaging element 60 of the imaging device 14 at the second imaging position may be set to be an imaging position distance.

In the example illustrated in FIG. 8, a pixel $P_L$ included in the first captured image is a first designated pixel, a pixel $P_R$ included in the second captured image is a second designated pixel, and pixels $P_L$ and $P_R$ are pixels corresponding to a point P of the subject. Accordingly, first designated pixel coordinates ($u_L$, $v_L$) which are two-dimensional coordinates of the pixel $P_L$ and second designated pixel coordinates ($u_R$, $v_R$) which are two-dimensional coordinates of the pixel $P_R$ correspond to designated pixel three-dimensional coordinates (X, Y, Z) which are three-dimensional coordinates of the point P. Meanwhile, in Expression (1), "$v_R$" is not used.

Meanwhile, hereinafter, for convenience of description, the first designated pixel and the second designated pixel will be referred to as a "designated pixel" in a case where it is not necessary to give a description by distinguishing between the designated pixels. In addition, hereinafter, for convenience of description, the first designated pixel coordinates and the second designated pixel coordinates will be referred to as "designated pixel coordinates" in a case where it is not necessary to give a description by distinguishing between the designated pixel coordinates.

Incidentally, in a case where designated pixel three-dimensional coordinates are derived on the basis of Expression (1) by the distance measurement device 10A operating a three-dimensional coordinate derivation function, it is preferable to derive an imaging position distance with a high level of accuracy. This is because "B" which is an imaging position distance is included in Expression (1).

Consequently, in the distance measurement device 10A, as illustrated in FIG. 6 as an example, the secondary storage unit 104 stores an imaging position distance derivation program 106 which is an example of a program according to the technique of this disclosure.

The CPU 100 reads out the imaging position distance derivation program 106 from the secondary storage unit 104 and develops the read-out program to the primary storage unit 102 to execute the imaging position distance derivation program 106.

In addition, as illustrated in FIG. 6 as an example, the secondary storage unit 104 stores a three-dimensional coordinate derivation program 108. The CPU 100 reads out the three-dimensional coordinate derivation program 108 from the secondary storage unit 104 and develops the read-out program to the primary storage unit 102 to execute the three-dimensional coordinate derivation program 108.

Figure 9:
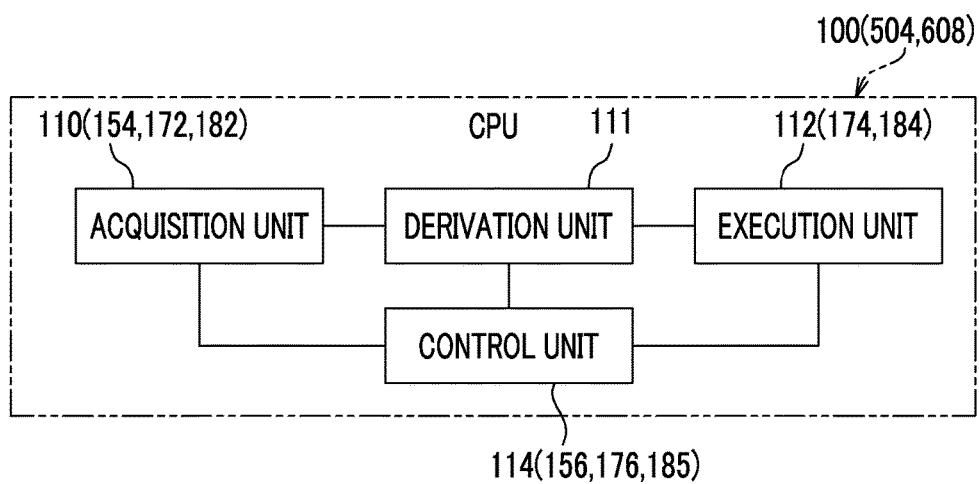
FIG. 9 is a block diagram illustrating an example of a main function of a CPU according to the first to sixth embodiments.

The CPU 100 executes the imaging position distance derivation program 106 and the three-dimensional coordinate derivation program 108, and is thus operation as an acquisition unit 110, a derivation unit 111, an execution unit 112, and a control unit 114 as illustrated in FIG. 9 as an example.

The acquisition unit 110 acquires a first captured image, a second captured image, and a distance to the subject. The "distance to the subject" as mentioned herein refers to a distance to the subject which is measured on the basis of the laser beam emitted by the distance measurement unit 12 at the first measurement position.

The derivation unit 111 derives irradiation position real space coordinates for specifying an irradiation position of a laser beam on the real space, that is, an irradiation position of the laser beam on the real space with respect to the subject, on the basis of the distance acquired by the acquisition unit 110.

Figure 10:
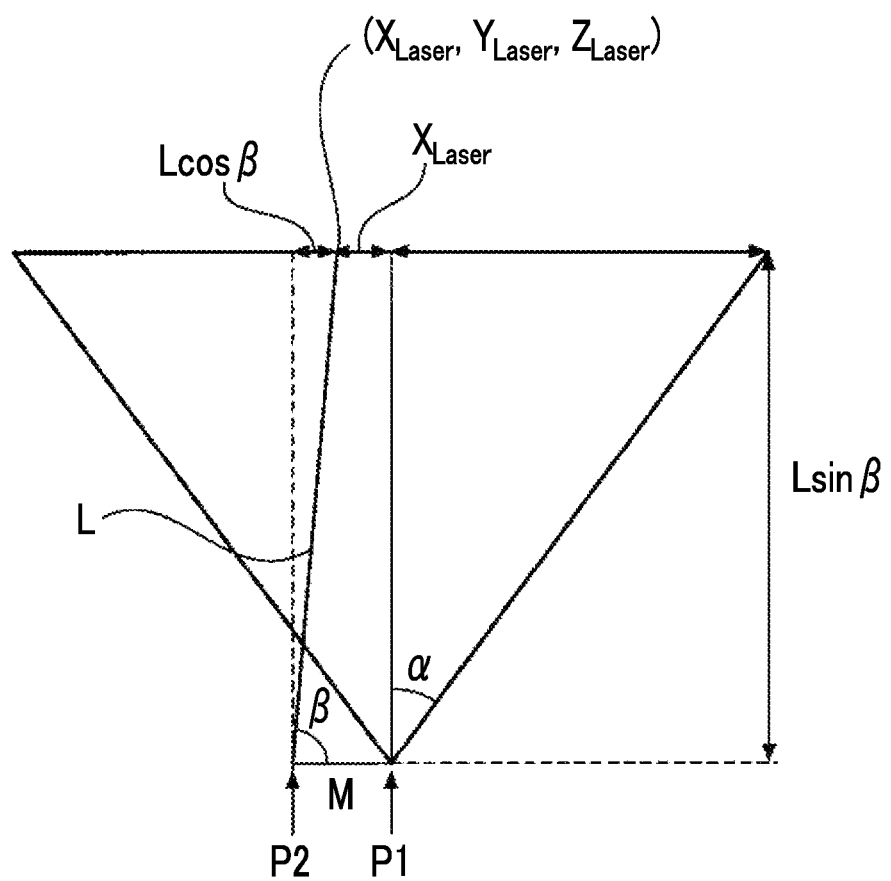
FIG. 10 is a diagram illustrating a method of deriving irradiation position real space coordinates according to the first to sixth embodiments.

The irradiation position real space coordinates are three-dimensional coordinates, and are derived on the basis of the following Expression (2) from a distance L, a half angle of view α, an emission angle β, and a distance between reference points M which are illustrated in FIG. 10 as an example. In Expression (2), ($x_{Laser}$, $y_{Laser}$, $z_{Laser}$) denotes irradiation position real space coordinates.

$$x_{Laser} = \frac{(M - L\cos\beta)}{L\tan\alpha \sin\beta}, \; y_{Laser} = 0, \; z_{Laser} = L\sin\beta \quad (2)$$

In Expression (2), the relation of $y_{Laser}=0$ is established, but this means that the height of an optical axis L1 is the same as the height of an optical axis L2 in the vertical direction. In a case where the position of a laser beam emitted to the subject is higher than the position of the optical axis L2 in the subject in the vertical direction, $y_{Laser}$ is set to have a positive value. In a case where the position of the laser beam emitted to the subject is lower than the position of the optical axis L2 in the subject in the vertical direction, $y_{Laser}$ is set to have a negative value. Meanwhile, hereinafter, for convenience of description, a description will be given on the assumption that the relation of "$y_{Laser}=0$" is established.

Here, as illustrated in FIG. 10 as an example, the half angle of view α refers to half an angle of view. The emission angle β refers to an angle at which a laser beam is emitted from the emitting unit 22. The distance between reference points M refers to a distance between a first reference point P1 specified for the imaging device 14 and a second reference point P2 specified for the distance measurement unit 12. An example of the first reference point P1 is a principal point of the imaging lens 50. An example of the second reference point P2 is a point which is set in advance as the starting point of coordinates capable of specifying the position of a three-dimensional space in the distance measurement unit 12. Specifically, an example of the second reference point is one end out of right and left ends of the objective lens 38 in a front view, or one angle, that is, one apex of a housing in a case where the housing (not shown) of the distance measurement unit 12 has a rectangular parallelepiped shape.

The derivation unit 111 derives irradiation position pixel coordinates for specifying the position of a pixel which corresponds to the irradiation position specified by the irradiation position real space coordinates in each of the first captured image and the second captured image, on the basis of the distance acquired by the acquisition unit 110.

The irradiation position pixel coordinates are roughly classified into first irradiation position pixel coordinates and second irradiation position pixel coordinates. The first irradiation position pixel coordinates are two-dimensional coordinates for specifying the position of a pixel which corresponds to the irradiation position specified by the irradiation position real space coordinates in the first captured image. The second irradiation position pixel coordinates are two-dimensional coordinates for specifying the position of a pixel which corresponds to the irradiation position specified by the irradiation position real space coordinates in the second captured image.

Meanwhile, hereinafter, for convenience of description, the first irradiation position pixel coordinates and the second irradiation position pixel coordinates will be referred to as "irradiation position pixel coordinates" in a case where it is not necessary to give a description by distinguishing between the first and second irradiation position pixel coordinates. In addition, a derivation method for the X coordinate of the first irradiation position pixel coordinates and a derivation method for the Y coordinate of the first irradiation position pixel coordinates differ only in a target coordinate axis, and have the same principle of the derivation method. That is, the derivation methods are different from each other in that the derivation method for the X coordinate of the first irradiation position pixel coordinates is a derivation method targeted at a pixel in a row direction in the imaging element 60, while the derivation method for the Y coordinate of the first irradiation position pixel coordinates is a derivation method targeted at a pixel in a column direction in the imaging element 60. For this reason, hereinafter, for convenience of description, the derivation method for the X coordinate of the first irradiation position pixel coordinates will be described, and the derivation method for the Y coordinate of the first irradiation position pixel coordinates will not be described. Meanwhile, the row direction means the lateral direction in a front view of the imaging surface of the imaging element 60, and the column direction means the vertical direction in a front view of the imaging surface of the imaging element 60.

Figure 11:
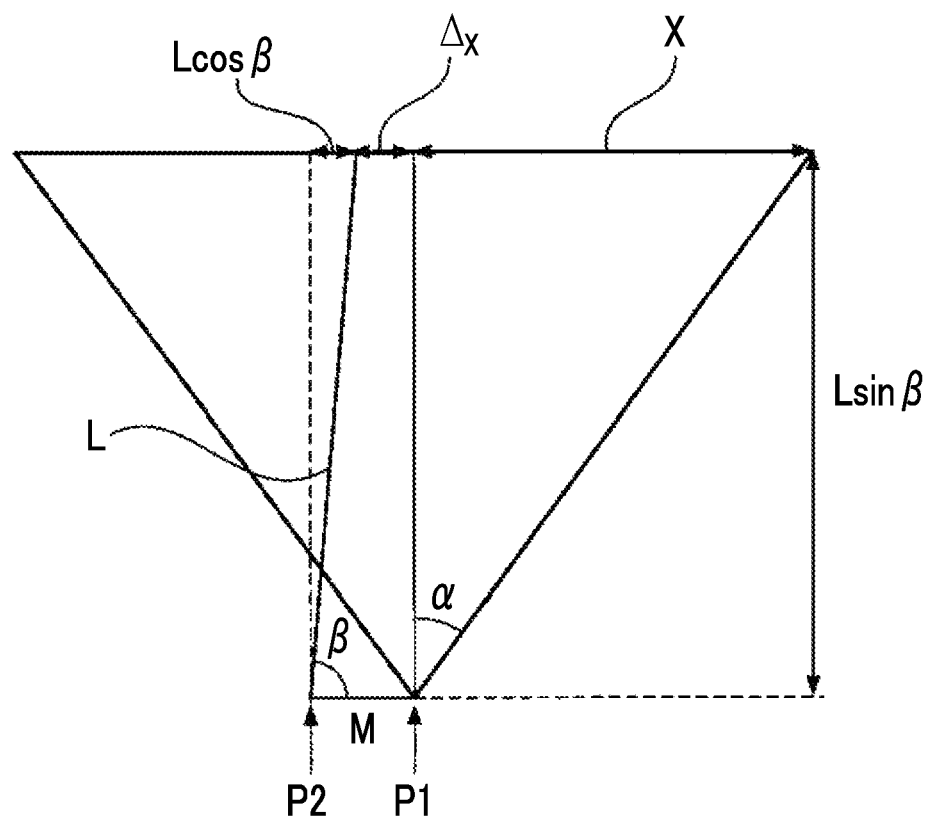
FIG. 11 is a diagram illustrating a method of deriving irradiation position pixel coordinates according to the first to sixth embodiments.

The X coordinate of the first irradiation position pixel coordinates is derived on the basis of the following Expressions (3) to (5) from a distance L, a half angle of view α, an emission angle β, and a distance between reference points M which are illustrated in FIG. 11 as an example. Meanwhile, in Expression (5), "pixel in row direction at irradiation position" refers to a pixel at a position corresponding to an irradiation position of a laser beam on the real space among pixels in the row direction in the imaging element 60. In addition, "half of the number of pixels in row direction" refers to a half of the number of pixels in the row direction in the imaging element 60.

$$\Delta x = M - L \cos \beta \quad (3)$$

$$x = L \tan \alpha \sin \beta \quad (4)$$

(Pixel in Row Direction at Irradiation Position):(Half of the Number of Pixels in Row Direction)=
$$\Delta x : X \quad (5)$$

The derivation unit 111 substitutes the distance between reference points M and the emission angle β for Expression (3), substitutes the half angle of view α and the emission angle β for Expression (4), and substitutes the distance L for Expression (3) and Expression (4). The derivation unit 111 substitutes Δx and X, which are obtained in this manner, and the above-described "half of the number of pixels in row direction" for Expression (5) to derive an X coordinate which is a coordinate for specifying the position of the "pixel in row direction at irradiation position". The X coordinate for specifying the position of the "pixel in row direction at irradiation position" is the X coordinate of the first irradiation position pixel coordinates.

The derivation unit 111 derives coordinates for specifying the position of a pixel corresponding to the position of the pixel specified by the first irradiation position pixel coordinates, among pixels of the second captured image, as second irradiation position pixel coordinates.

The execution unit 112 executes a first derivation process which is an example of the derivation process using a plurality of pixels according to the technique of this disclosure, in a position unspecifiable state. Here, the position unspecifiable state refers to a state where the position of a pixel specified by irradiation position pixel coordinates is the position of a pixel different from a pixel which is specifiable at positions corresponding to each other in the respective first and second captured images.

In addition, the execution unit 112 executes a second derivation process which is an example of the derivation process according to the technique of this disclosure, in a position specifiable state. Here, the position specifiable state refers to a state where the position of a pixel specified by irradiation position pixel coordinates is the position of a pixel which is specifiable at positions corresponding to each other in the respective first and second captured images.

Here, the first derivation process refers to a process of deriving an imaging position distance on the basis of a plurality of pixel coordinates, irradiation position real space coordinates, a focal length of the imaging lens 50, and dimensions of the imaging pixel 60A1 which are described later. The plurality of pixel coordinates refer to a plurality of two-dimensional coordinates for specifying a plurality of pixels which are present in the same planar region as an irradiation position of a laser beam on the real space and which are equal to or more than three pixels specifiable at positions corresponding to each other in the respective first and second captured images acquired by the acquisition unit 110. Meanwhile, parameters used for the first derivation process are not limited to the plurality of pixel coordinates, the irradiation position real space coordinates, the focal length of the imaging lens 50, and the dimensions of the imaging pixel 60A1. For example, a plurality of parameters obtained by further adding one or more parameters for fine adjustment to the plurality of pixel coordinates, the irradiation position real space coordinates, the focal length of the imaging lens 50, and the dimensions of the imaging pixel 60A1 may be used in the first derivation process.

In addition, the second derivation process refers to a process of deriving an imaging position distance on the basis of the irradiation position pixel coordinates, the irradiation position real space coordinates, the focal length of the imaging lens 50, and the dimensions of the imaging pixel 60A1. Meanwhile, parameters used for the second derivation process are not limited to the irradiation position pixel coordinates, the irradiation position real space coordinates, the focal length of the imaging lens 50, and the dimensions of the imaging pixel 60A1. For example, a plurality of parameters obtained by further adding one or more parameters for fine adjustment to the irradiation position pixel coordinates, the irradiation position real space coordinates, the focal length of the imaging lens 50, and the dimensions of the imaging pixel 60A1 may be used in the second derivation process.

In addition, the second derivation process is a process capable of deriving an imaging position distance with a higher level of accuracy than the first derivation process in a case where the real irradiation position of a laser beam is a position on the real space which corresponds to the position of a pixel which is specifiable at positions corresponding to each other in the respective first and second captured images. In addition, the second derivation process is a process capable of deriving an imaging position distance on the basis of plural parameters smaller than the number of parameters used in the derivation of the imaging position distance by the first derivation process. Meanwhile, the "plurality of parameters" as mentioned herein refers to, for example, the irradiation position pixel coordinates, the irradiation position real space coordinates, the focal length of the imaging lens 50, and the dimensions of the imaging pixel 60A1.

The control unit 114 which is an example of the control unit according to the technique of this disclosure performs control for displaying derivation results of the execution unit 112 on the display unit 86.

In a case where the execution unit 112 executes the first derivation process, the execution unit 112 derives the direction of a plane specified by a plane equation indicating a plane including three-dimensional coordinates on the real space which correspond to a plurality of pixel coordinates, on the basis of the plurality of pixel coordinates, the focal length of the imaging lens 50, and the dimensions of the imaging pixel 60A1. The execution unit 112 decides the plane equation on the basis of the derived direction of the plane and the irradiation position real space coordinates, and derives an imaging position distance on the basis of the decided plane equation, the plurality of pixel coordinates, the focal length of the imaging lens 50, and the dimensions of the imaging pixel 60A1.

Meanwhile, the plane equation used for the derivation of the imaging position distance is specified by the following Expression (6). Therefore, the derivation of "the direction of the plane" means the derivation of a, b, and c in Expression (6), and the decision of "the plane equation" means the decision of a, b, c, and d of the plane equation by deriving d in Expression (6), $$ax+by+cz+d=0 \qquad (6)$$

Next, operations of portions of the distance measurement device 10A according to the technique of this disclosure will be described.

First, reference will be made to FIG. 12 to describe an imaging position distance derivation process realized by the CPU 100 executing the imaging position distance derivation program 106 in a case where the three-dimensional coordinate derivation button 90G is turned on.

Figure 15:
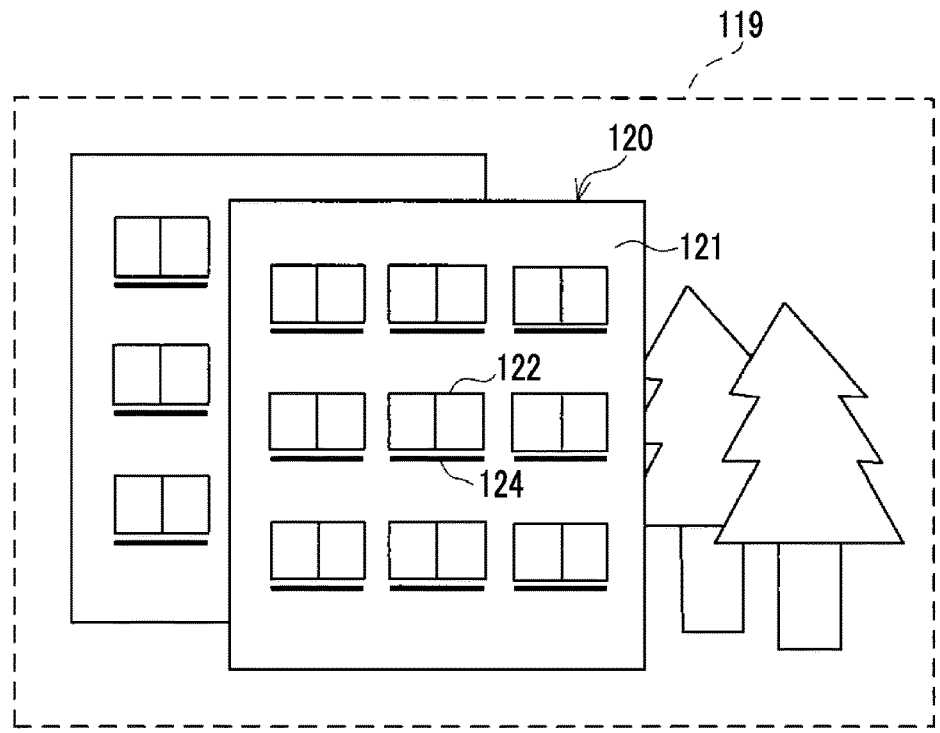
FIG. 15 is a schematic view illustrating an example of a subject included in an imaging range of an imaging device according to the first to sixth embodiments.

Meanwhile, hereinafter, for convenience of description, a description will be given on the assumption that a region including an outer wall surface 121 of an office building 120 is included as a subject in an imaging range 119 of the imaging device 14 of the distance measurement device 10A, as illustrated in FIG. 15 as an example. In addition, a description will be given on the assumption that the outer wall surface 121 is a main subject and is an object to be irradiated with a laser beam.

In addition, the outer wall surface 121 is formed to have a planar shape, and is an example of a planar region according to the technique of this disclosure. In addition, as illustrated in FIG. 15 as an example, a plurality of windows 122 having a quadrilateral shape are provided on the outer wall surface 121. In addition, as illustrated in FIG. 15 as an example, a pattern 124 having a laterally long rectangular shape is drawn below each window 122 on the outer wall surface 121. However, the invention is not limited thereto, and dirt attached to the outer wall surface 121, a crack, or the like may be used.

Meanwhile, in this embodiment, the "planar shape" includes not only a plane but also a planar shape in a range allowing slight irregularities due to the window, a ventilating opening, or the like, and may be, for example, a plane or a planar shape which is recognized as a "planar shape" by visual observation or the existing image analysis technique.

In addition, hereinafter, for convenience of description, a description will be given on the assumption that a distance to the outer wall surface 121 is measured by the distance measurement device 10A by a laser beam being emitted to the outer wall surface 121. In addition, hereinafter, for convenience of description, the position of the distance measurement device 10A in a case where the distance measurement unit 12 is positioned at a first measurement position and the imaging device 14 is positioned at a first imaging position will be referred to as a "first position". In addition, hereinafter, for convenience of description, the position of the distance measurement device 10A in a case where the distance measurement unit 12 is positioned at a second measurement position and the imaging device 14 is positioned at a second imaging position will be referred to as a "second position".

Figure 12:
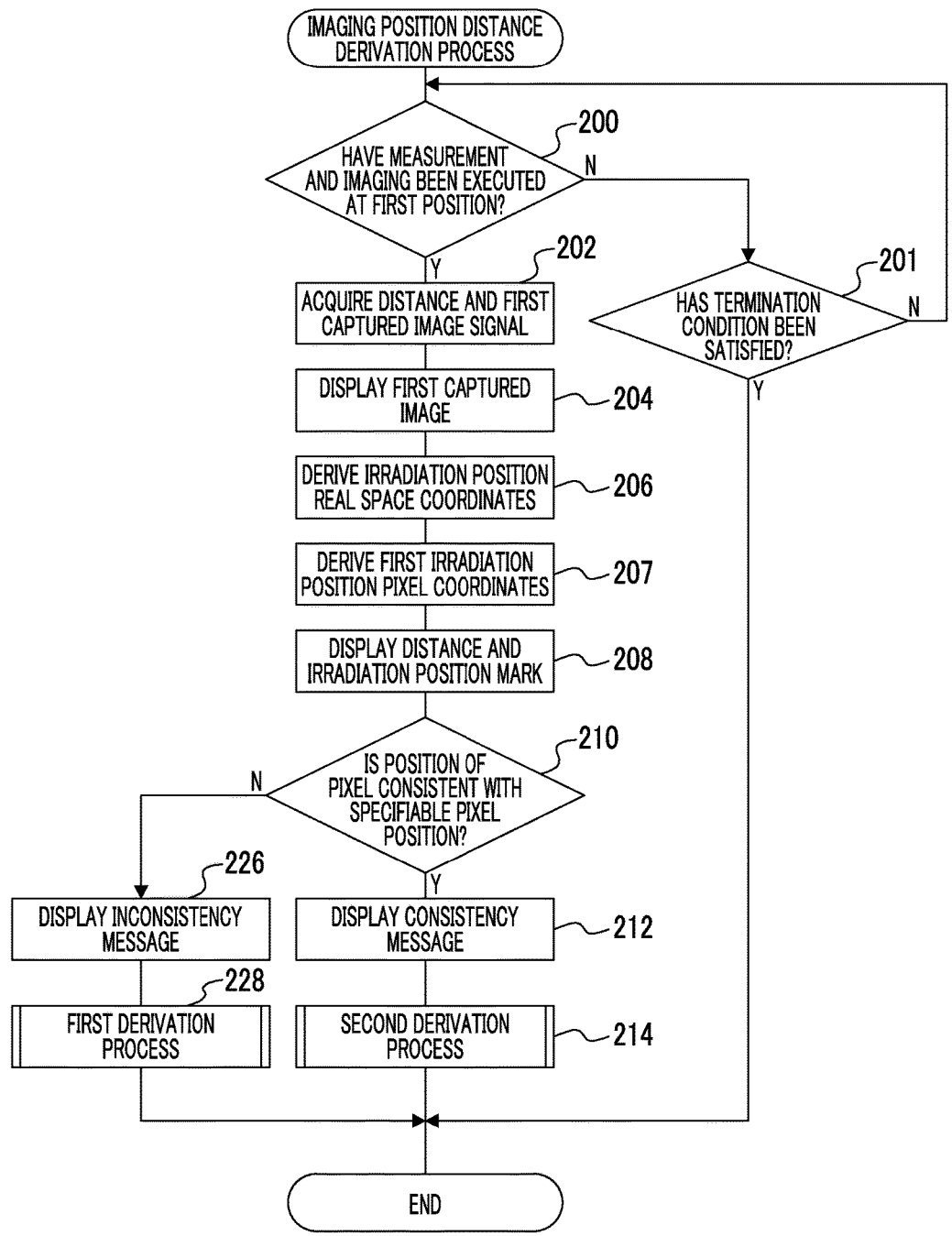
FIG. 12 is a flowchart illustrating an example of a flow of an imaging position distance derivation process according to the first embodiment.

In the imaging position distance derivation process illustrated in FIG. 12, first, the acquisition unit 110 determines whether or not the measurement and imaging of a distance have been executed at the first position by the distance measurement device 10A, in step 200. The first position may be a position where the outer wall surface 121 can be irradiated with a laser beam and a region including the outer wall surface 121 can be imaged as a subject.

In a case where the measurement and imaging of a distance have not been executed at the first position by the distance measurement device 10A in step 200, the determination result is negative, and the process proceeds to step 201. In a case where the measurement and imaging of a distance have been executed at the first position by the distance measurement device 10A in step 200, the determination result is positive, and the process proceeds to step 202.

In step 201, the acquisition unit 110 determines whether or not a condition for terminating the imaging position distance derivation process has been satisfied. The condition for terminating the imaging position distance derivation process refers to, for example, a condition that an instruction for terminating the imaging position distance derivation process is received through the touch panel 88 or a condition that the determination result is not positive after the start of the processing of step 200 and a first predetermined time elapses. Meanwhile, the first predetermined time refers to, for example, one minute.

In a case where the condition for terminating the imaging position distance derivation process has not been satisfied in step 201, the determination result is negative, and the process proceeds to step 200. In a case where the condition for terminating the imaging position distance derivation process has been satisfied in step 201, the determination result is positive, and thus the imaging position distance derivation process is terminated.

In step 202, the acquisition unit 110 acquires a distance measured at the first position and a first captured image signal indicating a first captured image obtained by executing imaging at the first position, and then the process proceeds to step 204. Meanwhile, the first captured image is a captured image obtained by performing imaging in a focusing state at the first position.

Figure 16:
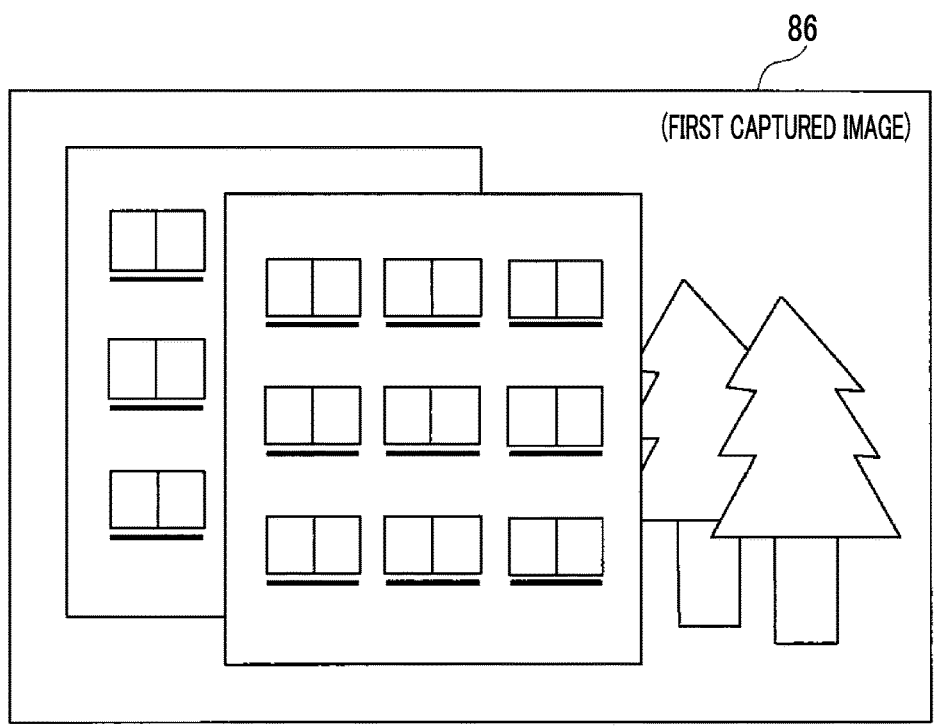
FIG. 16 is a schematic image illustrating an example of the first captured image obtained by the imaging device according to the first embodiment.

In step 204, the acquisition unit 110 displays the acquired first captured image indicated by the first captured image signal on the display unit 86 as illustrated in FIG. 16 as an example, and then the process proceeds to step 206.

In step 206, the derivation unit 111 derives irradiation position real space coordinates on the basis of Expression (2) from a distance L, a half angle of view α, an emission angle β, and a distance between reference points M, and then the process proceeds to step 207. Meanwhile, the distance L used in the processing of step 206 refers to a distance to the subject which is measured at the first position by the distance measurement device 10A.

In step 207, the derivation unit 111 derives first irradiation position pixel coordinates on the basis of Expressions (3) to (5) from the distance L, the half angle of view α, the emission angle β, and the distance between reference points M, and then the process proceeds to step 208. Meanwhile, the distance L used in the processing of step 207 refers to a distance to the subject which is measured at the first position by the distance measurement device 10A.

Figure 17:
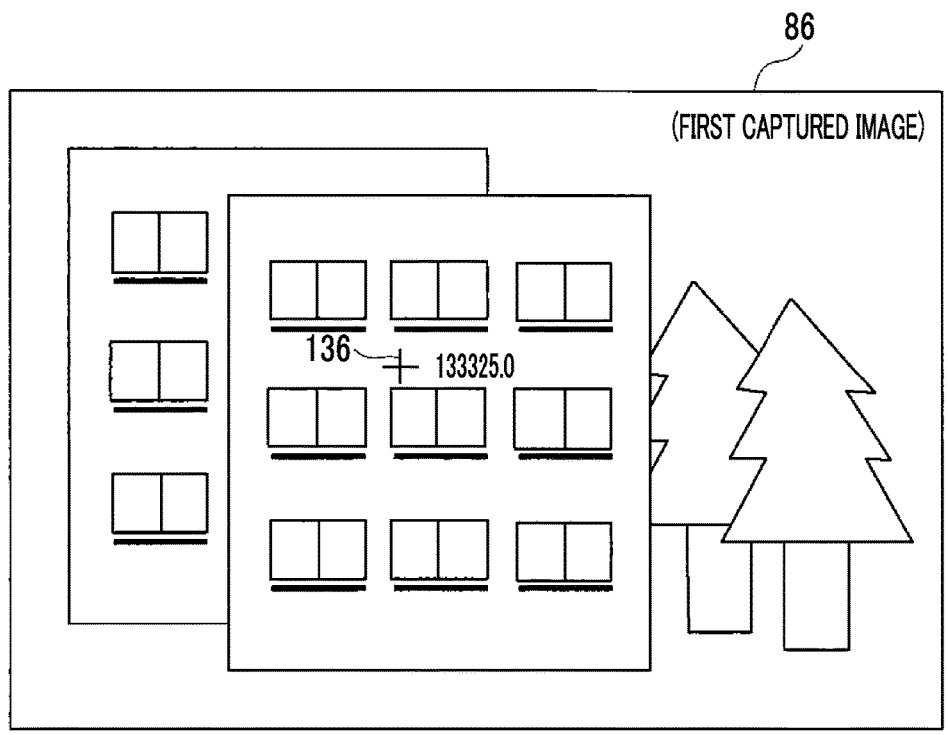
FIG. 17 is a schematic image illustrating an example of a first captured image, obtained by performing imaging using the imaging device according to the first embodiment, on which an irradiation position mark and a distance to a subject are displayed in an overlapping manner.

In step 208, the control unit 114 displays a distance and an irradiation position mark 136 on the display unit 86 so as to be superimposed on the first captured image as illustrated in FIG. 17 as an example, and the process proceeds to step 210.

The distance displayed by the execution of the processing of step 208 refers to a distance which is measured at the first imaging position by the distance measurement device 10A, that is, the distance L which is used for the derivation of the first irradiation position pixel coordinates in the processing of step 207. In the example illustrated in FIG. 17, a numerical value of "133325.0" corresponds to the distance L which is measured at the first imaging position by the distance measurement device 10A, and the unit is millimeter. In the example illustrated in FIG. 17, the irradiation position mark 136 is a mark indicating the position of a pixel which is specified by the first irradiation position pixel coordinates derived by the execution of the processing of step 207.

In step 210, the execution unit 112 determines whether or not the position of the pixel which is specified by the first irradiation position pixel coordinates derived by the execution of the processing of step 207 is consistent with a specifiable pixel position. Here, the specifiable pixel position refers to the position of a pixel which is specifiable at positions corresponding to each other in the respective first and second captured images.

In step 210, in a case where the position of the pixel which is specified by the first irradiation position pixel coordinates derived by the execution of the processing of step 207 is consistent with the specifiable pixel position, the determination result is positive, and the process proceeds to step 212. In step 210, in a case where the position of the pixel which is specified by the first irradiation position pixel coordinates derived by the execution of the processing of step 207 is not consistent with the specifiable pixel position, the determination result is negative, and the process proceeds to step 226.

Figure 18:
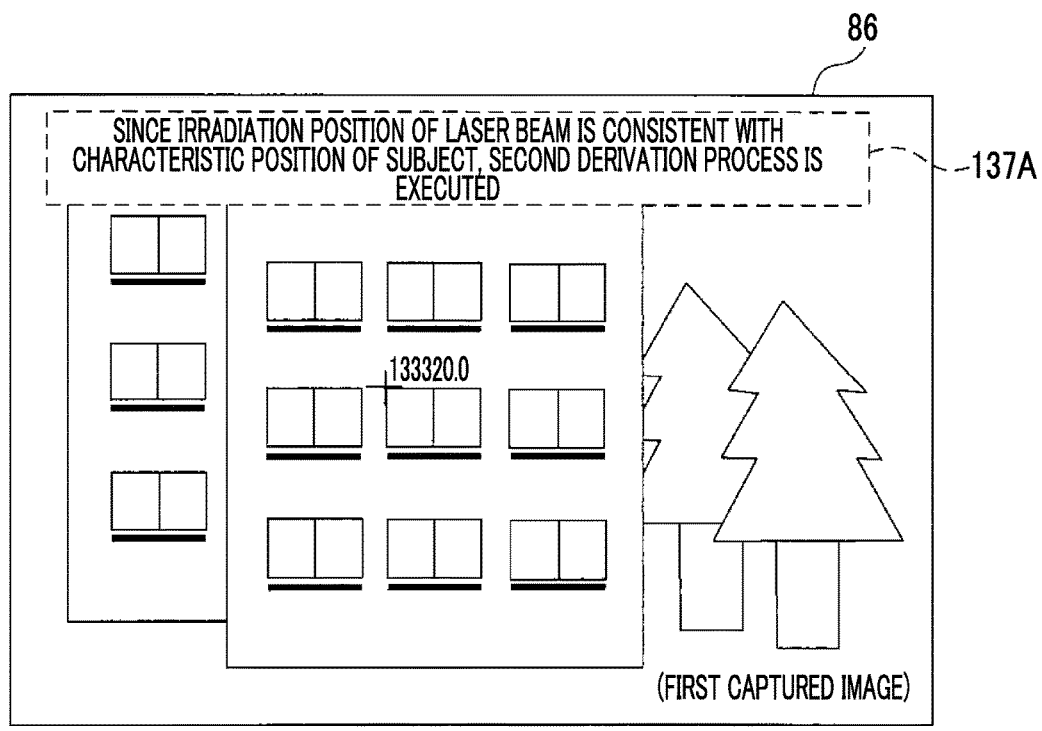
FIG. 18 is a schematic image illustrating an example of a first captured image, obtained by performing imaging using the imaging device according to the first embodiment, on which a consistency message is displayed in an overlapping manner.

In step 212, the execution unit 112 displays a consistency message 137A on the display unit 86 so as to be superimposed on the first captured image for a specific time (for example, for five seconds) as illustrated in FIG. 18 as an example, and then the process proceeds to step 214. The consistency message 137A is a message indicating that the position of the pixel which is specified by the first irradiation position pixel coordinates derived by the execution of the processing of step 207 is consistent with the specifiable pixel position. Accordingly, a user is notified that the position of the pixel which is specified by the first irradiation position pixel coordinates derived by the execution of the processing of step 207 is consistent with the specifiable pixel position, by the execution of the processing of step 212. Meanwhile, the processing of step 221 is an example of a position specifiable state notification process according to the technique of this disclosure. In addition, here, the position specifiable state notification process according to the technique of this disclosure refers to a process of giving notice of being the above-described position specifiable state.

Although not shown in the drawing, the display of an attention pixel designation guidance message (not shown) superimposed on the first captured image is started by the display unit 86 between the processing of step 212 and the processing of step 214 and between the processing of step 226 and the processing of step 228. The attention pixel designation guidance message refers to a message for guiding, for example, the designation of an attention pixel from the first captured image through the touch panel 88. An example of the attention pixel designation guidance message is a message of "please designate one pixel to be given attention (attention point)". The attention pixel designation guidance message is set to be in a non-display state in a case where an attention pixel is designated, for example, in the processing of step 214A to be described later or the processing of step 228A to be described later.

In the example illustrated in FIG. 18, a message of "since irradiation position of laser beam is consistent with characteristic position of subject, first derivation process or second derivation process can be executed" is shown as the consistency message 137A, but the technique of this disclosure is not limited thereto. For example, only a message of "irradiation position of laser beam is consistent with characteristic position of subject" in the consistency message 137A may be adopted to be displayed.

In this manner, any message may be adopted as long as the message is a message for giving notice that the position of the pixel which is specified by the first irradiation position pixel coordinates derived by the execution of the processing of step 207 is consistent with the specifiable pixel position. The example illustrated in FIG. 18 shows a case where the consistency message 137A is visibly displayed, but audible display such as the output of a sound using a sound reproducing device (not shown) or permanent visible display such as the output of printed matter using a printer may be performed instead of the visible display or may be performed in combination.

Figure 19:
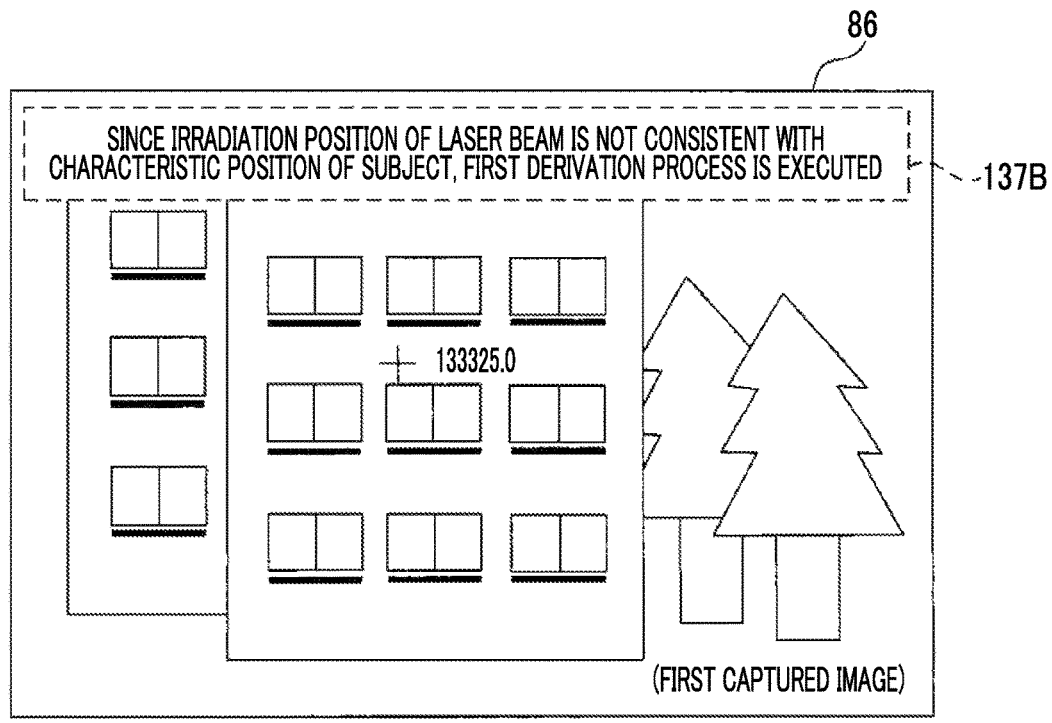
FIG. 19 is a schematic image illustrating an example of a first captured image, obtained by performing imaging using the imaging device according to the first embodiment, on which an inconsistency message is displayed in an overlapping manner.

In step 226, the execution unit 112 displays an inconsistency message 137B on the display unit 86 so as to be superimposed on the first captured image for a specific time (for example, for five seconds) as illustrated in FIG. 19 as an example, and then the process proceeds to step 228. The inconsistency message 137B is a message indicating that the position of the pixel which is specified by the first irradiation position pixel coordinates derived by the execution of the processing of step 207 is not consistent with the specifiable pixel position. Here, in other words, "the position of the pixel which is specified by the first irradiation position pixel coordinates is not consistent with the specifiable pixel position" means that the position of the pixel which is specified by the first irradiation position pixel coordinates is the position of a pixel which is different from the specifiable pixel position.

In this manner, a user is notified that the position of the pixel which is specified by the first irradiation position pixel coordinates derived by the execution of the processing of step 207 is not consistent with the specifiable pixel position, by the execution of the processing of step 226. Meanwhile, the processing of step 226 is an example of a position unspecifiable state notification process according to the technique of this disclosure. The position unspecifiable state notification process according to the technique of this disclosure refers to a process of giving notice of being the above-described position unspecifiable state.

In the example illustrated in FIG. 19, a message of "since irradiation position of laser beam is not consistent with characteristic position of subject, first derivation process is executed" is shown as the inconsistency message 137B, but the technique of this disclosure. For example, only a message of "irradiation position of laser beam is not consistent with characteristic position of subject" in the inconsistency message 137B may be adopted to be displayed.

In this manner, any message may be adopted as long as the message is a message for giving notice that the position of the pixel which is specified by the first irradiation position pixel coordinates derived by the execution of the processing of step 207 is not consistent with the specifiable pixel position. The example illustrated in FIG. 19 shows a case where the inconsistency message 137B visibly displayed, but audible display such as the output of a sound using a sound reproducing device (not shown) or permanent visible display such as the output of printed matter using a printer may be performed instead of the visible display or may be performed in combination.

Figure 13:
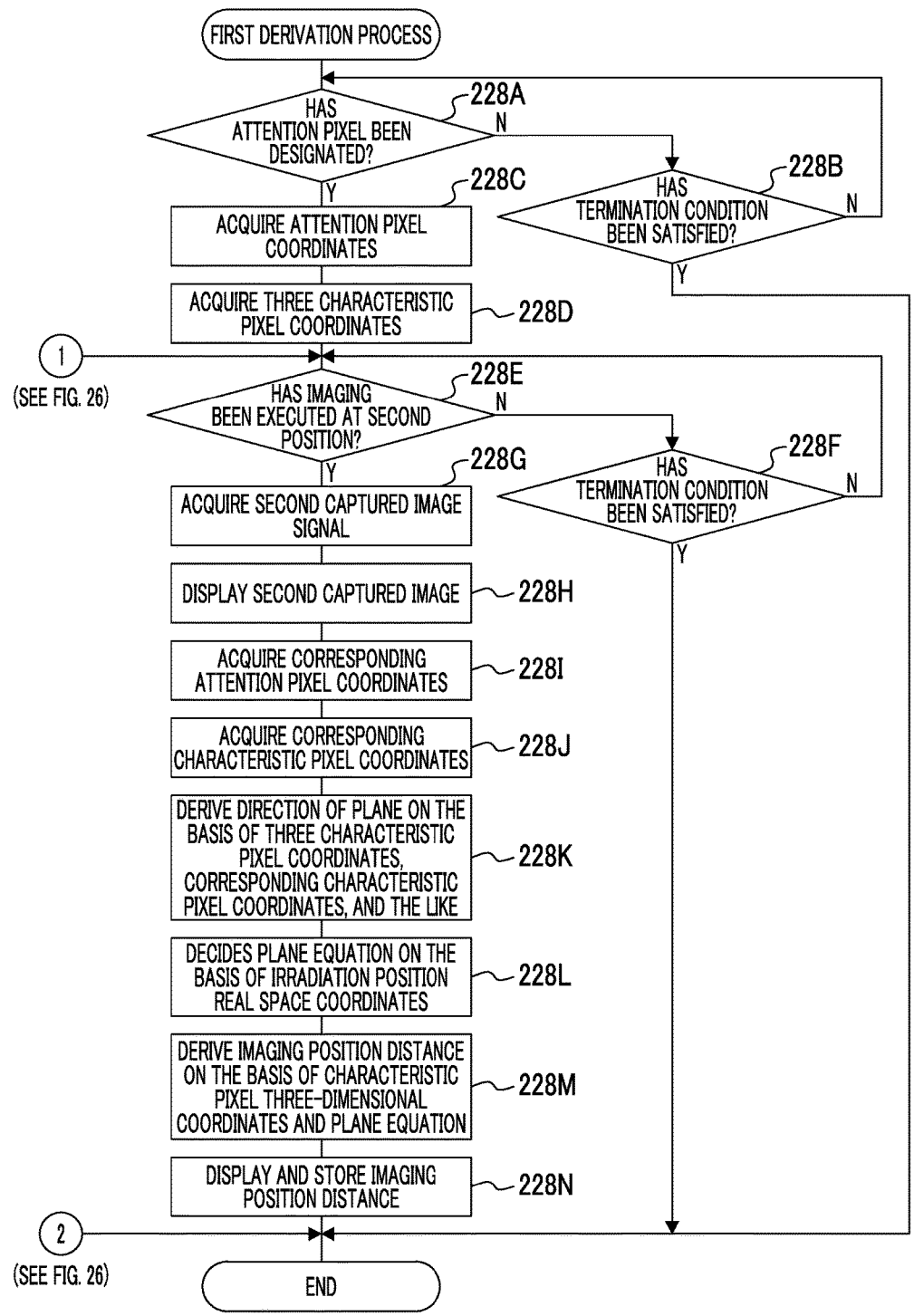
FIG. 13 is a flowchart illustrating an example of a flow of a first derivation process included in the imaging position distance derivation process according to the first embodiment.

In step 228, the execution unit 112 executes the first derivation process illustrated in FIG. 13 as an example.

In the first derivation process illustrated in FIG. 13, first, in step 228A, the acquisition unit 110 determines whether or not an attention pixel has been designated by a user from the first captured image through the touch panel 88. Here, the attention pixel is equivalent to the above-described first designated pixel. Meanwhile, the touch panel 88 receives pixel designation information for designating two-dimensional coordinates corresponding to a pixel included in the first captured image among two-dimensional coordinates given to the touch panel 88. Accordingly, it is determined in step 228A that an attention pixel has been designated in a case where the pixel designation information is received through the touch panel 88. That is, a pixel corresponding to the two-dimensional coordinates designated in accordance with the pixel designation information is an attention pixel.

In step 228A, in a case where an attention pixel has not been designated by the user from the first captured image through the touch panel 88, the determination result is negative, and the process proceeds to step 228B. In step 228A, in a case where an attention pixel has been designated by the user from the first captured image through the touch panel 88, the determination result is positive, and the process proceeds to step 228C.

In step 228B, the acquisition unit 110 determines whether or not a condition for terminating the first derivation process has been satisfied. Meanwhile, in step 228B, the condition for terminating the first derivation process refers to the same condition as the condition described in step 201 described above.

In step 228B, in a case where the condition for terminating the first derivation process has not been satisfied, the determination result is negative, and the process proceeds to step 228A. In step 228B, in a case where the condition for terminating the first derivation process has been satisfied, the determination result is positive, and the first derivation process is terminated. Meanwhile, the determination result in step 228B is positive, the acquisition unit 110 terminates the display of the first captured image and superimposition display information on the display unit 86. Here, the superimposition display information refers to, for example, the distance, the irradiation position mark 136, and the like which are information displayed so as to be superimposed on the first captured image.

Figure 20:
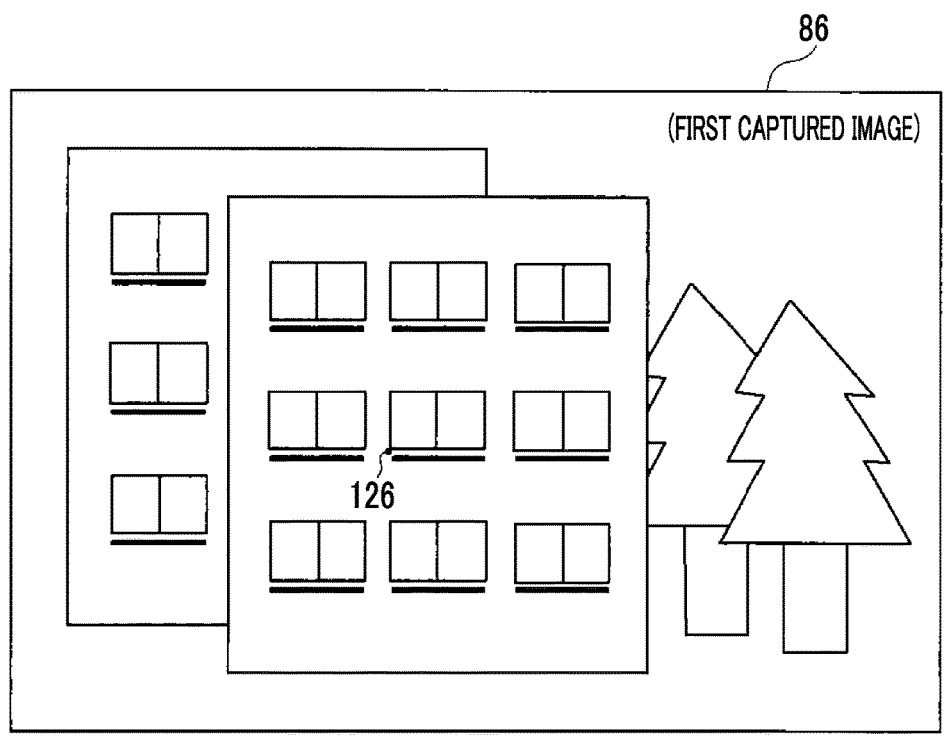
FIG. 20 is a schematic image illustrating an example of a first captured image, obtained by performing imaging using the imaging device according to the first embodiment, in which an attention pixel is designated.

In step 228C, the acquisition unit 110 acquires attention pixel coordinates for specifying an attention pixel 126 (see FIG. 20) which is designated by the user through the touch panel 88 in the first captured image, and then the process proceeds to step 228D. Meanwhile, here, an example of the pixel designated by the user through the touch panel 88 is the attention pixel 126 as illustrated in FIG. 20 as an example. The attention pixel 126 is a pixel at the lower left corner in a front view of an image equivalent to a central window in a second floor of the outer wall surface in the first captured image, as illustrated in FIG. 20 as an example. The central window in the second floor of the outer wall surface indicates a central window 122 in a second floor of the office building 120 among the windows 122 provided on the outer wall surface 121 in the example illustrated in FIG. 15. In addition, the attention pixel coordinates indicate two-dimensional coordinates for specifying the attention pixel 126 in the first captured image.

In step 228D, the acquisition unit 110 acquires three characteristic pixel coordinates for specifying the positions of three characteristic pixels in an outer wall surface image 128 (a hatched region in the example illustrated in FIG. 21) in the first captured image, and then the process proceeds to step 228E. Meanwhile, the "three characteristic pixels" as mentioned herein is an example of "a plurality of pixels" according to the technique of this disclosure.

Here, the outer wall surface image 128 refers to an image showing the outer wall surface 121 (see FIG. 15) in the first captured image. The three characteristic pixels are pixels which are specifiable at positions corresponding to each other in the respective first and second captured images. The three characteristic pixels in the first captured image are pixels which are separated from each other by a predetermined number of pixels and are respectively present at three points specified in accordance with a predetermined rule by image analysis on the basis of a spatial frequency and the like of an image equivalent to a pattern, a building material, or the like in the outer wall surface image 128. For example, three pixels which show different apexes having a maximum spatial frequency within a circular region, which is fixed by a predetermined radius on the basis of the attention pixel 126, and satisfy fixed conditions are extracted as three characteristic pixels. Meanwhile, the three characteristic pixel coordinates are equivalent to the above-described plurality of pixel coordinates.

Figure 21:
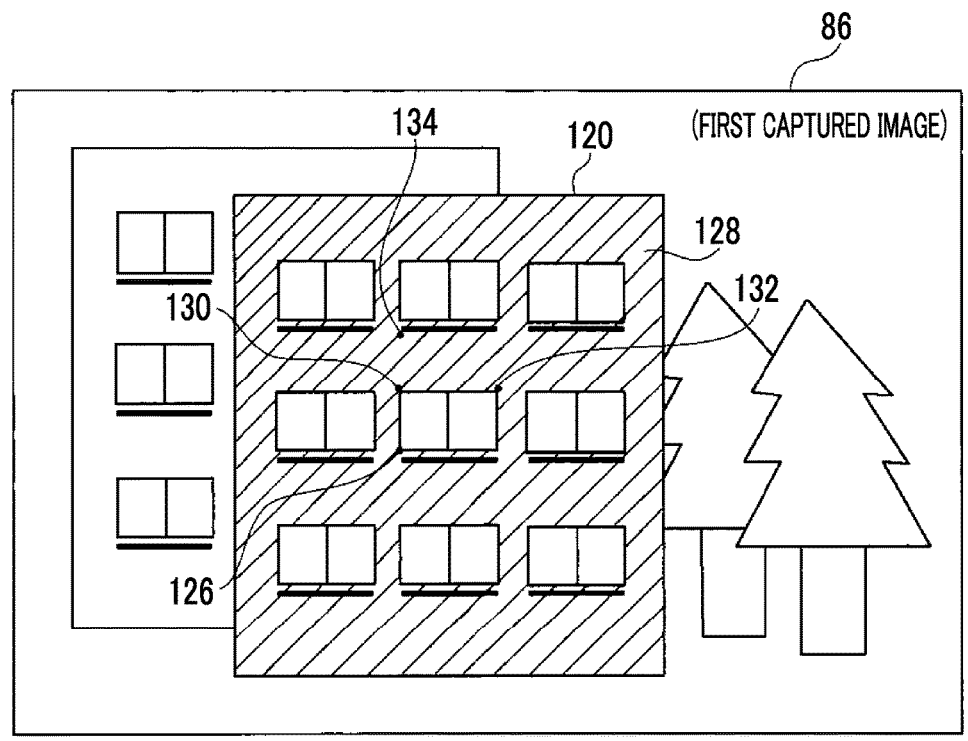
FIG. 21 is a schematic image illustrating an example of a first captured image, obtained by performing imaging using the imaging device according to the first embodiment, in which an attention pixel and first to third pixels are specified.

In the example illustrated in FIG. 21, the three characteristic pixels are a first pixel 130, a second pixel 132, and a third pixel 134. The first pixel 130 is a pixel at the upper left corner in a front view of an image equivalent to a central window in the second floor of the outer wall surface in the outer wall surface image 128. The second pixel 132 is a pixel at the upper right corner in a front view of the image equivalent to the central window in the second floor of the outer wall surface. The third pixel 134 is a pixel at the lower left corner in a front view of an image equivalent to the pattern 124 close to a lower portion of a central window in a third floor of the outer wall surface. Meanwhile, the central window in the third floor of the outer wall surface refers to a central window 122 in the third floor of the office building 120 among the windows 122 provided on the outer wall surface 121, in the example illustrated in FIG. 15.

In step 228E, the acquisition unit 110 determines whether or not imaging has been executed at the second position by the distance measurement device 10A. The second position is a position of a moving destination of the distance measurement device 10A, and may be a position where the outer wall surface 121 can be irradiated with a laser beam and a region including the outer wall surface 121 can be imaged as a subject.

In step 228E, the acquisition unit 110 determines whether or not imaging has been performed at the second position by the distance measurement device 10A. In step 228E, in a case where imaging has not been performed at the second position by the distance measurement device 10A, the determination result is negative, and the process proceeds to step 228F. In step 228E, in a case where imaging has been executed at the second position by the distance measurement device 10A, the determination result is positive, and the process proceeds to step 228G.

In step 228F, the acquisition unit 110 determines whether or not the condition for terminating the first derivation process has been satisfied. Meanwhile, in step 228F, the condition for terminating the first derivation process refers to the same condition as the condition used in step 228B.

In step 228F, in a case where the condition for terminating the first derivation process has not been satisfied, the determination result is negative, and the process proceeds to step 228E. In step 228F, in a case where the condition for terminating the first derivation process has been satisfied, the determination result is positive, and the first derivation process is terminated. Meanwhile, when the determination result in step 228F is positive, the acquisition unit 110 terminates the display of the first captured image and the superimposition display information on the display unit 86.

In step 228G the acquisition unit 110 acquires a second captured image signal indicating the second captured image obtained by executing imaging at the second position, and then the process proceeds to step 228H. Meanwhile, the second captured image is a captured image obtained by performing imaging in a focusing state at the second position.

In step 228H, the acquisition unit 110 displays the acquired second captured image indicated by the second captured image signal on the display unit 86, and then the process proceeds to step 228I.

In step 228I, the acquisition unit 110 specifies a corresponding attention pixel which is a pixel corresponding to the attention pixel 126 among the pixels included in the second captured image and acquires corresponding attention pixel coordinates for specifying the specified corresponding attention pixel, and then the process proceeds to step 228J. Meanwhile, here, the corresponding attention pixel coordinates refer to two-dimensional coordinates for specifying the corresponding attention pixel in the second captured image. In addition, the corresponding attention pixel is specified by executing the existing image analysis, such as pattern matching, by using the first and second captured images as objects to be analyzed. Meanwhile, the corresponding attention pixel is equivalent to the above-described second designated pixel, and is uniquely specified from the second captured image by the execution of the processing of step 228I when the attention pixel 126 is specified from the first captured image.

In step 228J, the acquisition unit 110 specifies three characteristic pixels in an outer wall surface image corresponding to the outer wall surface image 128 (see FIG. 21) in the second captured image and acquires corresponding characteristic pixel coordinates for specifying the specified three characteristic pixels, and then the process proceeds to step 228K. Meanwhile, the corresponding characteristic pixel coordinates refer to two-dimensional coordinates for specifying the three characteristic pixels specified in the second captured image. In addition, the corresponding characteristic pixel coordinates are also two-dimensional coordinates corresponding to the three characteristic pixel coordinates acquired in the processing of step 228D in the second captured image, and are equivalent to the above-described plurality of pixel coordinates. In addition, the three characteristic pixels in the second captured image are specified by executing the existing image analysis, such as pattern matching, by using the first and second captured images as objects to be analyzed, similar to the above-described method of specifying a corresponding attention pixel.

In step 228K, the execution unit 112 derives a, b, and c of the plane equation shown in Expression (6) from the three characteristic pixel coordinates, the corresponding characteristic pixel coordinates, the focal length of the imaging lens 50, and the dimensions of the imaging pixel 60A1 to derive the direction of a plane specified by the plane equation.

Here, the three characteristic pixel coordinates are set to be $(u_{L1}, v_{L1})$, $(u_{L2}, v_{L2})$, and $(u_{L3}, v_{L3})$ and the corresponding characteristic pixel coordinates are set to be $(u_{R1}, v_{R1})$, $(u_{R2}, v_{R2})$, and $(u_{R3}, v_{R3})$, first to third characteristic pixel three-dimensional coordinates are specified by the following Expressions (7) to (9). The first characteristic pixel three-dimensional coordinates refer to three-dimensional coordinates corresponding to $(u_{L1}, v_{L1})$ and $(u_{R1}, v_{R1})$. The second characteristic pixel three-dimensional coordinates refer to three-dimensional coordinates corresponding to $(u_{L2}, v_{L2})$ and $(u_{R2}, v_{R2})$. The third characteristic pixel three-dimensional coordinates indicate three-dimensional coordinates corresponding to $(u_{L3}, v_{L3})$ and $(u_{R3}, v_{R3})$. Meanwhile, in Expressions (7) to (9), "$v_{R1}$", "$v_{R2}$", and "$v_{R3}$" are not used.

first characteristic pixel three-dimensional coordinates (7)
$$\left(\frac{B}{u_{L1} - u_{R1}} u_{L1}, \frac{B}{u_{L1} - u_{R1}} v_{L1}, \frac{B}{u_{L1} - u_{R1}} f\right)$$

second characteristic pixel three-dimensional coordinates (8)
$$\left(\frac{B}{u_{L2} - u_{R2}} u_{L2}, \frac{B}{u_{L2} - u_{R2}} v_{L2}, \frac{B}{u_{L2} - u_{R2}} f\right)$$

third characteristic pixel three-dimensional coordinates (9)
$$\left(\frac{B}{u_{L3} - u_{R3}} u_{L3}, \frac{B}{u_{L3} - u_{R3}} v_{L3}, \frac{B}{u_{L3} - u_{R3}} f\right)$$

In step 228K, the execution unit 112 derives a, b, and c in Expression (6) by optimizing a, b, and c in Expression (6) from three expressions having an equivalence relationship obtained by substituting each of the first to third characteristic pixel three-dimensional coordinates shown in Expressions (7) to (9) for Expression (6). In this manner, the derivation of a, b, and c in Expression (6) means that the direction of the plane specified by the plane equation shown in Expression (6) is derived.

In step 228L, the execution unit 112 decides the plane equation shown in Expression (6) on the basis of the irradiation position real space coordinates derived in the processing of step 206, and then the process proceeds to step 228M. That is, in step 228L, the execution unit 112 substitutes a, b, and c derived in the processing of step 228K and the irradiation position real space coordinates derived in the processing of step 206 for Expression (6) to decide d in Expression (6). Since a, b, and c in Expression (6) are derived in the processing of step 228K, the plane equation shown in Expression (6) is decided when d in Expression (6) is decided in the processing of step 228L.

In step 228M, the execution unit 112 derives an imaging position distance on the basis of the characteristic pixel three-dimensional coordinates and the plane equation, and then the process proceeds to step 228N.

Here, the characteristic pixel three-dimensional coordinates used in the processing of step 228M refers to first characteristic pixel three-dimensional coordinates. Meanwhile, the characteristic pixel three-dimensional coordinates used in the processing of step 228M are not limited to the first characteristic pixel three-dimensional coordinates, and may be second characteristic pixel three-dimensional coordinates or third characteristic pixel three-dimensional coordinates. In addition, the plane equation used in the processing of step 228M refers to the plane equation decided in step 228L.

Accordingly, in step 228M, the characteristic pixel three-dimensional coordinates are substituted for the plane equation, and thus "B" which is an imaging position distance is derived.

Figure 22:
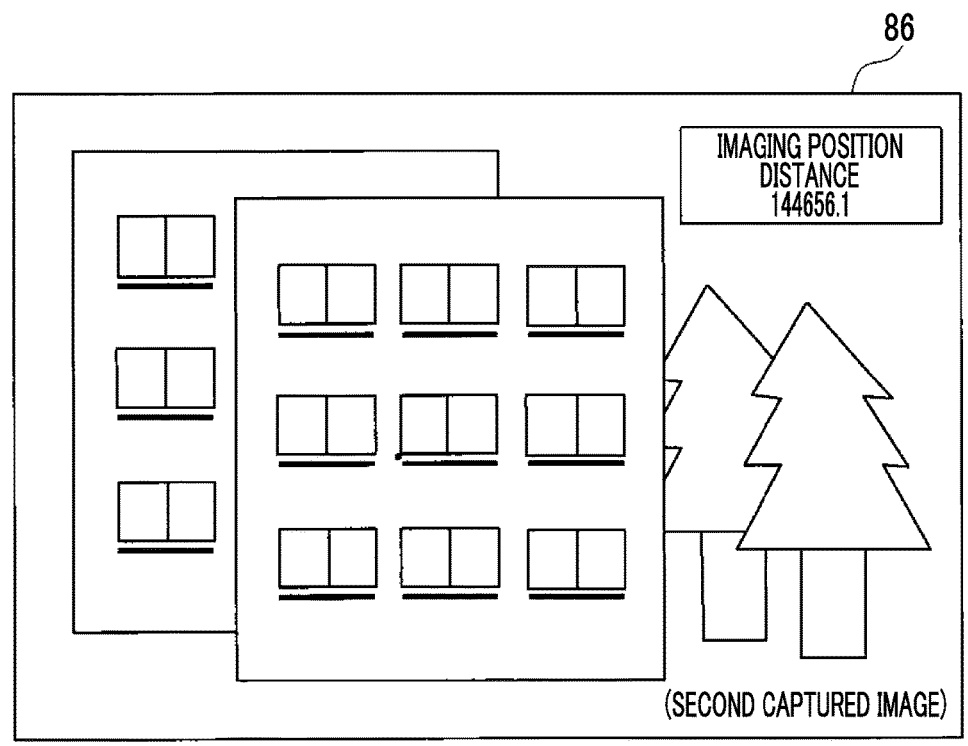
FIG. 22 is a schematic image illustrating an example of a second captured image, obtained by performing imaging using the imaging device according to the first embodiment, on which an imaging position distance is displayed in an overlapping manner.

In step 228N, the control unit 114 displays the imaging position distance, which is derived in the processing of step 228M, on the display unit 86 so as to be superimposed on the second captured image as illustrated in FIG. 22 as an example. In step 228N, the control unit 114 stores the imaging position distance derived in the processing of step 228M in a predetermined storage region, and then terminates the first derivation process. Meanwhile, an example of the predetermined storage region is a storage region of the primary storage unit 102 or a storage region of the secondary storage unit 104.

Meanwhile, in the example illustrated in FIG. 22, a numerical value of "144656.1" corresponds to the imaging position distance calculated in the processing of step 228M, and the unit is millimeter.

Figure 14:
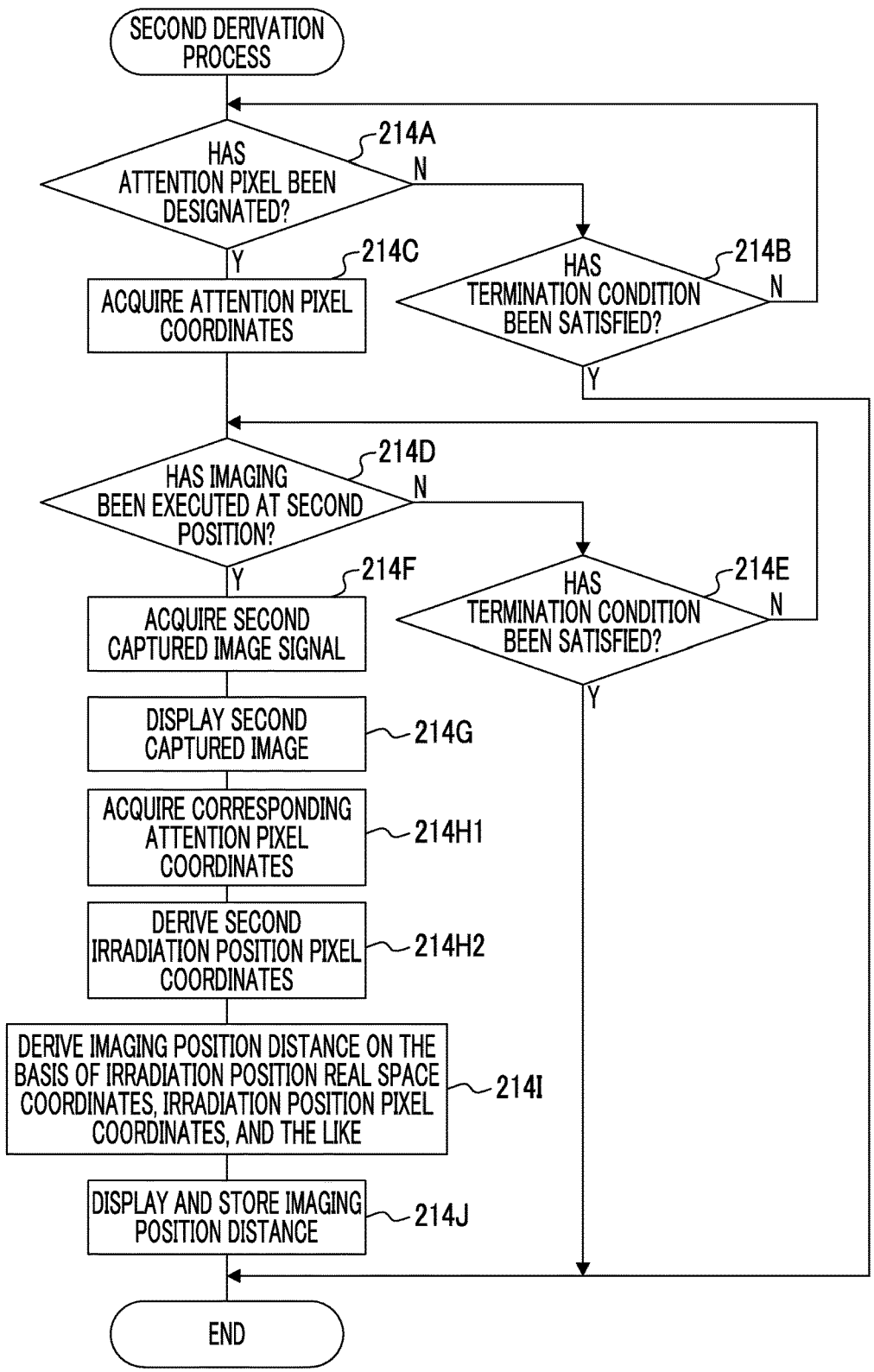
FIG. 14 is a flowchart illustrating an example of a flow of a second derivation process included in the imaging position distance derivation process according to the first embodiment.

On the other hand, in step 214, the execution unit 112 executes the second derivation process illustrated in FIG. 14 as an example.

In the second derivation process illustrated in FIG. 14, first, in step 214A, the acquisition unit 110 determines whether or not an attention pixel has been designated by the user from the first captured image through the touch panel 88.

In step 214A, in a case where an attention pixel has not been designated by the user from the first captured image through the touch panel 88, the determination result is negative, and the process proceeds to step 214B. In step 214A, in a case where an attention pixel has been designated by the user from the first captured image through the touch panel 88, the determination result is positive, and the process proceeds to step 214C.

In step 214B, the acquisition unit 110 determines whether or not the condition for terminating the second derivation process has been satisfied. Meanwhile, in step 214B, the condition for terminating the second derivation process refers to the same condition as the condition described in step 201 described above.

In step 214B, in a case where the condition for terminating the second derivation process has not been satisfied, the determination result is negative, and the process proceeds to step 214A. In step 214B, in a case where the condition for terminating the second derivation process has been satisfied, the determination result is positive, and the second derivation process is terminated. Meanwhile, when the determination result in step 214B is positive, the acquisition unit 110 terminates the display of the first captured image and the superimposition display information on the display unit 86.

In step 214C, the acquisition unit 110 acquires attention pixel coordinates for specifying the attention pixel 126 (see FIG. 20) which is designated by the user in the first captured image through the touch panel 88, and then the process proceeds to step 214D.

In step 214D, in a case where imaging has not been performed at the second position by the distance measurement device 10A, the determination result is negative, and the process proceeds to step 214E. In step 214D, in a case where imaging has been executed at the second position by the distance measurement device 10A, the determination result is positive, and the process proceeds to step 214F.

In step 214E, the acquisition unit 110 determines whether or not the condition for terminating the second derivation process has been satisfied. Meanwhile, in step 214E, the condition for terminating the second derivation process refers to the same condition as the condition used in step 214B.

In step 214E, in a case where the condition for terminating the second derivation process has not been satisfied, the determination result is negative, and the process proceeds to step 214D. In step 214E, in a case where the condition for terminating the second derivation process has been satisfied, the determination result is positive, and the second derivation process is terminated. Meanwhile, when the determination result in step 214E is positive, the acquisition unit 110 terminates the display of the first captured image and the superimposition display information on the display unit 86.

In step 214F, the acquisition unit 110 acquires a second captured image signal indicating a second captured image which is obtained by performing imaging at the second position, and then the process proceeds to step 214G Meanwhile, the second captured image is a captured image obtained by performing imaging at the second position in a focusing state.

In step 214G, the acquisition unit 110 displays the acquired second captured image indicated by the second captured image signal on the display unit 86, and then the process proceeds to step 214H1.

In step 214H1, the acquisition unit 110 specifies a corresponding attention pixel which is a pixel corresponding to the attention pixel 126 among the pixels included in the second captured image and acquires corresponding attention pixel coordinates for specifying the specified corresponding attention pixel, and then the process proceeds to step 214H2.

In step 214H2, the derivation unit 111 derives second irradiation position pixel coordinates, and then the process proceeds to step 214I. That is, in step 214H2, the derivation unit 111 derives coordinates for specifying the position of a pixel corresponding to the position of the pixel which is specified by the first irradiation position pixel coordinates derived in the processing of step 207, among the pixels of the second captured image, as the second irradiation position pixel coordinates.

Meanwhile, the pixel corresponding to the position of the pixel which is specified by the first irradiation position pixel coordinates, among the pixels of the second captured image, is specified by executing the existing image analysis, such as pattern matching, with the first and second captured images as objects to be analyzed, similar to the above-described method of specifying a corresponding attention pixel.

In step 214I, the execution unit 112 derives an imaging position distance on the basis of irradiation position real space coordinates, irradiation position pixel coordinates, a focal length of the imaging lens 50, dimensions of the imaging pixel 60A1, and Expression (1), and then the process proceeds to step 214J.

Here, the irradiation position real space coordinates used in the process of step 214I refer to irradiation position real space coordinates derived in the process of step 206. In addition, the irradiation position pixel coordinates used in the process of step 214I refers to the first irradiation position pixel coordinates derived in the process of step 207 and the second irradiation position pixel coordinates derived in the process of step 214H2.

Accordingly, in step 214I, the irradiation position real space coordinates, the irradiation position pixel coordinates, the focal length of the imaging lens 50, and the dimensions of the imaging pixel 60A1 are substituted for Expression (1), and thus "B" which is an imaging position distance is derived.

In step 214J, the control unit 114 displays the imaging position distance, which is derived in the processing of step 214I, on the display unit 86 so as to be superimposed on the second captured image as illustrated in FIG. 22 as an example. In step 214J, the control unit 114 stores the imaging position distance derived in the processing of step 214I in a predetermined storage region, and then terminates the second derivation process. Meanwhile, an example of the predetermined storage region is the storage region of the primary storage unit 102 or the storage region of the secondary storage unit 104.

In this manner, in the second derivation process, it is not necessary to use the plane equation as in the first derivation process, and the number of parameters used for the derivation of the imaging position distance by the second derivation process is smaller than the number of parameters used for the derivation of the imaging position distance by the first derivation process. For this reason, a load on the derivation of the imaging position distance in the second derivation process is lower than that in the first derivation process. In a case where the real irradiation position of a laser beam is consistent with the position on the real space which corresponds to a specifiable pixel position, the accuracy of derivation of the imaging position distance by the second derivation process becomes higher than the accuracy of derivation of the imaging position distance by the first derivation process.

Next, reference will be made to FIG. 23 to describe a three-dimensional coordinate derivation process realized by the CPU 100 executing the three-dimensional coordinate derivation program 108 in a case where the three-dimensional coordinate derivation button 90G is turned on.

Figure 23:
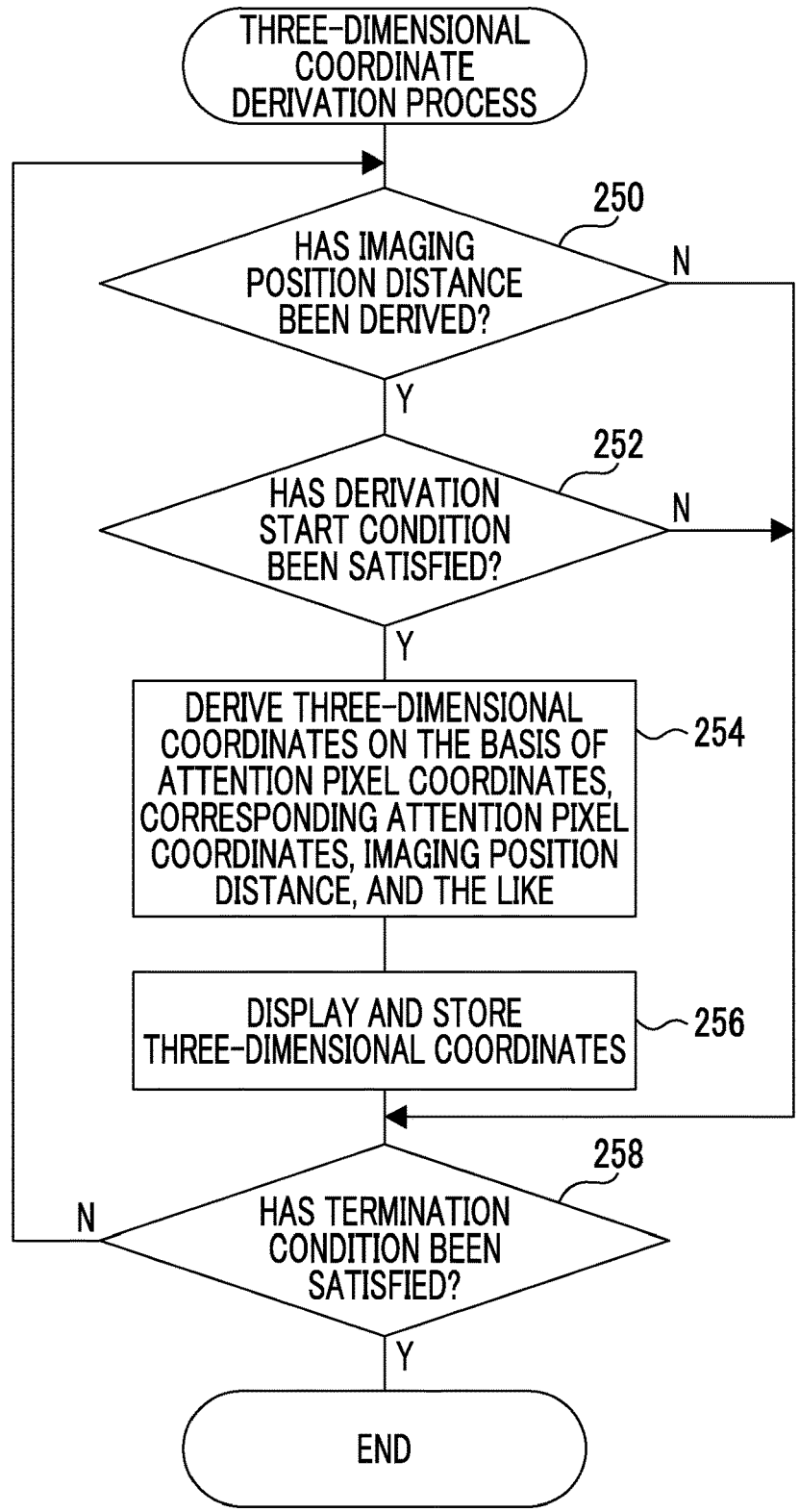
FIG. 23 is a flowchart illustrating an example of a flow of a three-dimensional coordinate derivation process according to the first embodiment.

In the three-dimensional coordinate derivation process illustrated in FIG. 23, first, in step 250, the execution unit 112 determines whether or not an imaging position distance has already been derived in the processing of step 228M included in the first derivation process or the processing of step 214I included in the second derivation process. In step 250, in a case where an imaging position distance has been derived in neither the processing of step 228M included in the first derivation process or the processing of step 214I included in the second derivation process, the determination result is negative, and the process proceeds to step 258. In step 250, in a case where an imaging position distance has already been derived in the processing of step 228M included in the first derivation process or the processing of step 214I included in the second derivation process, the determination result is positive, and the process proceeds to step 252.

In step 252, the execution unit 112 determines whether or not a condition (hereinafter, referred to as a "derivation start condition") for starting the derivation of designated pixel three-dimensional coordinates has been satisfied. An example of the derivation start condition is a condition that an instruction for starting the derivation of the designated pixel three-dimensional coordinates is received through the touch panel 88, or a condition that the imaging position distance is displayed on the display unit 86.

In step 252, in a case where the derivation start condition has not been satisfied, the determination result is negative, and the process proceeds to step 258. In step 252, in a case where the derivation start condition has been satisfied, the determination result is positive, and the process proceeds to step 254.

In step 254, the execution unit 112 derives designated pixel three-dimensional coordinates on the basis of the attention pixel coordinates, the corresponding attention pixel coordinates, the imaging position distance, the focal length of the imaging lens 50, the dimensions of the imaging pixel 60A1, and Expression (1), and then the process proceeds to step 256.

Here, the attention pixel coordinates used in the processing of step 254 refer to the attention pixel coordinates acquired in the processing of step 228C included in the first derivation process or the processing of step 214C included in the second derivation process. In addition, the corresponding attention pixel coordinates used in the processing of step 254 refer to the corresponding attention pixel coordinates acquired in the processing of step 228I included in the first derivation process or the processing of step 214H1 included in the second derivation process. In addition, the imaging position distance used in the processing of step 254 refers to the imaging position distance derived in the processing of step 228M included in the first derivation process or the processing of step 214I included in the second derivation process.

Accordingly, in step 254, the designated pixel three-dimensional coordinates are derived by substituting the attention pixel coordinates, the corresponding attention pixel coordinates, the imaging position distance, the focal length of the imaging lens 50, and the dimensions of the imaging pixel 60A1 for Expression (1).

Figure 24:
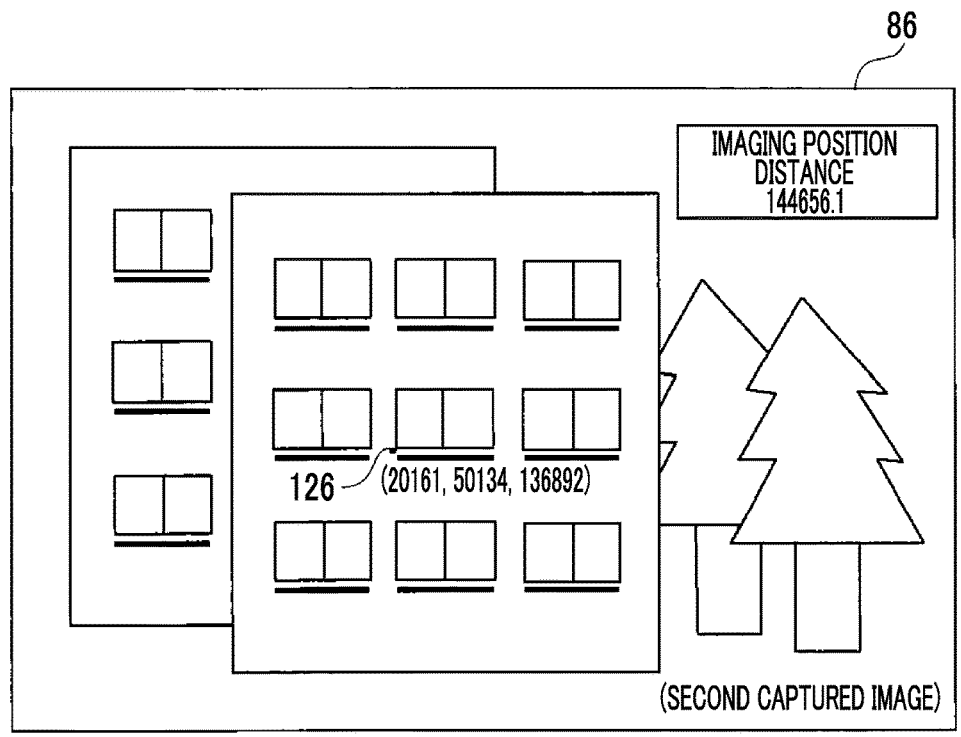
FIG. 24 is a schematic image illustrating an example of a second captured image, obtained by performing imaging using the imaging device according to the first embodiment, on which an imaging position distance and designated pixel three-dimensional coordinates are displayed in an overlapping manner.

In step 256, the control unit 114 displays the designated pixel three-dimensional coordinates derived in the processing of step 254 on the display unit 86 so as to be superimposed on the second captured image, as illustrated in FIG. 24 as an example. In step 256, the control unit 114 stores the designated pixel three-dimensional coordinates derived in the processing of step 254 in a predetermined storage region, and then the process proceeds to step 258. Meanwhile, an example of the predetermined storage region is a storage region of the primary storage unit 102 and a storage region of the secondary storage unit 104.

Meanwhile, in the example illustrated in FIG. 24, (20161, 50134, 136892) corresponds to the designated pixel three-dimensional coordinates derived in the processing of step 254. In the example illustrated in FIG. 24, the designated pixel three-dimensional coordinates are displayed in proximity to the attention pixel 126. Meanwhile, the attention pixel 126 may be emphatically displayed so as to be distinguishable from other pixels.

In step 258, the execution unit 112 determines whether or not a condition for terminating the three-dimensional coordinate derivation process has been satisfied. An example of the condition for terminating the three-dimensional coordinate derivation process is a condition that an instruction for terminating the three-dimensional coordinate derivation process is received through the touch panel 88. Another example of the condition for terminating the three-dimensional coordinate derivation process is a condition that the determination result is not positive in step 250 after the determination result in step 250 is negative and a second predetermined time elapses, and the like. Meanwhile, the second predetermined time refers to, for example, 30 minutes.

In step 258, in a case where the condition for terminating the three-dimensional coordinate derivation process has not been satisfied, the determination result is negative, and the process proceeds to step 250. In step 258, in a case where the condition for terminating the three-dimensional coordinate derivation process has been satisfied, the determination result is positive, and thus the three-dimensional coordinate derivation process is terminated.

As described above, in the distance measurement device 10A, the first derivation process and the second derivation process are executed. The first derivation process is set to be a process of deriving an imaging position distance with a higher level of accuracy than the second derivation process in a case where the real irradiation position of a laser beam is a position on the real space which corresponds to the position of a pixel different from a pixel which is specifiable at positions corresponding to each other in the respective first and second captured images. The second derivation process is set to be a process of deriving an imaging position distance with a higher level of accuracy than the first derivation process in a case where the real irradiation position of a laser beam is a position on the real space which corresponds to the position of a pixel which is specifiable at positions corresponding to each other in the respective first and second captured images. In the distance measurement device 10A, the first derivation process is executed in a case where the position of a pixel which is specified by the irradiation position pixel coordinates derived by the derivation unit 111 is the position of a pixel which is different from the specifiable pixel position. Therefore, according to the distance measurement device 10A, it is possible to derive the imaging position distance with a high level of accuracy, as compared to a case where an irradiation position of a laser beam is not considered.

In the distance measurement device 10A, the second derivation process is executed in a case where the position of a pixel which is specified by the irradiation position pixel coordinates derived by the derivation unit 111 is a specifiable pixel position. Therefore, according to the distance measurement device 10A, it is possible to derive the imaging position distance with a high level of accuracy, as compared to a case where an irradiation position of a laser beam is not considered.

In the distance measurement device 10A, the second derivation process is set to be a process of deriving an imaging position distance on the basis of plural parameters smaller than the number of parameters used in the derivation of the imaging position distance by the first derivation process. Therefore, according to the distance measurement device 10A, it is possible to derive the imaging position distance with a low load, as compared to a case where the imaging position distance is derived by the first derivation process at all times.

In the distance measurement device 10A, the consistency message 137A is displayed on the display unit 86 in a case where the position of the pixel which is specified by the first irradiation position pixel coordinates derived by the derivation unit 111 is a specifiable pixel position. Therefore, according to the distance measurement device 10A, it is possible to make the user recognize that the position of the pixel which is specified by the first irradiation position pixel coordinates derived by the derivation unit 111 is the specifiable pixel position.

In the distance measurement device 10A, the inconsistency message 137B is displayed on the display unit 86 in a case where the position of the pixel which is specified by the first irradiation position pixel coordinates derived by the derivation unit 111 is the position of a pixel which is different from the specifiable pixel position. Therefore, according to the distance measurement device 10A, it is possible to make the user recognize that the position of the pixel which is specified by the first irradiation position pixel coordinates derived by the derivation unit 111 is the position of a pixel which is different from the specifiable pixel position.

In the distance measurement device 10A, designated pixel three-dimensional coordinates are derived on the basis of the imaging position distance derived in the imaging position distance derivation process (see FIG. 23). Therefore, according to the distance measurement device 10A, it is possible to derive the designated pixel three-dimensional coordinates with a high level of accuracy, as compared to a case where the imaging position distance is derived by one kind of derivation process.

In the distance measurement device 10A, the designated pixel three-dimensional coordinates are specified on the basis of the attention pixel coordinates, the corresponding attention pixel coordinates, the imaging position distance, the focal length of the imaging lens 50, and the dimensions of the imaging pixel 60A1 (see Expression (1)). Therefore, according to the distance measurement device 10A, it is possible to derive the designated pixel three-dimensional coordinates with a high level of accuracy, as compared to a case where the designated pixel three-dimensional coordinates are not specified on the basis of the attention pixel coordinates, the corresponding attention pixel coordinates, the imaging position distance, the focal length of the imaging lens 50, and the dimensions of the imaging pixel 60A1.

In the distance measurement device 10A, the direction of a plane specified by the plane equation shown in Expression (6) is derived by the execution unit 112 on the basis of the three characteristic pixel coordinates, the corresponding characteristic pixel coordinates, the focal length of the imaging lens 50, and the dimensions of the imaging pixel 60A1 (step 228K). In addition, the plane equation shown in Expression (6) is decided by the execution unit 112 on the basis of the direction of the plane and the irradiation position real space coordinates derived in the processing of step 206 (step 228L). An imaging position distance is derived by the execution unit 112 on the basis of the decided plane equation and the characteristic pixel three-dimensional coordinates (for example, the first characteristic pixel three-dimensional coordinate) (step 228M). Therefore, according to the distance measurement device 10A, it is possible to derive the imaging position distance with a high level of accuracy, as compared to a case where the imaging position distance is derived without using the plane equation in a case where the position of the pixel which is specified by the irradiation position pixel coordinates derived by the derivation unit 111 is the position of a pixel which is different from a specifiable pixel position.

In the distance measurement device 10A, three characteristic pixel coordinates are acquired by the acquisition unit 110 (step 228D), and corresponding characteristic pixel coordinates are acquired by the acquisition unit 110 (step 228J). An imaging position distance is derived by the execution unit 112 on the basis of the three characteristic pixel coordinates, the corresponding characteristic pixel coordinates, the irradiation position real space coordinates, the focal length of the imaging lens 50, and the dimensions of the imaging pixel 60A1 (step 228M). Therefore, according to the distance measurement device 10A, it is possible to derive the imaging position distance on the basis of the three characteristic pixel coordinates and the corresponding characteristic pixel coordinates with a small number of operations, as compared to a case where the user designates three characteristic pixels in acquiring the three characteristic pixel coordinates and the corresponding characteristic pixel coordinates.

In the distance measurement device 10A, pixel designation information is received through the touch panel 88, a pixel designated on the basis of the received pixel designation information is set to be the attention pixel 126, and attention pixel coordinates are acquired by the acquisition unit 110 (steps 228C and 214C). In addition, a corresponding attention pixel which is a pixel corresponding to the attention pixel 126 is specified by the acquisition unit 110. Corresponding attention pixel coordinates for specifying the corresponding attention pixel are acquired by the acquisition unit 110 (steps 228I and 214H1). Therefore, according to the distance measurement device 10A, it is possible to rapidly determine a designated pixel related to both the first captured image and the second captured image, as compared to a case where the designated pixel related to both the first captured image and the second captured image is designated by the user.

In addition, the distance measurement device 10A includes the distance measurement unit 12 and the distance measurement control unit 68, and a distance to the subject which is measured by the distance measurement unit 12 and the distance measurement control unit 68 is acquired by the acquisition unit 110. Therefore, according to the distance measurement device 10A, it is possible to use the distance acquired by the distance measurement unit 12 and the distance measurement control unit 68 for the derivation of the irradiation position real space coordinates and the irradiation position pixel coordinates.

In addition, the distance measurement device 10A includes the imaging device 14, and the first captured image and the second captured image which are obtained by imaging the subject by the imaging device 14 are acquired by the acquisition unit 110. Therefore, according to the distance measurement device 10A, it is possible to use the first and second captured images, which are obtained by imaging the subject by the imaging device 14, for the derivation of the imaging position distance.

Further, in the distance measurement device 10A, derivation results of the execution unit 112 are displayed by the display unit 86 (see FIGS. 22 and 24). Therefore, according to the distance measurement device 10A, it is possible to make the user easily recognize the derivation results of the execution unit 112, as compared to a case where the derivation results of the execution unit 112 are not displayed by the display unit 86.

Meanwhile, in the first embodiment, the three characteristic pixel coordinates are described, but the technique of this disclosure is not limited thereto. For example, two-dimensional coordinates for specifying each of a predetermined number of pixels more than four characteristic pixels may be adopted instead of the three characteristic pixel coordinates.

In the first embodiment, a description has been given of a case where the attention pixel coordinates are acquired from coordinates on the first captured image and the corresponding attention pixel coordinates are acquired from coordinates on the second captured image, but the technique of this disclosure is not limited thereto. For example, the attention pixel coordinates may be acquired from the coordinates on the second captured image, and the corresponding attention pixel coordinates may be acquired from the coordinates on the first captured image.

In the first embodiment, a description has been given of a case where the three characteristic pixel coordinates are acquired from coordinates on the first captured image and the corresponding characteristic pixel coordinates are acquired from coordinates on the second captured image, but the technique of this disclosure is not limited thereto. For example, the three characteristic pixel coordinates may be acquired from the coordinates on the second captured image, and the corresponding characteristic pixel coordinates may be acquired from the coordinates on the first captured image.

Figure 25:
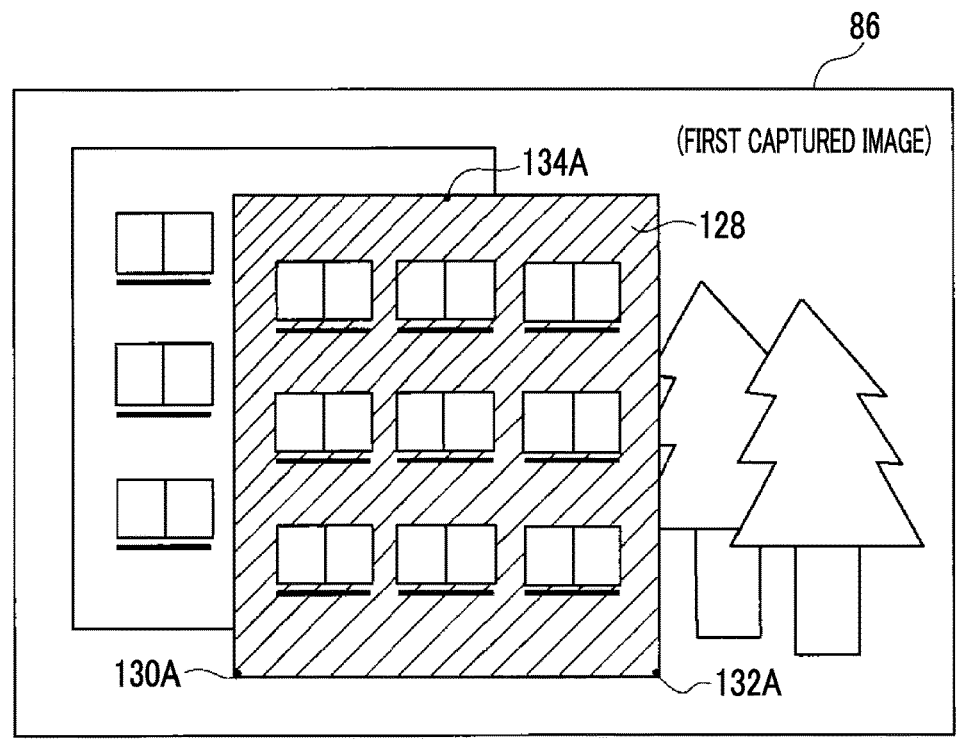
FIG. 25 is a schematic image illustrating an example of a first captured image, obtained by performing imaging using the imaging device according to the first embodiment, in which first to third pixels are specified.

In the first embodiment, a description has been given of a case where two-dimensional coordinates for specifying each of the first pixel 130, the second pixel 132, and the third pixel 134 are acquired by the acquisition unit 110 as three characteristic pixel coordinates, but the technique of this disclosure is not limited thereto. For example, as illustrated in FIG. 25, two-dimensional coordinates for specifying each of a first pixel 130A, a second pixel 132A, and a third pixel 134A may be acquired by the acquisition unit 110. The first pixel 130A, the second pixel 132A, and the third pixel 134A are three pixels for maximizing an area surrounded in the outer wall surface image 128. Meanwhile, the invention is not limited to the three pixels, and the pixels may be a predetermined number of pixels more than three pixels for maximizing an area surrounded in the outer wall surface image 128.

In this manner, in the example illustrated in FIG. 25, three pixels for maximizing an area surrounded in the outer wall surface image 128 are specified as three characteristic pixels, and two-dimensional coordinates related to the specified the three pixels are acquired by the acquisition unit 110 as three characteristic pixel coordinates. In addition, corresponding characteristic pixel coordinates corresponding to the three characteristic pixel coordinates are also acquired by the acquisition unit 110. Therefore, according to the distance measurement device 10A, it is possible to derive an imaging position distance with a high level of accuracy, as compared to a case where three characteristic pixel coordinates for specifying a plurality of pixels not for maximizing an area surrounded and corresponding characteristic pixel coordinates are acquired as three characteristic pixels.

In the first embodiment, a description has been given of a case where the imaging position distance derivation process is realized when the three-dimensional coordinate derivation button 90G is turned on, but the technique of this disclosure is not limited thereto. For example, the imaging position distance derivation process may be executed in a case where the imaging position distance derivation button 90F is turned on. The imaging position distance derivation process described in the first embodiment is an example in a case where the derivation of three-dimensional coordinates is set to be the final purpose.

For this reason, attention pixel coordinates and corresponding attention pixel coordinates which are required in the derivation of three-dimensional coordinates are acquired through the imaging position distance derivation process. However, in a case where only the derivation of an imaging position distance is a purpose, it is not necessary to acquire attention pixel coordinates and corresponding attention pixel coordinates in the imaging position distance derivation process. Accordingly, the execution unit 112 may derive the imaging position distance without acquiring the attention pixel coordinates and the corresponding attention pixel coordinates in a case where the imaging position distance derivation button 90F is turned on, and may then acquire the attention pixel coordinates and the corresponding attention pixel coordinates in a case where the three-dimensional coordinate derivation button 90G is turned on. In this case, the execution unit 112 may acquire the attention pixel coordinates and the corresponding attention pixel coordinates, for example, between the processing of step 252 and the processing of step 254 of the three-dimensional coordinate derivation process illustrated in FIG. 23, and may use the acquired attention pixel coordinates and corresponding attention pixel coordinates in the processing of step 254.

Second Embodiment

In the first embodiment, a description has been given of a case where three characteristic pixel coordinates are acquired with respect to the entire outer wall surface image 128. However, in a second embodiment, a description will be given of a case where three characteristic pixel coordinates are acquired with respect to a portion of the outer wall surface image 128. Meanwhile, in the second embodiment, the same components as those described in the first embodiment will be denoted by the same reference numerals and signs, and a description thereof will be omitted.

A distance measurement device 10B according to the second embodiment is different from the distance measurement device 10A as illustrated in FIG. 6 as an example in that an imaging position distance derivation program 150 is stored in a secondary storage unit 104 instead of the imaging position distance derivation program 106.

The CPU 100 executes the imaging position distance derivation program 150 and a three-dimensional coordinate derivation program 108, and is thus operation as an acquisition unit 154, a derivation unit 111, an execution unit 112, and a control unit 156 (see FIG. 9).

The acquisition unit 154 corresponds to the acquisition unit 110 described in the first embodiment, and the control unit 156 corresponds to the control unit 114 described in the first embodiment. Meanwhile, in the second embodiment, for convenience of description, different portions from the acquisition unit 110 and the control unit 114 described in the first embodiment will be described with regard to the acquisition unit 154 and the control unit 156.

The control unit 156 performs control of displaying a first captured image on a display unit 86 and displaying an outer wall surface image 128 within a display region so as to be distinguishable from the other regions. A touch panel 88 receives region designation information for designating a coordinate acquisition target region in a state where the outer wall surface image 128 is displayed on the display unit 86. Here, the coordinate acquisition target region refers to a partial closed region in the outer wall surface image 128. The region designation information refers to information for designating the coordinate acquisition target region.

The acquisition unit 154 acquires three characteristic pixel coordinates from the coordinate acquisition target region designated in accordance with the region designation information received through the touch panel 88.

Next, a first derivation process included in an imaging position distance derivation process realized by the CPU 100 executing the imaging position distance derivation program 150 will be described with reference to FIG. 26, as the operation of portions of the distance measurement device 10B according to the technique of this disclosure. Meanwhile, the same steps as those in the flowchart illustrated in FIG. 13 will be denoted by the same step numbers, and a description thereof will be omitted.

Figure 26:
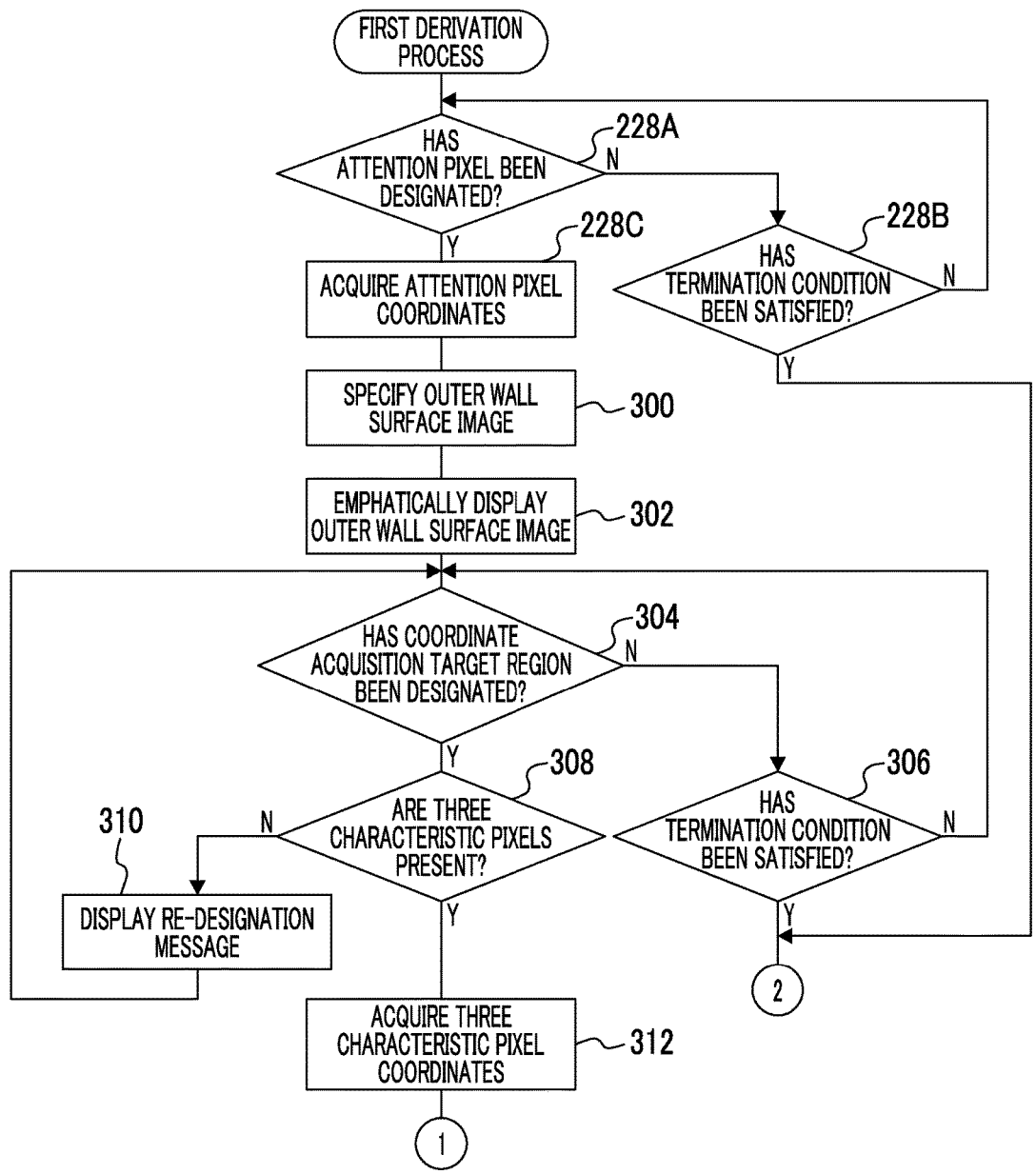
FIG. 26 is a flowchart illustrating an example of a flow of a first derivation process according to the second embodiment.

The flowchart illustrated in FIG. 26 is different from the flowchart illustrated in FIG. 13 in that steps 300 to 312 are provided instead of step 228D.

In step 300 illustrated in FIG. 26, the control unit 156 specifies the outer wall surface image 128 (see FIG. 21) from the first captured image, and then the process proceeds to step 302.

In step 302, the control unit 156 emphatically displays the outer wall surface image 128 specified in the processing of step 300 on the display unit 86 so as to be distinguishable from the other regions within the display region of the first captured image, and then the process proceeds to step 304.

In step 304, the acquisition unit 154 determines whether or not the region designation information has been received through the touch panel 88 and the coordinate acquisition target region has been designated in accordance with the received region designation information.

In step 304, in a case where the coordinate acquisition target region has not been designated in accordance with the region designation information, the determination result is negative, and the process proceeds to step 306. In step 304, in a case where the coordinate acquisition target region has been designated in accordance with the region designation information, the determination result is positive, and the process proceeds to step 308. Although not shown in the drawing, when the determination result in step 304 is positive, the acquisition unit 154 terminates the display of a re-designation message being displayed on the display unit 86 by the execution of the processing of step 310 to be described later.

In step 306, the acquisition unit 154 determines whether or not a condition for terminating the first derivation process has been satisfied. In step 306, in a case where the condition for terminating the first derivation process has not been satisfied, the determination result is negative, and the process proceeds to step 304. In step 306, in a case where the condition for terminating the first derivation process has been satisfied, the determination result is positive, and thus the first derivation process is terminated. Meanwhile, when the determination result in step 306 is positive, the acquisition unit 154 terminates the display of the first captured image and superimposition display information on the display unit 86. The superimposition display information in this case refers to, for example, the distance, the irradiation position mark 136, and the like.

In step 308, the acquisition unit 154 determines whether or not the coordinate acquisition target region 158 (see FIG. 27) designated in accordance with the region designation information received through the touch panel 88 includes the three characteristic pixels described in the first embodiment.

Figure 27:
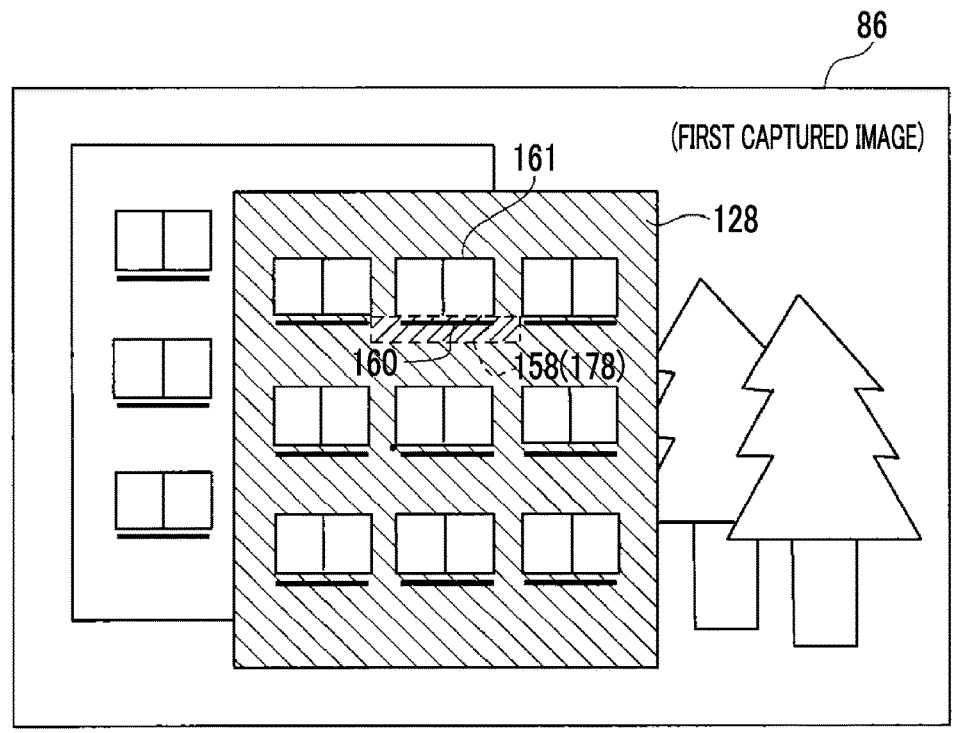
FIG. 27 is a schematic image illustrating an example of a first captured image, obtained by performing imaging using the imaging device according to the second embodiment, in which a coordinate acquisition target region is designated.

As illustrated in FIG. 27 as an example, in a case where the coordinate acquisition target region 158 has been designated in accordance with the region designation information received through the touch panel 88, the coordinate acquisition target region 158 includes a pattern image 160 showing a pattern 124 (see FIG. 15).

Figure 28:
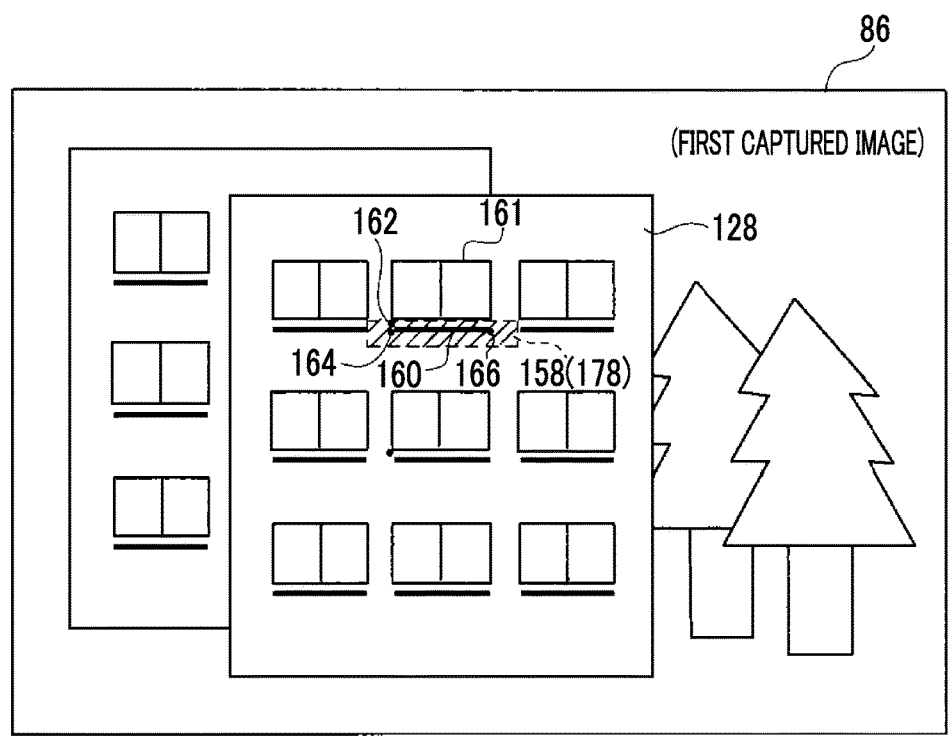
FIG. 28 is a schematic image illustrating an example of a first captured image, obtained by performing imaging using the imaging device according to the second embodiment, in which a coordinate acquisition target region is designated and first to third pixels are designated.

In the example illustrated in FIG. 28, the coordinate acquisition target region 158 includes a first pixel 162, a second pixel 164, and a third pixel 166 as three characteristic pixels. In the example illustrated in FIG. 28, the first pixel 162 is a pixel at the upper left corner in a front view of the pattern image 160, the second pixel 164 is a pixel at the lower left corner in a front view of the pattern image 160, and the third pixel 166 is a pixel at the lower right corner in a front view of the pattern image 160.

In step 308, in a case where the coordinate acquisition target region 158 has been designated in accordance with the region designation information received through the touch panel 88 does not include three characteristic pixels, the determination result is negative, and the process proceeds to step 310. In step 308, in a case where the coordinate acquisition target region 158 has been designated in accordance with the region designation information received through the touch panel 88 includes three characteristic pixels, the determination result is positive, and the process proceeds to step 312. Meanwhile, the case where the determination result in step 308 is positive refers to a case where the coordinate acquisition target region 158 including the pattern image 160 has been designated in accordance with the region designation information received through the touch panel 88, for example, as illustrated in FIG. 27. Although not shown in the drawing, when the determination result in step 308 is positive, the acquisition unit 154 terminates the emphatic display of the outer wall surface image 128 on the display unit 86.

In step 310, the control unit 156 starts the display of a re-designation message, which is superimposed on a predetermined region of the first captured image, on the display unit 86, and then the process proceeds to step 304. The re-designation message refers to, for example, a message of "please designate a closed region including a characteristic pattern, a building material, or the like". Meanwhile, the re-designation message displayed by the execution of the processing of step 310 is set to be in a non-display state when the determination result in step 304 is positive. In addition, here, a case where the re-designation message is visibly displayed has been described. However, the technique of this disclosure is not limited thereto, and audible display such as the output of a sound using a sound reproducing device (not shown) or permanent visible display such as the output of printed matter using a printer may be performed instead of the visible display or may be performed in combination.

In step 312, the acquisition unit 154 acquires three characteristic pixel coordinates for specifying three characteristic pixels in the coordinate acquisition target region 158 designated in accordance with the region designation information received through the touch panel 88, and then the process proceeds to step 214. Meanwhile, in the example illustrated in FIG. 28, the processing of step 312 is executed, and thus two-dimensional coordinates for specifying each of the first pixel 162, the second pixel 164, and the third pixel 166 are acquired by the acquisition unit 154 as three characteristic pixel coordinates. Although not shown in the drawing, the first captured image and the superimposition display information are set to be in a non-display state when the processing of step 312 is executed.

As described above, in the distance measurement device 10B, the outer wall surface image 128 is displayed on the display unit 86 so as to be distinguishable from the other regions in the first captured image. In addition, the region designation information is received through the touch panel 88, and a coordinate acquisition target region which is a portion of the outer wall surface image 128 is designated in accordance with the received region designation information. In a case where the coordinate acquisition target region includes three characteristic pixels, the three characteristic pixel coordinates for specifying the three characteristic pixels are acquired by the acquisition unit 154 (step 312), and corresponding characteristic pixel coordinates corresponding to the three characteristic pixel coordinates are also acquired (step 228). Therefore, according to the distance measurement device 10B, it is possible to acquire the three characteristic pixel coordinates and the corresponding characteristic pixel coordinates with a small load, as compared to a case where the three characteristic pixel coordinates and the corresponding characteristic pixel coordinates are acquired with respect to the entire outer wall surface image 128.

Third Embodiment

In the above-described embodiments, a description has been given of a case where three characteristic pixels are searched for and specified within a specific image through-image analysis. However, in a third embodiment, a description will be given of a case where three characteristic pixels are designated in accordance with an operation to the touch panel 88. Meanwhile, in the third embodiment, the same components as those described in the above-described embodiments will be denoted by the same reference numerals and signs, and a description thereof will be omitted.

A distance measurement device 10C according to the third embodiment is different from the distance measurement device 10A in that an imaging position distance derivation program 168 is stored in a secondary storage unit 104 instead of the imaging position distance derivation program 106.

A CPU 100 executes the imaging position distance derivation program 168 and a three-dimensional coordinate derivation program 108, and is thus operation as an acquisition unit 172, a derivation unit 111, an execution unit 174, and a control unit 176 as illustrated in FIG. 9 as an example.

The acquisition unit 172 corresponds to the acquisition unit 110 (154) described in the above-described embodiments, the execution unit 174 corresponds to the execution unit 112 described in the first embodiment, and the control unit 176 corresponds to the control unit 114 (156) described in the above-described embodiments. Meanwhile, in the third embodiment, for convenience of description, different portions from the acquisition unit 110 (154), the execution unit 112, and the control unit 114 (156) described in the above-described embodiments will be described with regard to the acquisition unit 172, the execution unit 174, and the control unit 176.

The touch panel 88 receives the pixel designation information which is described in the first embodiment in a case where each of a first captured image and a second captured image is displayed on a display unit 86. In addition, the touch panel 88 also receives the pixel designation information which is described in the first embodiment even when the second captured image is displayed on the display unit 86.

In a case where the first captured image is displayed on the display unit 86, the acquisition unit 172 acquires first characteristic pixel coordinates which are two-dimensional coordinates for specifying each of three characteristic pixels designated in accordance with the pixel designation information received through the touch panel 88. The first characteristic pixel coordinates are two-dimensional coordinates corresponding to the three characteristic pixel coordinates described in the first embodiment.

In a case where the second captured image is displayed on the display unit 86, the acquisition unit 172 acquires second characteristic pixel coordinates which are two-dimensional coordinates for specifying each of three characteristic pixels designated in accordance with the pixel designation information received through the touch panel 88. The second characteristic pixel coordinates are two-dimensional coordinates corresponding to the corresponding characteristic pixel coordinates described in the first embodiment.

The execution unit 174 derives an imaging position distance on the basis of attention pixel coordinates, corresponding attention pixel coordinates, first characteristic pixel coordinates, second characteristic pixel coordinates, irradiation position real space coordinates, a focal length of an imaging lens 50, and a dimension of an imaging pixel 60A1.

Next, a first derivation process included in an imaging position distance derivation process realized by the CPU 100 executing an imaging position distance derivation program 150 will be described with reference to FIGS. 29 and 30, as the operation of portions of the distance measurement device 10C according to the technique of this disclosure. Meanwhile, the same steps as those in the flowchart illustrated in FIGS. 13 and 26 will be denoted by the same step numbers, and a description thereof will be omitted.

Figure 29:
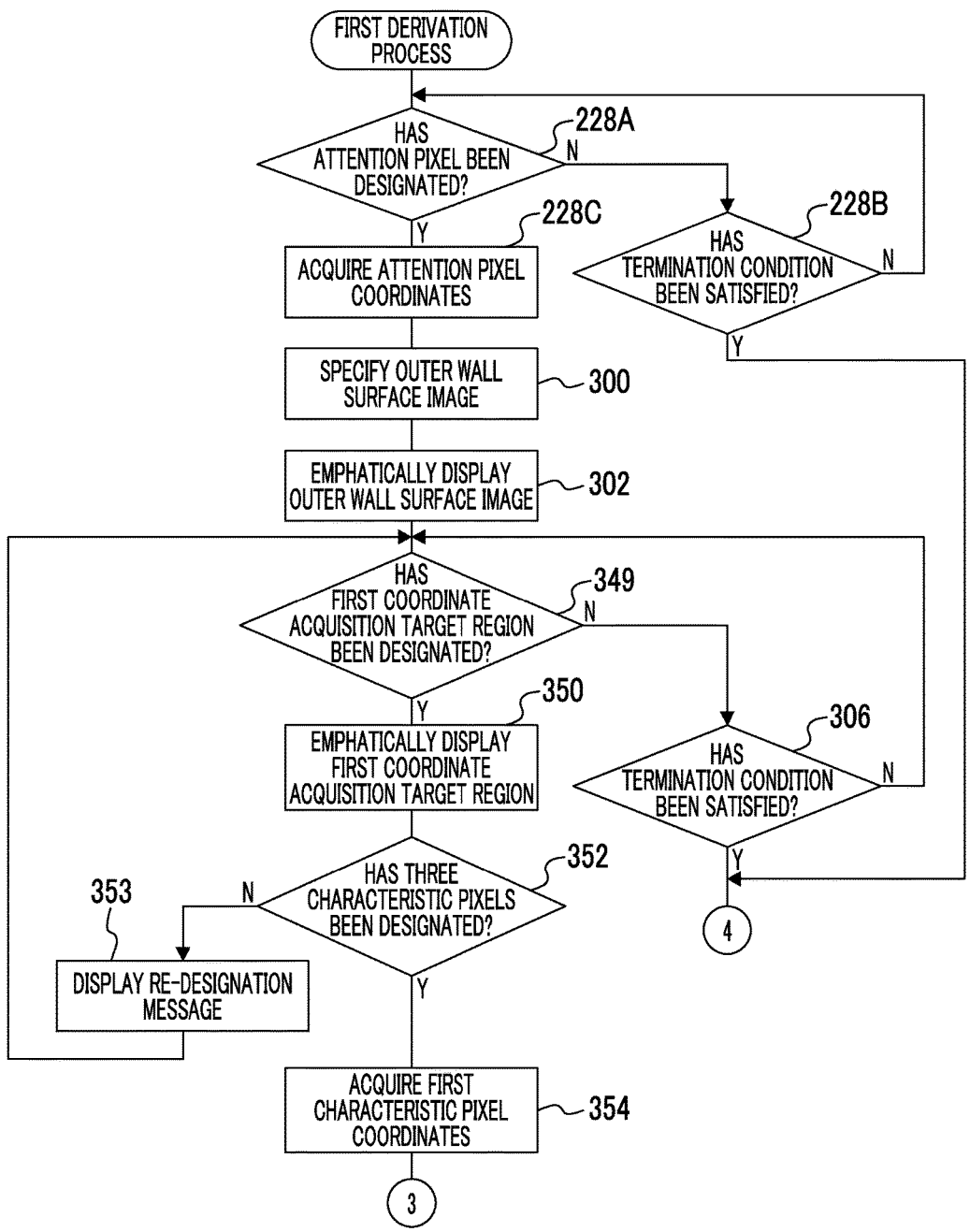
FIG. 29 is a flowchart illustrating an example of a flow of a first derivation process according to the third embodiment.

The flowchart illustrated in FIG. 29 is different from the flowchart illustrated in FIG. 26 in that step 349 is provided instead of step 304. In addition, the flowchart illustrated in FIG. 29 is different from the flowchart illustrated in FIG. 26 in that steps 350 and 352 are provided instead of step 308. In addition, the flowchart illustrated in FIG. 29 is different from the flowchart illustrated in FIG. 26 in that step 353 is provided instead of step 310. In addition, the flowchart illustrated in FIG. 29 is different from the flowchart illustrated in FIG. 26 in that step 354 is provided instead of step 312. Further, the flowchart illustrated in FIG. 30 is different from the flowchart illustrated in FIG. 13 in that steps 356 to 372 are provided instead of steps 228J and 228K.

In step 349, the acquisition unit 172 determines whether or not the region designation information has been received through the touch panel 88 and a first coordinate acquisition target region 178 (see FIG. 27) has been designated in accordance with the received region designation information. Meanwhile, the first coordinate acquisition target region is a region corresponding to the coordinate acquisition target region 158 described in the second embodiment.

In step 349, in a case where the first coordinate acquisition target region 178 has not been designated in accordance with the region designation information, the determination result is negative, and the process proceeds to step 306. In step 349, in a case where the first coordinate acquisition target region 178 has been designated in accordance with the region designation information, the determination result is positive, and the process proceeds to step 350. Although not shown in the drawing, the acquisition unit 172 terminates the display of the re-designation message, being displayed on the display unit 86 by the execution of the processing of step 353 to be described later, on the display unit 86 when the determination result in step 349 is positive.

In step 350, the control unit 176 emphatically displays the first coordinate acquisition target region 178, which is designated in accordance with the region designation information received by the touch panel, 88 on the display unit 86 so as to be distinguishable from the other regions within the display region of the first captured image. Although not shown in the drawing, pixel designation information is received through the touch panel 88 in this embodiment, and three pixels are designated on the basis of the received pixel designation information. When the three pixels are designated, the emphatic display of the first coordinate acquisition target region 178 is terminated.

In the next step 352, the acquisition unit 172 determines whether or not three characteristic pixels have been designated in accordance with the pixel designation information received through the touch panel 88.

As illustrated in FIG. 27 as an example, in a case where the first coordinate acquisition target region 178 has been designated in accordance with the region designation information received through the touch panel 88, the first coordinate acquisition target region 178 includes a pattern image 160. In this case, the three characteristic pixels refer to a first pixel 162, a second pixel 164, and a third pixel 166 which are pixels positioned at three corners of the pattern image 160, as illustrated in FIG. 28 as an example.

In step 352, in a case where the three characteristic pixels have not been designated in accordance with the pixel designation information received through the touch panel 88, the determination result is negative, and the process proceeds to step 353. In step 352, in a case where the three characteristic pixels have been designated in accordance with the pixel designation information received through the touch panel 88, the determination result is positive, and the process proceeds to step 354. Although not shown in the drawing, the acquisition unit 172 terminates the emphatic display of the outer wall surface image 128 on the display unit 86 when the determination result in step 352 is positive.

In step 353, the control unit 176 starts the display of a re-designation message, which is superimposed on a predetermined region of the first captured image, on the display unit 86, and then the process proceeds to step 349. The re-designation message according to the third embodiment refers to, for example, a message of "please designate a closed region including a characteristic pattern, a building material, or the like and then designate three characteristic pixels". The re-designation message displayed by the execution of the processing of step 353 is set to be in a non-display state when the determination result in step 349 is positive.

Figure 30:
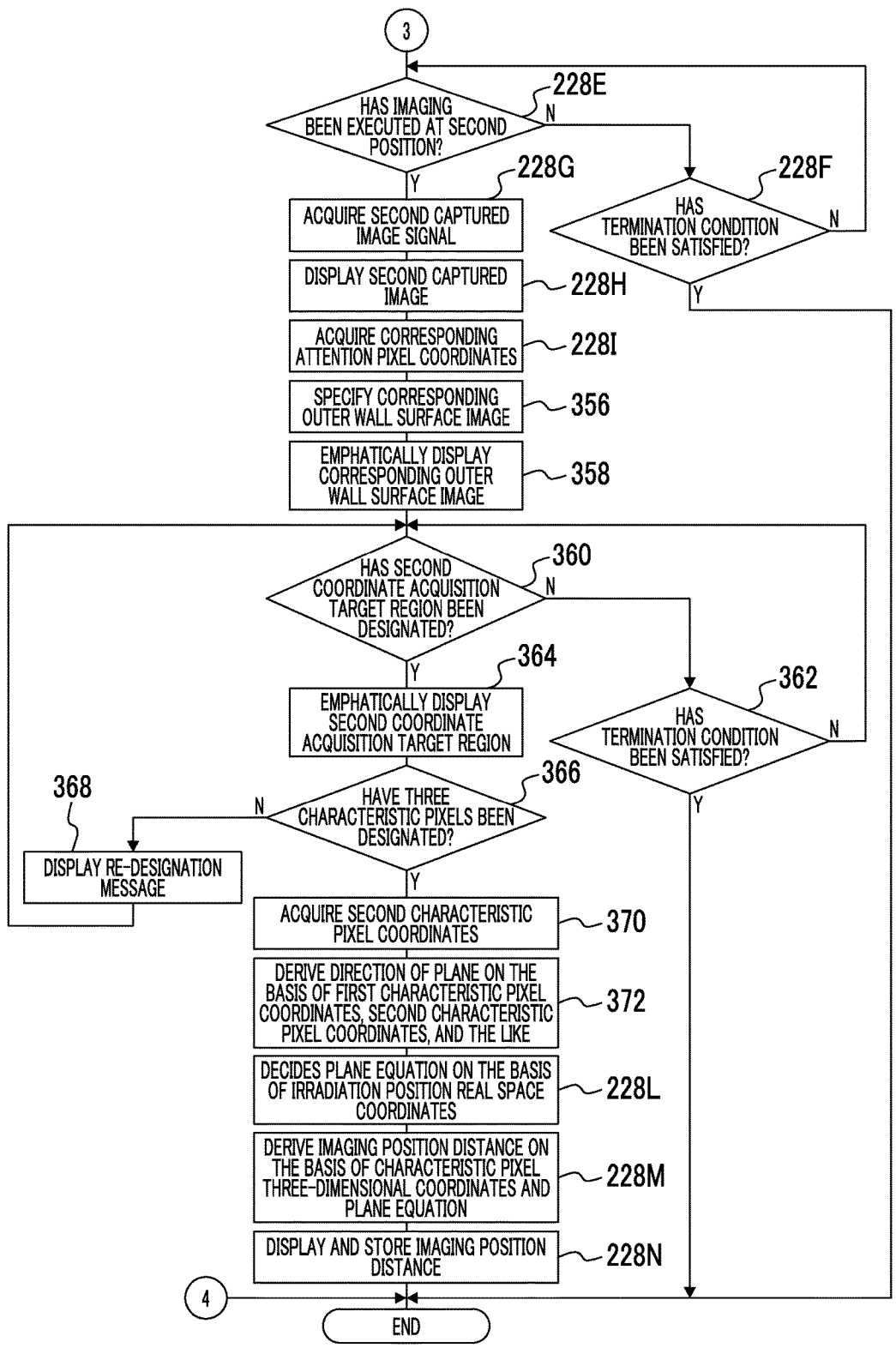
FIG. 30 is the continuation of the flowchart illustrated in FIG. 29.

In step 354, the acquisition unit 172 acquires first characteristic pixel coordinates for specifying the three characteristic pixels designated in accordance with the pixel designation information received through the touch panel 88, and then the process proceeds to step 228E illustrated in FIG. 30. Meanwhile, in the example illustrated in FIG. 28, the processing of step 354 is executed, and thus two-dimensional coordinates for specifying each of the first pixel 162, the second pixel 164, and the third pixel 166 are acquired by the acquisition unit 172 as the first characteristic pixel coordinates. Although not shown in the drawing, the first captured image and the superimposition display information are set to be in a non-display state when the processing of step 354 is executed.

In step 356 illustrated in FIG. 30, the control unit 176 specifies a corresponding outer wall surface image which is an outer wall surface image corresponding to the outer wall surface image 128 from the second captured image, and then the process proceeds to step 358.

In step 358, the control unit 176 emphatically displays the corresponding outer wall surface image specified in the processing of step 356 on the display unit 86 so as to be distinguishable from the other regions within a display region of the second captured image, and then the process proceeds to step 360.

In step 360, the acquisition unit 172 determines whether or not the region designation information has been received through the touch panel 88 and a second coordinate acquisition target region has been designated in accordance with the received region designation information. Meanwhile, the second coordinate acquisition target region is a region designated by the user through the touch panel 88 as a region corresponding to the first coordinate acquisition target region 178 (see FIG. 28) in the second captured image.

In step 360, in a case where the second coordinate acquisition target region has not been designated in accordance with the region designation information, the determination result is negative, and the process proceeds to step 362. In step 360, in a case where the second coordinate acquisition target region has been designated in accordance with the region designation information, the determination result is positive, and the process proceeds to step 364.

In step 362, the acquisition unit 172 determines whether or not a condition for terminating the first derivation process has been satisfied. In step 362, in a case where the condition for terminating the first derivation process has not been satisfied, the determination result is negative, and the process proceeds to step 360. In step 362, in a case where the condition for terminating the first derivation process has been satisfied, the determination result is positive, and thus the first derivation process is terminated. Meanwhile, when the determination result in step 362 is positive, the acquisition unit 172 terminates the display of the second captured image on the display unit 86.

In step 364, the control unit 176 emphatically displays the second coordinate acquisition target region, which is designated in accordance with the region designation information received through the touch panel 88, on the display unit 86 so as to be distinguishable from the other regions within the display region of the second captured image. Although not shown in the drawing, pixel designation information is received through the touch panel 88 in this embodiment, and three pixels are designated on the basis of the received pixel designation information. When the three pixels are designated, the emphatic display of the second coordinate acquisition target region is terminated.

In step 366, the acquisition unit 172 determines whether or not three characteristic pixels have been designated in accordance with the pixel designation information received through the touch panel 88.

In a case where the second coordinate acquisition target region has been designated in accordance with the region designation information received through the touch panel 88, the second coordinate acquisition target region includes a pattern image corresponding to the pattern image 160. In this case, the three characteristic pixels are pixels positioned at three corners of the pattern image corresponding to the pattern image 160 in the second captured image. The pixels positioned at the three corners of the pattern image corresponding to the pattern image 160 refer to, for example, a pixel corresponding to the first pixel 162, a pixel corresponding to the second pixel 164, and a pixel corresponding to the third pixel 166 in the second captured image.

In step 366, in a case where the three characteristic pixels have not been designated in accordance with the pixel designation information received through the touch panel 88, the determination result is negative, and the process proceeds to step 368. In step 366, in a case where the three characteristic pixels have been designated in accordance with the pixel designation information received through the touch panel 88, the determination result is positive, and the process proceeds to step 370.

In step 368, the control unit 176 starts the display of the re-designation message, superimposed on a predetermined region of the second captured image, according to the third embodiment on the display unit 86, and then the process proceeds to step 360. Meanwhile, the re-designation message displayed by the execution of the processing of step 368 is set to be in a non-display state when the determination result in step 360 is positive.

In step 370, the acquisition unit 172 acquires second characteristic pixel coordinates for specifying the three characteristic pixels designated in accordance with the pixel designation information received through the touch panel 88, and then the process proceeds to step 372. Meanwhile, in step 370, two-dimensional coordinates for specifying each of the pixel corresponding to the first pixel 162, the pixel corresponding to the second pixel 164, and the pixel corresponding to the third pixel 166 are acquired by the acquisition unit 172 as the second characteristic pixel coordinates, for example, in the second captured image.

In step 372, the execution unit 174 derives a, b, and c of the plane equation shown in Expression (6) from the first characteristic pixel coordinates, the second characteristic pixel coordinates, the focal length of the imaging lens 50, and the dimensions of the imaging pixel 60A1 to derive the direction of a plane specified by the plane equation. Meanwhile, the first characteristic pixel coordinates used in the processing of step 372 are the first characteristic pixel coordinates acquired in the processing of step 354, and are equivalent to the three characteristic pixel coordinates described in the first embodiment. In addition, the second characteristic pixel coordinates used in the processing of step 372 are the second characteristic pixel coordinates acquired in the processing of step 370, and are equivalent to the corresponding characteristic pixel coordinates described in the first embodiment.

As described above, in the distance measurement device 10C, the three characteristic pixels are designated through the touch panel 88 in the first captured image, and the first characteristic pixel coordinates for specifying the designated three characteristic pixels are acquired by the acquisition unit 172 (step 354). In addition, the three characteristic pixels corresponding to the three characteristic pixels of the first captured image are designated through the touch panel 88 in the second captured image (step 366: Y). In addition, the second characteristic pixel coordinates for specifying the three characteristic pixels designated through the touch panel 88 in the second captured image are acquired by the acquisition unit 172 (step 370). An imaging position distance is derived by the execution unit 174 on the basis of the attention pixel coordinates, the corresponding attention pixel coordinates, the first characteristic pixel coordinates, the second characteristic pixel coordinates, the focus position coordinates, the focal length of the imaging lens 50, and the dimensions of the imaging pixel 60A1. Therefore, according to the distance measurement device 10C, it is possible to derive the imaging position distance on the basis of the first characteristic pixel coordinates and the second characteristic pixel coordinates which are acquired in accordance with the user's intention.

Fourth Embodiment

In the above-described embodiments, a description has been given of a case where distance measurement is performed at a first position out of the first position and a second position, but a description will be given of a case where distance measurement is also performed at the second position in a fourth embodiment. Meanwhile, in the fourth embodiment, the same components as those described in the above-described embodiments will be denoted by the same reference numerals and signs, and a description thereof will be omitted.

A distance measurement device 10D according to the fourth embodiment is different from the distance measurement device 10A in that an imaging position distance derivation program 180 is stored in a secondary storage unit 104 instead of an imaging position distance derivation program 106. In addition, the distance measurement device 10D is different from the distance measurement device 10A in that a three-dimensional coordinate derivation program 181 is stored in the secondary storage unit 104 instead of a three-dimensional coordinate derivation program 108.

A CPU 100 executes the imaging position distance derivation program 180 and a three-dimensional coordinate derivation program 181, and is thus operation as an acquisition unit 182, a derivation unit 111, an execution unit 184, and a control unit 185 as illustrated in FIG. 9 as an example.

The acquisition unit 182 corresponds to the acquisition unit 154 described in the second embodiment, the execution unit 184 corresponds to the execution unit 112 described in the first embodiment, and the control unit 185 corresponds to the control unit 156 described in the second embodiment. Meanwhile, in the fourth embodiment, for convenience of description, different portions from the acquisition unit 154 described in the second embodiment will be described with regard to the acquisition unit 182. In the fourth embodiment, for convenience of description, different portions from the execution unit 112 described in the first embodiment will be described with regard to the execution unit 184. Further, in the fourth embodiment, for convenience of description, different portions from the control unit 156 described in the second embodiment will be described with regard to the control unit 185.

The acquisition unit 182 further acquires a reference distance, as compared to the acquisition unit 154. The "reference distance" as mentioned herein refers to a distance which is measured on the basis of a laser beam emitted by a distance measurement unit 12 at a second measurement position.

The execution unit 184 derives a reference imaging position distance which is a distance between a first imaging position and a second imaging position, on the basis of attention pixel coordinates, three characteristic pixel coordinates, reference irradiation position real space coordinates, a focal length of an imaging lens 50, and a dimension of an imaging pixel 60A1. The execution unit 184 adjusts the imaging position distance with reference to the derived reference imaging position distance to derive a final imaging position distance which is finally adopted as the distance between the first imaging position and the second imaging position.

In addition, the execution unit 184 derives designated pixel three-dimensional coordinates on the basis of the derived final imaging position distance. The final designated pixel real space coordinates refer to three-dimensional coordinates which are finally adopted as the three-dimensional coordinates which are coordinates on the real space of an attention pixel 126 which is an example of a designated pixel according to the technique of this disclosure.

Next, a first derivation process included in an imaging position distance derivation process realized by the CPU 100 executing the imaging position distance derivation program 180 will be described with reference to FIG. 31, as the operation of portions of the distance measurement device 10D according to the technique of this disclosure. Meanwhile, the same steps as those in the flowchart illustrated in FIG. 13 will be denoted by the same step numbers, and a description thereof will be omitted.

Figure 31:
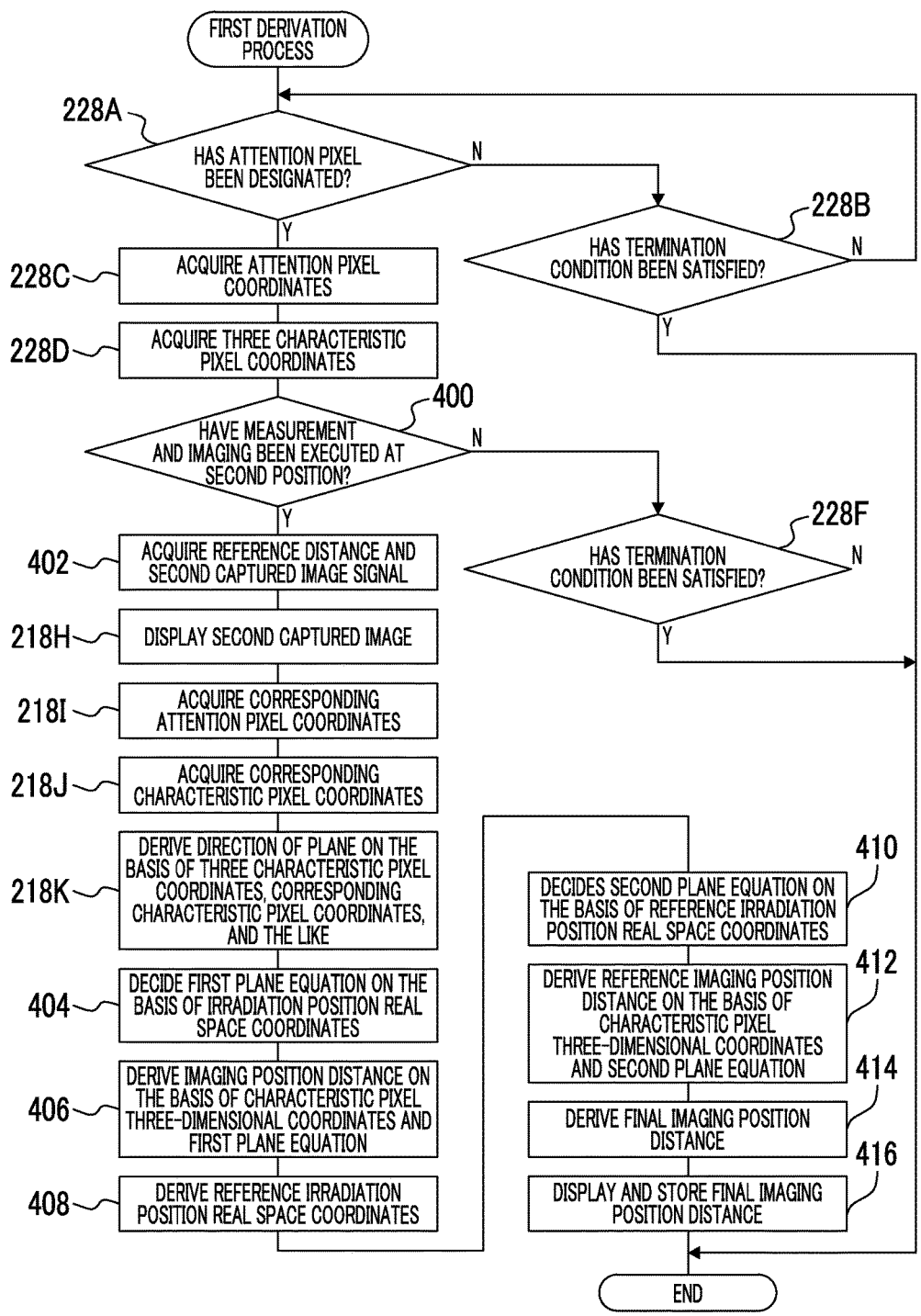
FIG. 31 is a flowchart illustrating an example of a flow of a first derivation process according to the fourth embodiment.

The flowchart illustrated in FIG. 31 is different from the flowchart illustrated in FIG. 13 in that steps 400 and 402 are provided instead of steps 228E and 228G In addition, the flowchart illustrated in FIG. 31 is different from the flowchart illustrated in FIG. 13 in that steps 404 to 416 are provided instead of steps 228L to 228N.

In step 400 illustrated in FIG. 31, the acquisition unit 182 determines whether or not measurement and imaging of a distance at the second position have been executed by the distance measurement device 10D. In step 400, in a case where measurement and imaging of a distance at the second position have not been executed by the distance measurement device 10D, the determination result is negative, and the process proceeds to step 228F. In step 400, in a case where measurement and imaging of a distance at the second position have been executed by the distance measurement device 10D, the determination result is positive, and the process proceeds to step 402.

In step 402, the acquisition unit 182 acquires a reference distance which is a distance measured at the second position and a second captured image signal indicating a second captured image which is obtained by performing imaging at the second position, and then the process proceeds to step 218H.

In step 404, the execution unit 184 decides a first plane equation which is the plane equation shown in Expression (6) on the basis of the irradiation position real space coordinates derived in the processing of step 206, and then the process proceeds to step 406.

In step 406, the execution unit 184 derives an imaging position distance on the basis of the characteristic pixel three-dimensional coordinates and the first plane equation, and then the process proceeds to step 408.

In step 408, the execution unit 184 derives reference irradiation position real space coordinates on the basis of Expression (2) from the reference distance acquired by the acquisition unit 182 in the processing of step 402, a half angle of view α, an emission angle β, and a distance between reference points M, and then the process proceeds to step 410. Meanwhile, the reference distance used in the processing of step 408 is a distance corresponding to the distance L described in the first embodiment.

In step 410, the execution unit 184 decides a second plane equation which is the plane equation shown in Expression (6) on the basis of the reference irradiation position real space coordinates derived in the processing of step 408, and then the process proceeds to step 412. That is, in step 410, the execution unit 184 substitutes a, b, and c derived in the processing of step 228K and the reference irradiation position real space coordinates derived in the processing of step 408 for Expression (6) to decide d in Expression (6). Since a, b, and c in Expression (6) are derived in the processing of step 228K, the second plane equation is decided when d in Expression (6) is decided in the processing of step 410.

In step 412, the execution unit 184 derives a reference imaging position distance on the basis of the characteristic pixel three-dimensional coordinates and the second plane equation, and then the process proceeds to step 414. Meanwhile, the reference imaging position distance is equivalent to, for example, "B" shown in Expression (7), and is derived by substituting first characteristic pixel three-dimensional coordinates for the second plane equation.

In step 414, the execution unit 184 adjusts the imaging position distance derived in the processing of step 406 with reference to the reference imaging position distance derived in the processing of step 412 to derive the final imaging position distance, and then the process proceeds to step 416. Here, the adjustment of the imaging position distance refers to, for example, the obtainment of an average value between the imaging position distance and the reference imaging position distance, the multiplication of the average value between the imaging position distance and the reference imaging position distance and a first adjustment coefficient, or the multiplication of the imaging position distance and a second adjustment coefficient.

Meanwhile, both the first adjustment coefficient and the second adjustment coefficient are, for example, coefficients which are uniquely determined in accordance with the reference imaging position distance. For example, the first adjustment coefficient is derived from a correspondence table in which the reference imaging position distance and the first adjustment coefficient are associated with each other in advance, or a computational expression in which the reference imaging position distance is set to be an independent variable and the first adjustment coefficient is set to be a dependent variable. The second adjustment coefficient is similarly derived. The correspondence table and the computational expression are derived from a derivation table or a computational expression which is derived from results of experiment performed by the real machine of the distance measurement device 10D or computer simulation based on design specifications of the distance measurement device 10D at the stage before the shipment of the distance measurement device 10D.

Accordingly, examples of the final imaging position distance include an average value between the imaging position distance and the reference imaging position distance, a value obtained by multiplying the average value between the imaging position distance and the reference imaging position distance by the first adjustment coefficient, and a value obtained by multiplying the imaging position distance by the second adjustment coefficient.

Figure 32:
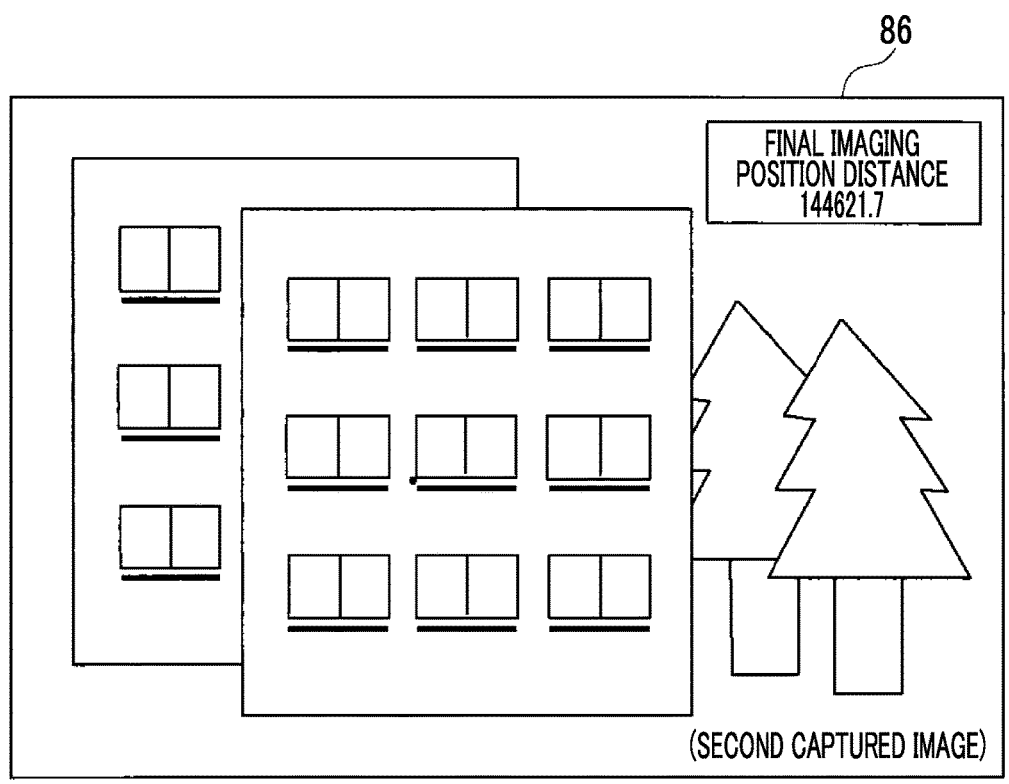
FIG. 32 is a schematic image illustrating an example of a second captured image, obtained by performing imaging using the imaging device according to the fourth embodiment, on which a final imaging position distance is displayed in an overlapping manner.

In step 416, the control unit 185 displays the final imaging position distance derived in the processing of step 414 on the display unit 86 so as to be superimposed on the second captured image, as illustrated in FIG. 32 as an example. In step 416, the control unit 185 stores the final imaging position distance derived in the processing of step 414 in a predetermined storage region, and then terminates the imaging position distance derivation process.

Next, reference will be made to FIG. 33 to describe a three-dimensional coordinate derivation process realized by the CPU 100 executing the three-dimensional coordinate derivation program 181 in a case where a three-dimensional coordinate derivation button 90G is turned on. Meanwhile, here, for convenience of description, a description will be given on the assumption that the first derivation process illustrated in FIG. 31 is executed by the execution unit 184.

Figure 33:
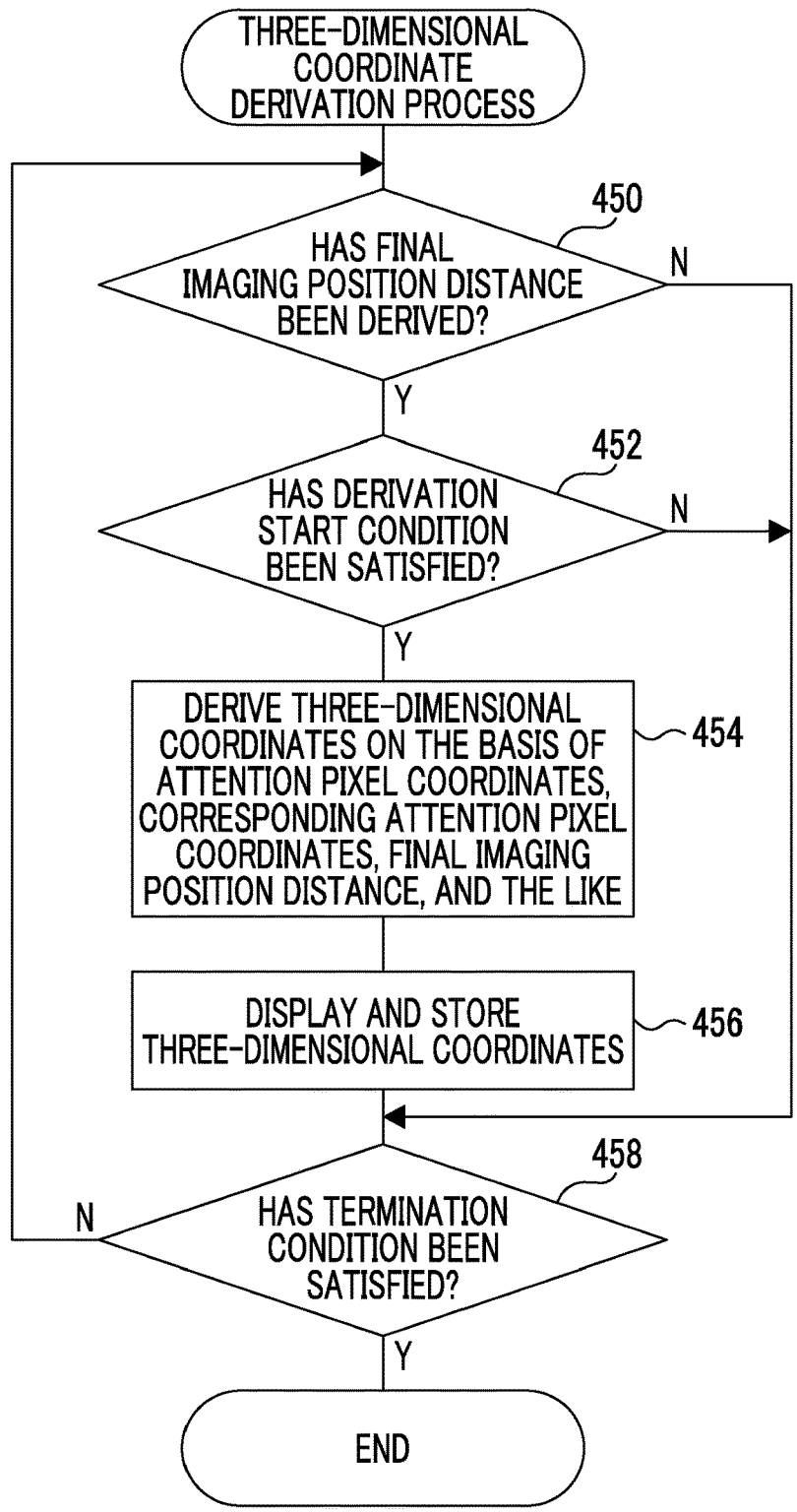
FIG. 33 is a flowchart illustrating an example of a flow of a three-dimensional coordinate derivation process according to the fourth embodiment.

In the three-dimensional coordinate derivation process illustrated in FIG. 33, first, the execution unit 184 determines whether or not the final imaging position distance has been already derived in the processing of step 414 included in the first derivation process, in step 450. In step 450, in a case where the final imaging position distance has not been derived in the processing of step 414 included in the first derivation process, the determination result is negative, and the process proceeds to step 458. In step 450, in a case where the final imaging position distance has been already derived in the processing of step 414 included in the first derivation process, the determination result is positive, and the process proceeds to step 452.

In step 452, the execution unit 184 determines whether or not a derivation start condition has been satisfied. In step 452, in a case where the derivation start condition has not been satisfied, the determination result is negative, and the process proceeds to step 458. In step 452, in a case where the derivation start condition has been satisfied, the determination result is positive, and the process proceeds to step 454.

In step 454, the execution unit 184 derives the designated pixel three-dimensional coordinates on the basis of the attention pixel coordinates, the corresponding attention pixel coordinates, the final imaging position distance, the focal length of the imaging lens 50, the dimensions of the imaging pixel 60A1, and Expression (1), and then the process proceeds to step 456.

Meanwhile, in step 454, the designated pixel three-dimensional coordinates are derived by substituting the attention pixel coordinates, the corresponding attention pixel coordinates, the final imaging position distance, the focal length of the imaging lens 50, and the dimensions of the imaging pixel 60A1 for Expression (1).

Figure 34:
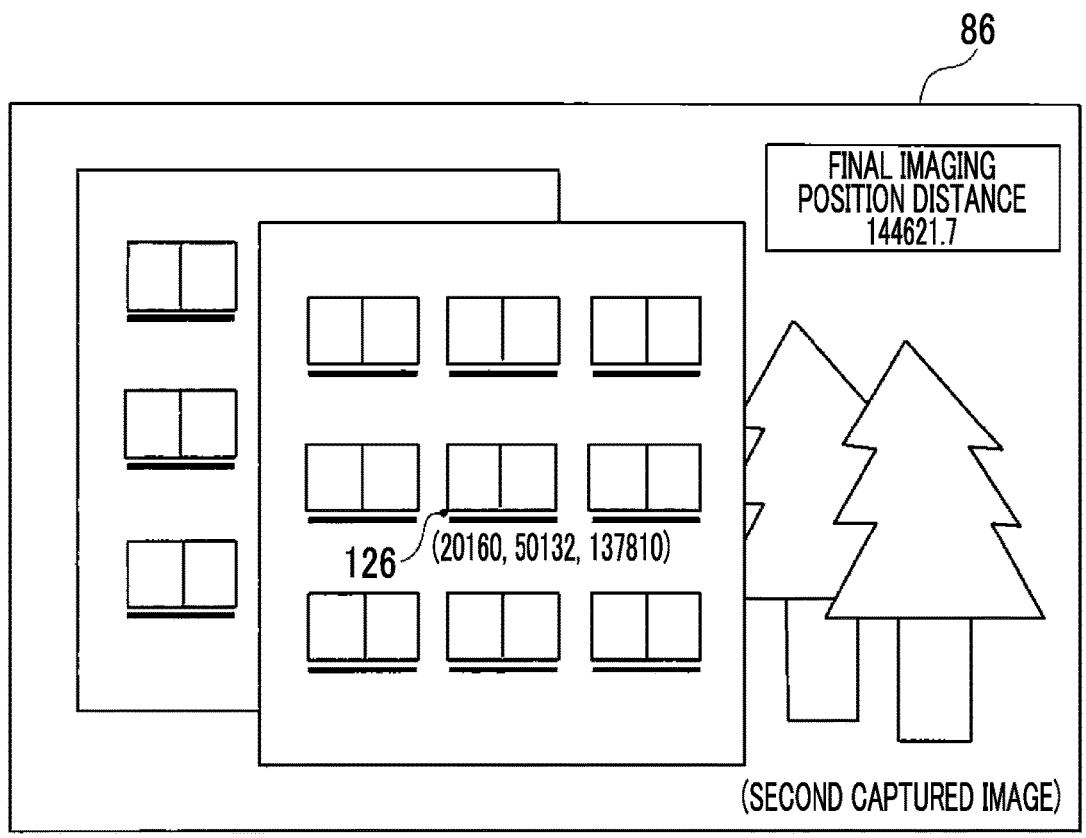
FIG. 34 is a schematic image illustrating an example of a second captured image, obtained by performing imaging using the imaging device according to the fourth embodiment, on which a final imaging position distance and designated pixel three-dimensional coordinates are displayed in an overlapping manner.

In step 456, the control unit 185 displays the designated pixel three-dimensional coordinates derived in the processing of step 454 on the display unit 86 so as to be superimposed on the second captured image, as illustrated in FIG. 34 as an example. In step 456, the control unit 185 stores the designated pixel three-dimensional coordinates derived in the processing of step 454 in a predetermined storage region, and then the process proceeds to step 458.

Meanwhile, in the example illustrated in FIG. 34, (20160, 50132, 137810) corresponds to the designated pixel three-dimensional coordinates derived in the processing of step 454. In the example illustrated in FIG. 34, the designated pixel three-dimensional coordinates are displayed in proximity to the attention pixel 126.

In step 458, the execution unit 184 determines whether or not a condition for terminating the three-dimensional coordinate derivation process has been satisfied. In step 458, in a case where the condition for terminating the three-dimensional coordinate derivation process has not been satisfied, the determination result is negative, and the process proceeds to step 450. In step 458, in a case where the condition for terminating the three-dimensional coordinate derivation process has been satisfied, the determination result is positive, and thus the three-dimensional coordinate derivation process is terminated.

As described above, in the distance measurement device 10D, a distance from the second position to the subject is measured, and a reference distance which is the measured distance is acquired by the acquisition unit 182 (step 402). In addition, the reference irradiation position real space coordinates are derived by the execution unit 184 on the basis of the reference distance (step 408). In addition, the reference imaging position distance is derived by the execution unit 184 on the basis of the attention pixel coordinates, the corresponding attention pixel coordinates, the three characteristic pixel coordinates, the corresponding characteristic pixel coordinates, the reference irradiation position real space coordinates, the focal length of the imaging lens 50, and the dimensions of the imaging pixel 60A1 (step 406). The imaging position distance is adjusted by the execution unit 184 with reference to the reference imaging position distance, and thus the final imaging position distance is derived (step 414). Therefore, according to the distance measurement device 10D, it is possible to derive a distance between the first imaging position and the second imaging position with a high level of accuracy, as compared to a case where the reference imaging position distance is not used.

In the distance measurement device 10D, the designated pixel three-dimensional coordinates are derived on the basis of the final imaging position distance derived in the imaging position distance derivation process (see FIG. 33). Therefore, according to the distance measurement device 10D, it is possible to derive the designated pixel three-dimensional coordinates with a high level of accuracy, as compared to a case where the final imaging position distance is not used.

Further, in the distance measurement device 10D, the designated pixel three-dimensional coordinates are specified on the basis of the attention pixel coordinates, the corresponding attention pixel coordinates, the final imaging position distance, the focal length of the imaging lens 50, and the dimensions of the imaging pixel 60A1 (see Expression (1)). Therefore, according to the distance measurement device 10D, it is possible to derive the designated pixel three-dimensional coordinates with a high level of accuracy, as compared to a case where the designated pixel three-dimensional coordinates are not specified on the basis of the final imaging position distance, the attention pixel coordinates, the corresponding attention pixel coordinates, the focal length of the imaging lens 50, and the dimensions of the imaging pixel 60A1.

Meanwhile, in the fourth embodiment, a distance measured on the basis of a laser beam emitted from the second position is set to be the reference distance, but the technique of this disclosure is not limited thereto. For example, a distance measured on the basis of a laser beam emitted from the first position may be set to be the reference distance.

Fifth Embodiment

In the above-described embodiments, a description has been given of a case where an imaging position distance and the like are derived by one distance measurement device, but a description will be given of a case where an imaging position distance and the like are derived by two of a distance measurement devices and a personal computer (hereinafter, referred to as a PC) in a fifth embodiment. Meanwhile, PC stands for a Personal Computer. Meanwhile, in the fifth embodiment, the same components as those described in the above-described embodiments will be denoted by the same reference numerals and signs, and a description thereof will be omitted.

Figure 35:
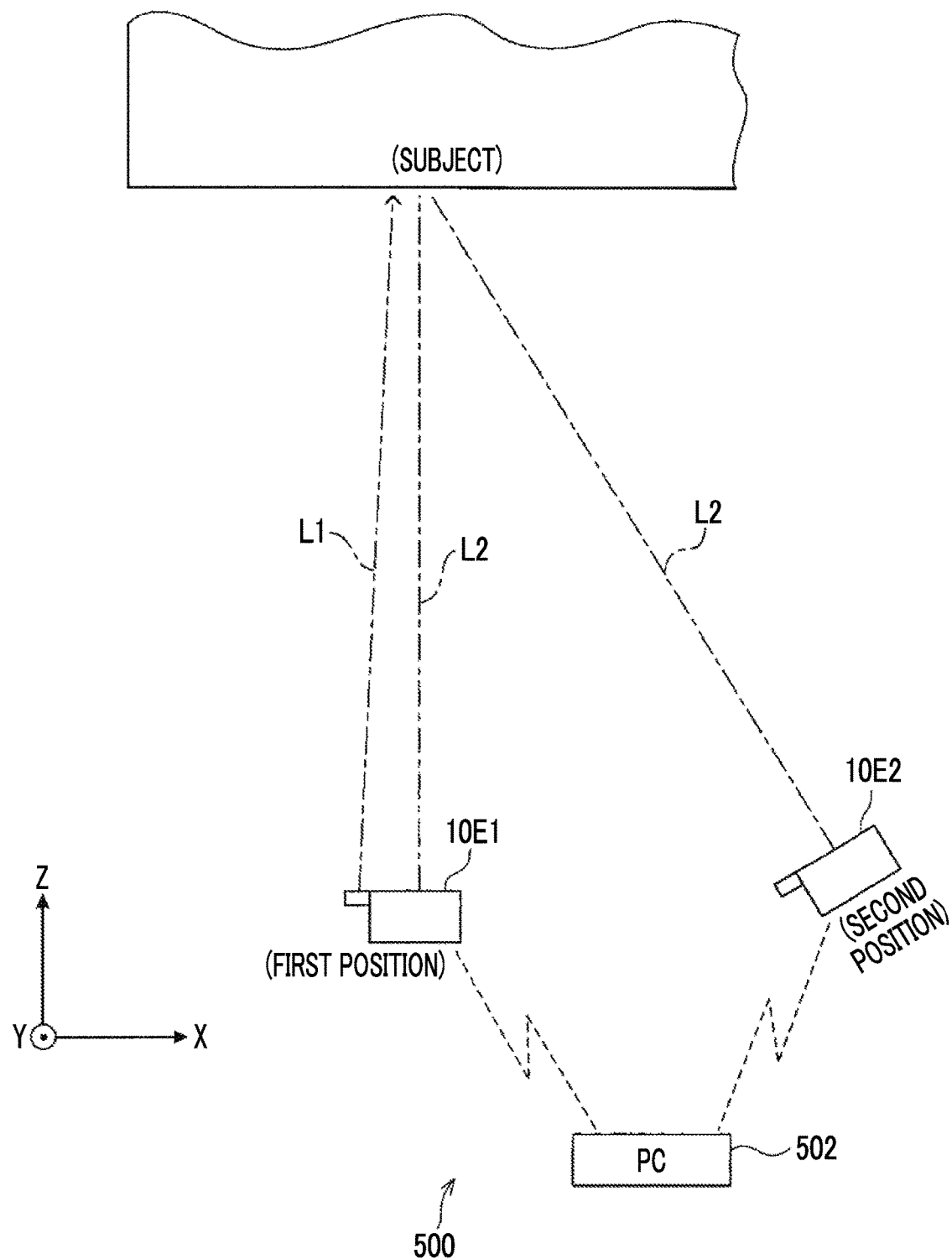
FIG. 35 is a schematic plan view illustrating an example of a positional relationship between two distance measurement devices included in an information processing system according to the fifth embodiment, a PC, and a subject.

As illustrated in FIG. 35 as an example, an information processing system 500 according to the fifth embodiment includes distance measurement devices 10E1 and 10E2, and a PC 502. Meanwhile, in the fifth embodiment, the PC 502 can communicate with the distance measurement devices 10E1 and 10E2. In the fifth embodiment, the PC 502 is an example of an information processing device according to the technique of this disclosure.

As illustrated in FIG. 35 as an example, the distance measurement device 10E1 is disposed at a first position, and the distance measurement device 10E2 is disposed at a second position different from the first position.

Figure 36:
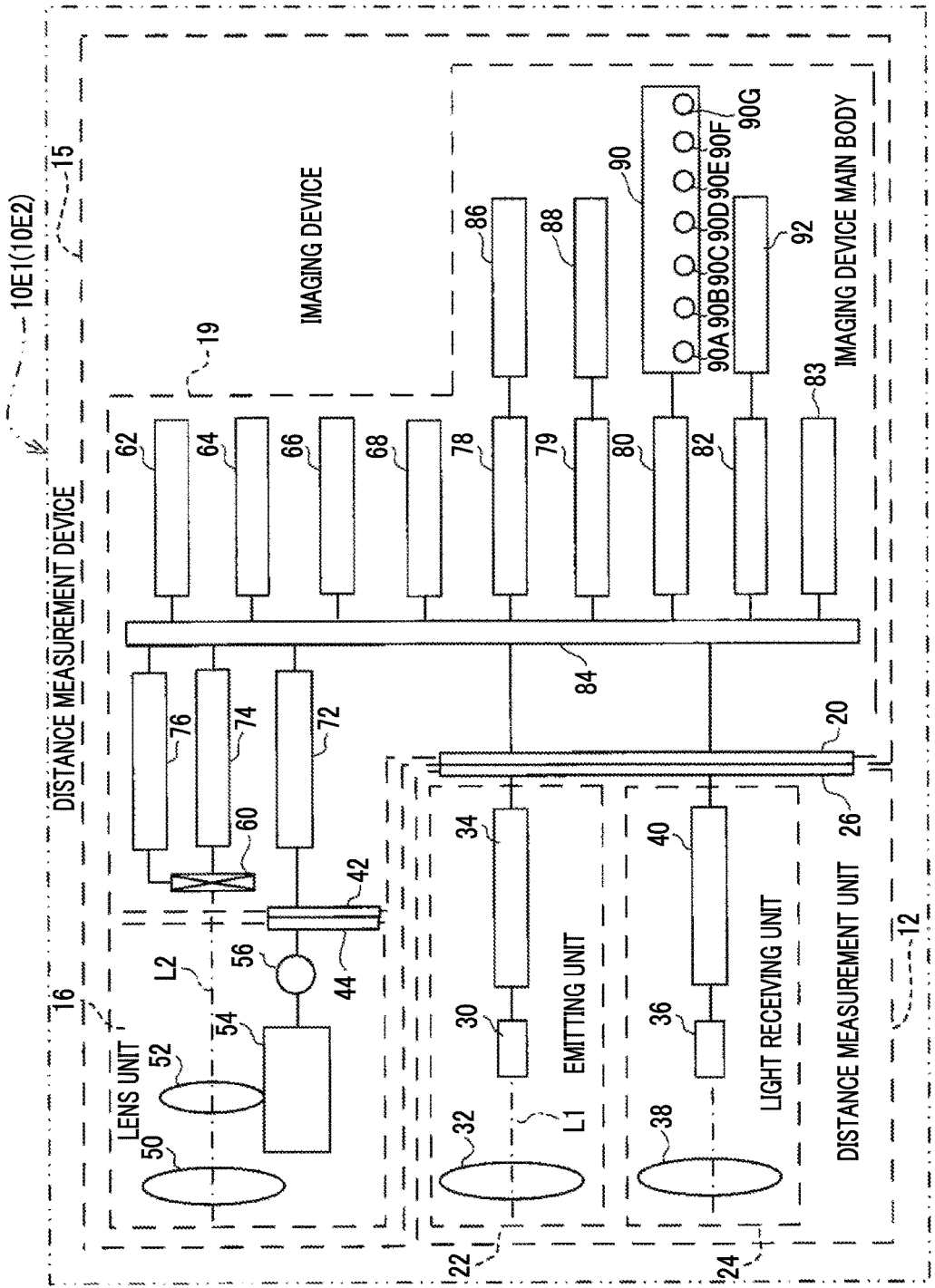
FIG. 36 is a block diagram illustrating an example of a hardware configuration of a distance measurement device according to the fifth embodiment.

As illustrated in FIG. 36 as an example, the distance measurement devices 10E1 and 10E2 have the same configuration. Meanwhile, hereinafter, the distance measurement devices 10E1 and 10E2 will be referred to as a "distance measurement device 10E" in a case where it is not necessary to give a description by distinguishing between the distance measurement devices.

The distance measurement device 10E is different from the distance measurement device 10A in that an imaging device 15 is provided instead of the imaging device 14. The imaging device 15 is different from the imaging device 14 in that an imaging device main body 19 is provided instead of the imaging device main body 18.

The imaging device main body 19 is different from the imaging device main body 18 in that a communication I/F 83 is provided. The communication I/F 83 is connected to a bus line 84, and is operated under the control of a main control unit 62.

The communication I/F 83 is connected to a communication network (not shown) such as the Internet, and transmits and receives various information to and from the PC 502 connected to the communication network.

Figure 37:
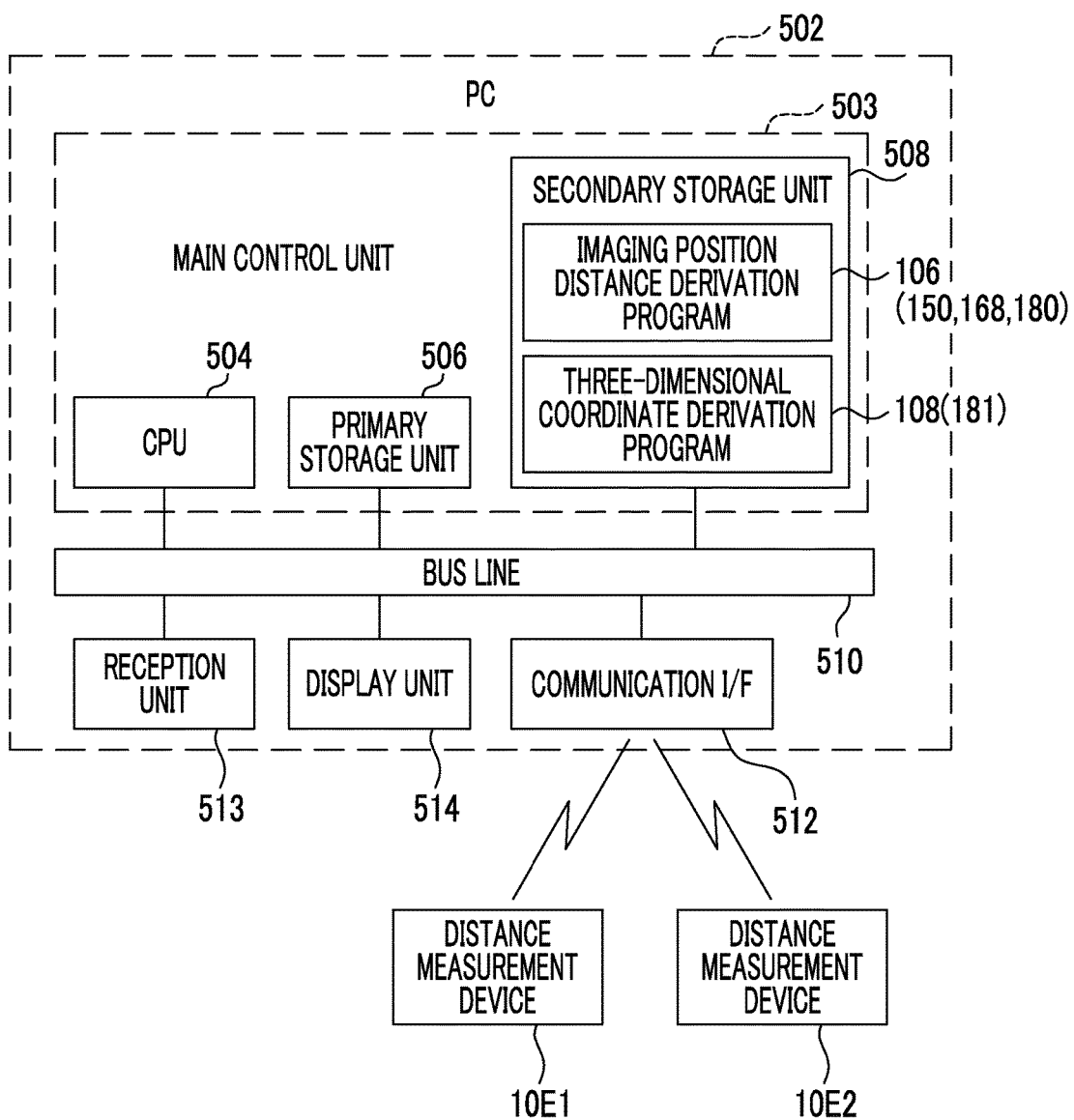
FIG. 37 is a block diagram illustrating an example of a hardware configuration of the PC according to the fifth embodiment.

As illustrated in FIG. 37 as an example, the PC 502 includes a main control unit 503. The main control unit 503 includes a CPU 504, a primary storage unit 506, and a secondary storage unit 508. The CPU 504, the primary storage unit 506, and the secondary storage unit 508 are connected to each other through a bus line 510.

In addition, the PC 502 includes a communication I/F 512. The communication I/F 512 is connected to the bus line 510, and is operated under the control of the main control unit 503. The communication I/F 512 is connected to the communication network, and transmits and receives various information to and from the distance measurement device 10E connected to the communication network.

In addition, the PC 502 includes a reception unit 513 and a display unit 514. The reception unit 513 is connected to the bus line 510 through a reception I/F (not shown), and the reception I/F outputs an instruction content signal indicating contents of an instruction received by the reception unit 513 to the main control unit 503. Meanwhile, the reception unit 513 is realized by, for example, a keyboard, a mouse, and a touch panel.

The display unit 514 is connected to the bus line 510 through a display control unit (not shown), and displays various information under the control of the display control unit. Meanwhile, the display unit 514 is realized by, for example, an LCD.

The secondary storage unit 508 stores the imaging position distance derivation program 106 (150, 168, 180) and the three-dimensional coordinate derivation program 108 (181) which are described in the above-described embodiments. Meanwhile, hereinafter, for convenience of description, the imaging position distance derivation programs 106, 150, 168, and 180 will be referred to as an "imaging position distance derivation program" without a reference numeral in a case where it is not necessary to give a description by distinguishing between the imaging position distance derivation programs. In addition, hereinafter, for convenience of description, the three-dimensional coordinate derivation programs 108 and 181 will be referred to as a "three-dimensional coordinate derivation program" without a reference numeral in a case where it is not necessary to give a description by distinguishing between the three-dimensional coordinate derivation programs.

The CPU 504 acquires a first captured image signal, attention pixel coordinates, a distance, and the like from the distance measurement device 10E1 through the communication I/F 512. In addition, the CPU 504 acquires a second captured image signal and the like from the distance measurement device 10E2 through the communication I/F 512.

The CPU 504 reads out the imaging position distance derivation program and the three-dimensional coordinate derivation program from the secondary storage unit 508 and develops the read-out imaging position distance derivation program and three-dimensional coordinate derivation program to the primary storage unit 506 to execute the imaging position distance derivation program and the three-dimensional coordinate derivation program. Meanwhile, hereinafter, for convenience of description, the imaging position distance derivation program and the three-dimensional coordinate derivation program are collectively referred to as a "derivation program".

The CPU 504 executes the derivation programs, and is thus operation as the acquisition unit 110 (154, 172, 182), the derivation unit 111, the execution unit 112 (174, 184), and the control unit 114 (156, 176, 185).

Accordingly, in the information processing system 500, the PC 502 acquires the first captured image signal, the second captured image signal, the attention pixel coordinates, the distance, and the like from the distance measurement device 10E through the communication I/F 512 and then executes the derivation programs, and thus the same operations and effects as those in the above-described embodiments are obtained.

Sixth Embodiment

In the first embodiment, a description has been given of a case where the distance measurement device 10A is realized by the distance measurement unit 12 and the imaging device 14, but a description will be given of a distance measurement device 10/F which is realized by further including a smart device 602 in a sixth embodiment. Meanwhile, in the sixth embodiment, the same components as those in the above-described embodiments will be denoted by the same reference numerals and signs, and a description thereof will be omitted, and only different portions from the above-described embodiments will be described.

Figure 38:
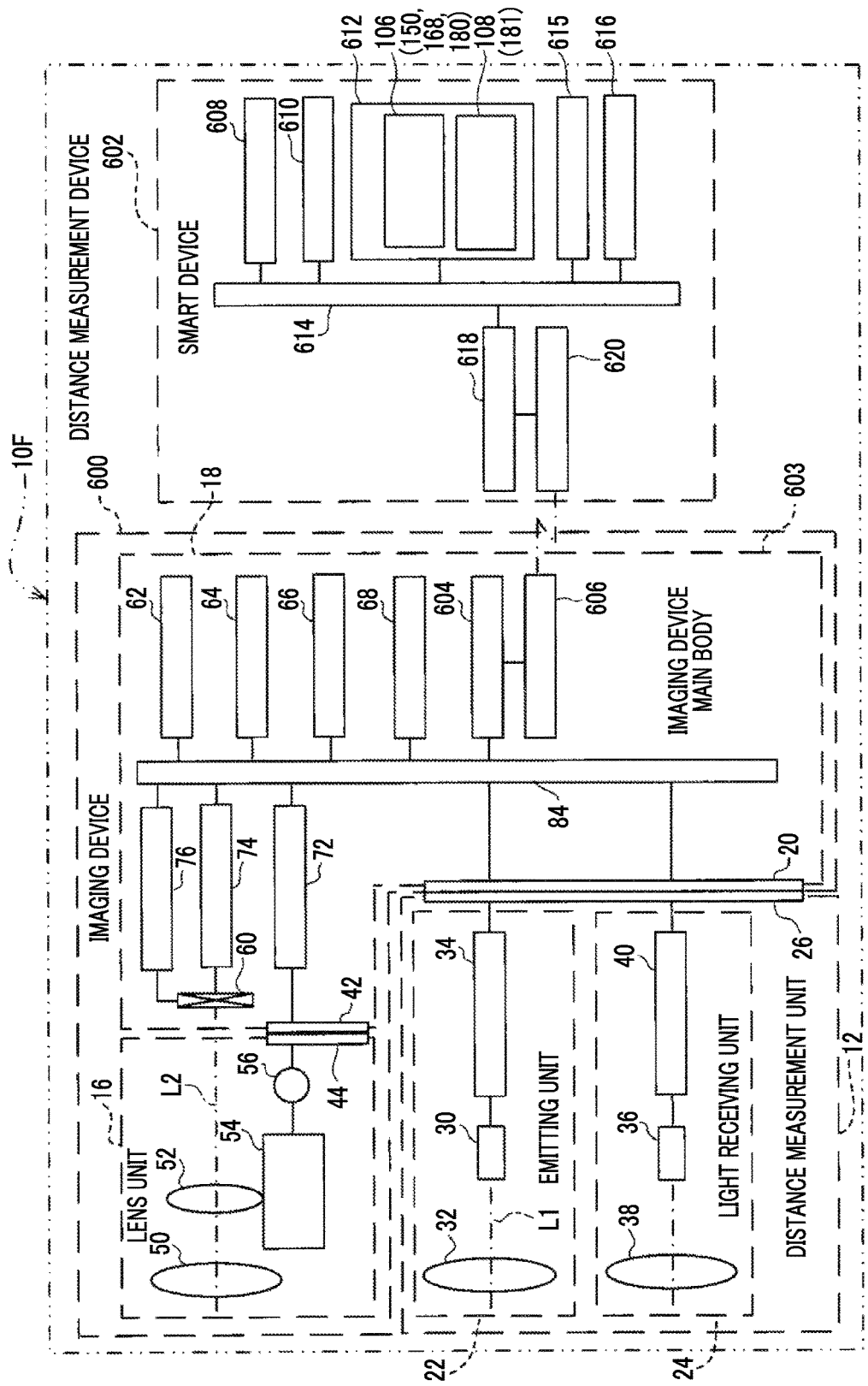
FIG. 38 is a block diagram illustrating an example of a hardware configuration of a distance measurement device according to the sixth embodiment.

As illustrated in FIG. 38 as an example, the distance measurement device 10/F according to the sixth embodiment is different from the distance measurement device 10A according to the first embodiment in that an imaging device 600 is provided instead of the imaging device 14. In addition, the distance measurement device 10/F is different from the distance measurement device 10A in that a smart device 602 is provided.

The imaging device 600 is different from the imaging device 14 in that an imaging device main body 603 is provided instead of the imaging device main body 18.

The imaging device main body 603 is different from the imaging device main body 18 in that a wireless communication unit 604 and a wireless communication antenna 606 are provided.

The wireless communication unit 604 is connected to a bus line 84 and the wireless communication antenna 606. The main control unit 62 outputs transmission target information, which is information to be transmitted to the smart device 602, to the wireless communication unit 604.

The wireless communication unit 604 transmits the transmission target information, which is input from the main control unit 62, to the smart device 602 by radio waves through the wireless communication antenna 606. In addition, when the radio waves from the smart device 602 are received by the wireless communication antenna 606, the wireless communication unit 604 acquires a signal based on the received radio waves, and outputs the acquired signal to the main control unit 62.

The smart device 602 includes a CPU 608, a primary storage unit 610, and a secondary storage unit 612. The CPU 608, the primary storage unit 610, and the secondary storage unit 612 are connected to a bus line 614.

The CPU 608 controls the entire distance measurement device 10F, inclusive of the smart device 602. The primary storage unit 610 is a volatile memory which is used as a work area and the like during the execution of various programs. An example of the primary storage unit 610 is a RAM. The secondary storage unit 612 is a non-volatile memory that stores a control program for controlling the overall operation of the distance measurement device 10F, various parameters, and the like, inclusive of the smart device 602. An example of the secondary storage unit 612 is a flash memory or an EEPROM.

The smart device 602 includes a display unit 615, a touch panel 616, a wireless communication unit 618, and a wireless communication antenna 620.

The display unit 615 is connected to the bus line 614 through a display control unit (not shown), and displays various information under the control of the display control unit. Meanwhile, the display unit 615 is realized by, for example, an LCD.

The touch panel 616 is superimposed on a display screen of the display unit 615, and receives a touch by an indicator. The touch panel 616 is connected to the bus line 614 through a touch panel I/F (not shown), and outputs positional information indicating a position touched by the indicator to the touch panel I/F. The touch panel I/F is operated in accordance with an instruction of the CPU 608, and outputs the positional information, which is input from the touch panel 616, to the CPU 608.

Figure 39:
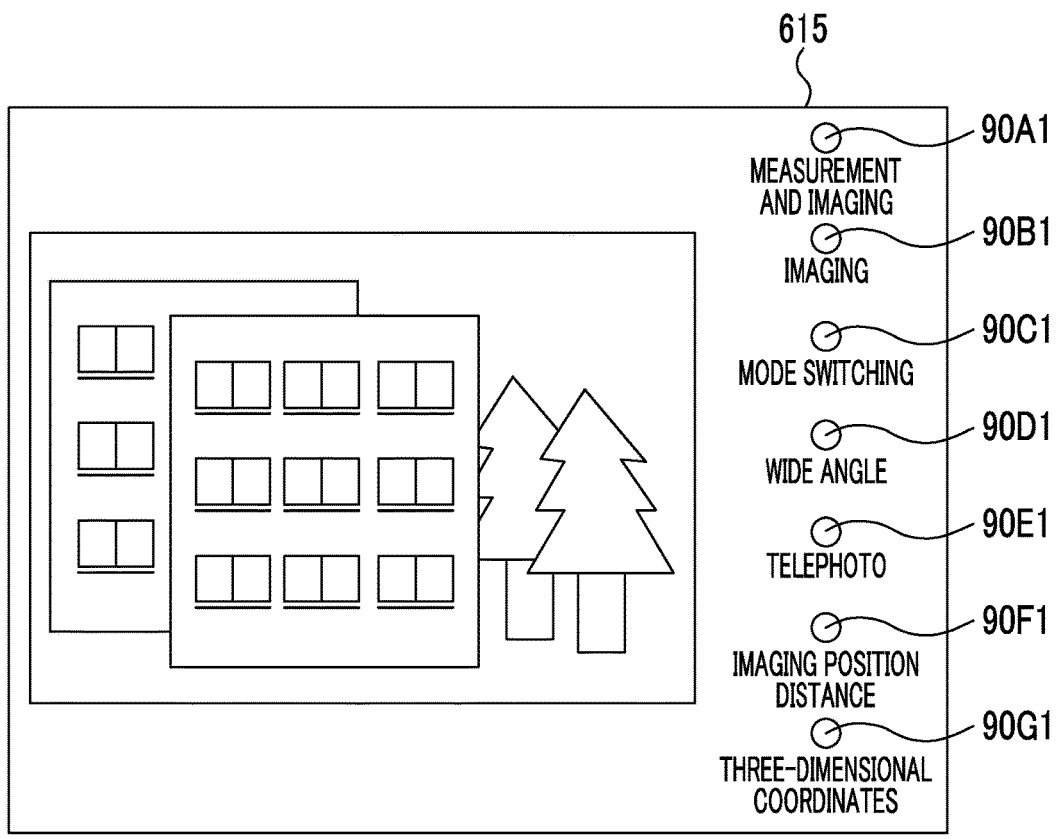
FIG. 39 is a screen view illustrating an example of a screen including various buttons displayed as soft keys on a display unit of a smart device included in the distance measurement device according to the sixth embodiment.

Soft keys equivalent to a measurement imaging button 90A, an imaging button 90B, an imaging system operation mode switching button 90C, a wide angle instruction button 90D, a telephoto instruction button 90E, an imaging position distance derivation button 90F, a three-dimensional coordinate derivation button 90Q and the like are displayed on the display unit 615 (see FIG. 39).

For example, as illustrated in FIG. 39, a measurement imaging button 90A1 functioning as the measurement imaging button 90A is displayed on the display unit 615 as a soft key, and is pressed down by the user through the touch panel 616. In addition, for example, an imaging button 90B1 functioning as the imaging button 90B is displayed on the display unit 615 as a soft key, and is pressed down by the user through the touch panel 616. In addition, for example, an imaging system operation mode switching button 90C1 functioning as the imaging system operation mode switching button 90C is displayed on the display unit 615 as a soft key, and is pressed down by the user through the touch panel 616.

In addition, for example, a wide angle instruction button 90D1 functioning as the wide angle instruction button 90D is displayed on the display unit 615 as a soft key, and is pressed down by the user through the touch panel 616. Further, for example, a telephoto instruction button 90E1 functioning as the telephoto instruction button 90E is displayed on the display unit 615 as a soft key, and is pressed down by the user through the touch panel 616.

In addition, for example, an imaging position distance derivation button 90F1 functioning as the imaging position distance derivation button 90F is displayed on the display unit 615 as a soft key, and is pressed down by the user through the touch panel 616. In addition, for example, a three-dimensional coordinate derivation button 90G1 functioning as the three-dimensional coordinate derivation button 90G is displayed on the display unit 615 as a soft key, and is pressed down by the user through the touch panel 616.

The wireless communication unit 618 is connected to the bus line 614 and the wireless communication antenna 620. The wireless communication unit 618 transmits a signal, which is input from the CPU 608, to the imaging device main body 603 by radio waves through the wireless communication antenna 620. In addition, when the radio waves are received by the wireless communication antenna 620 from the imaging device main body 603, the wireless communication unit 618 acquires a signal based on the received radio waves and outputs the acquired signal to the CPU 608. Therefore, the imaging device main body 603 is controlled by the smart device 602 through wireless communication performed between the smart device 602 and the imaging device main body 603.

The secondary storage unit 612 stores a derivation program. The CPU 608 reads out the derivation program from the secondary storage unit 612 and develops the read-out derivation program to the primary storage unit 610 to execute the derivation program.

The CPU 608 executes the derivation program, and is thus operation as the acquisition unit 110 (154, 172, 182), the derivation unit 111, the execution unit 112 (174, 184), and the control unit 114 (156, 176, 185). For example, the CPU 608 executes the imaging position distance derivation program 106, and thus the imaging position distance derivation process described in the first embodiment is realized. In addition, for example, the CPU 608 executes the three-dimensional coordinate derivation program 108, and thus the three-dimensional coordinate derivation process described in the first embodiment is realized.

Therefore, in the distance measurement device 10F, the smart device 602 executes the derivation program, and thus the same operations and effects as those in the above-described embodiments are obtained. In addition, according to the distance measurement device 10F, it is possible to reduce a load applied to the imaging device 600 in obtaining the effects described in the above-described embodiments, as compared to a case where the imaging position distance derivation process and the three-dimensional coordinate derivation process are executed by the imaging device 600.

Meanwhile, in the above-described embodiments, a corresponding attention pixel is specified by executing image analysis with a second captured image as an object to be analyzed, and corresponding attention pixel coordinates for specifying the specified corresponding attention pixel are acquired (see steps 228I and 214H1), but the technique of this disclosure is not limited thereto. For example, the user may designate a pixel corresponding to an attention pixel as the corresponding attention pixel from the second captured image through the touch panel 88.

In the above-described embodiments, a description has been given of a case where the execution unit 112 (174, 184) calculates irradiation position real space coordinates, the direction of a plane, an imaging position distance, designated pixel three-dimensional coordinates, and the like by using a computational expression, but the technique of this disclosure is not limited thereto. For example, the execution unit 112 (174, 184) may derive irradiation position real space coordinates, the direction of a plane, an imaging position distance, designated pixel three-dimensional coordinates, and the like by using a table in which an independent variable of the computational expression is set to be an input and a dependent variable of the computational expression is set to be an output.

Figure 40:
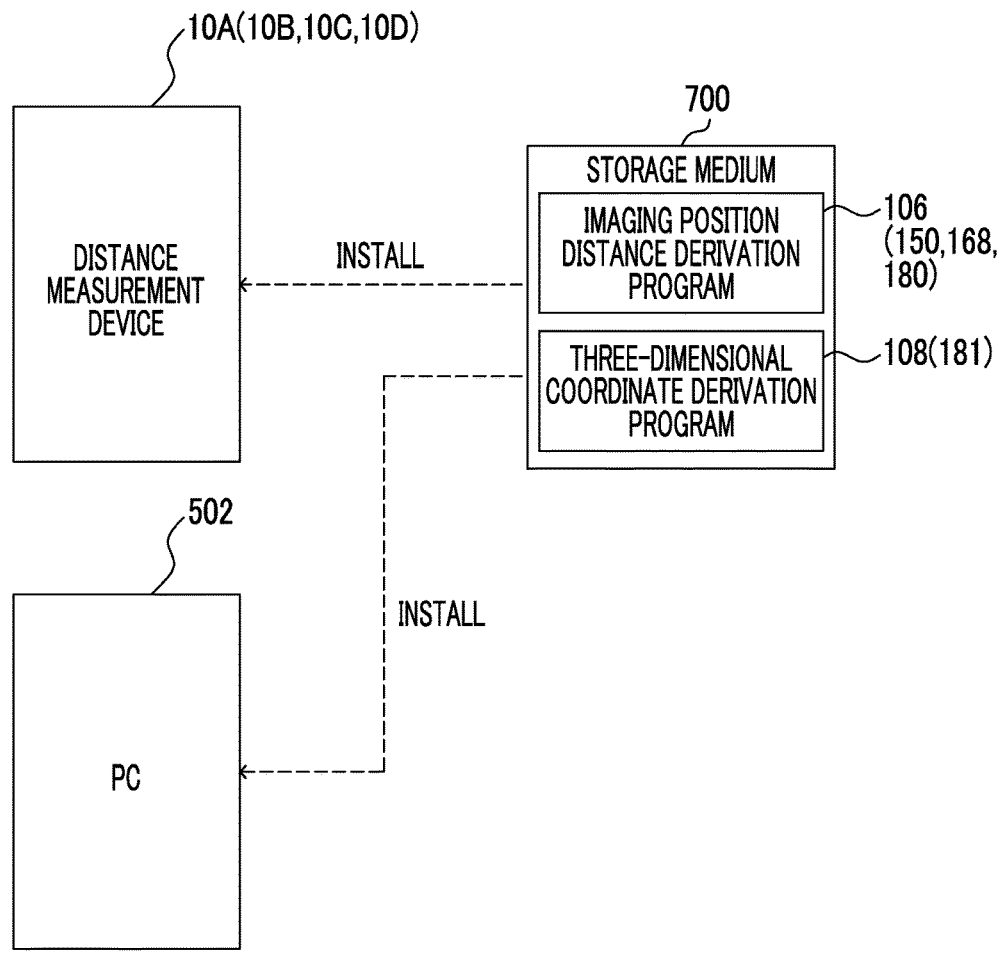
FIG. 40 is a schematic view illustrating an example of a mode in which an imaging position distance derivation program and a three-dimensional coordinate derivation program according to the first to fourth embodiments are installed in a distance measurement device or a PC from a storage medium in which the imaging position distance derivation program and the three-dimensional coordinate derivation program are stored.

In the above-described embodiments, a description has been given of a case where the derivation program is read out from the secondary storage unit 104 (508, 612), but the calculation program is not necessarily stored in the secondary storage unit 104 (508, 612) from the beginning. For example, as illustrated in FIG. 40, the derivation program may be first stored in any portable storage medium 700 such as a Solid State Drive (SSD) or a Universal Serial Bus (USB) memory. In this case, the derivation program of the storage medium 700 is installed in the distance measurement device 10A (10B, 10C, 10D, 10F) (hereinafter, referred to as "distance measurement device 10A and the like") or the PC 502, and the installed derivation program is executed by the CPU 100 (504, 608).

In addition, the derivation program may be stored in a storage unit of another computer or a server device connected to the distance measurement device 10A and the like or the PC 502 through a communication network (not shown), and the derivation program may be downloaded in accordance with requests of the distance measurement device 10A and the like. In this case, the downloaded derivation program is executed by the CPU 100 (504, 608).

In the above-described embodiments, a description has been given of a case where various information such as an irradiation position mark 136, an imaging position distance, and designated pixel three-dimensional coordinates is displayed on the display unit 86, but the technique of this disclosure is not limited thereto. For example, various information may be displayed on a display unit of an external device which is used by being connected to the distance measurement device 10A and the like or the PC 502. An example of the external device is a PC or a spectacles-type or wristwatch type wearable terminal device.

In the above-described embodiments, a description has been given of a case where the irradiation position mark 136, the imaging position distance, the designated pixel three-dimensional coordinates, and the like are visibly displayed by the display unit 86, but the technique of this disclosure is not limited thereto. For example, audible display such as the output of a sound using a sound reproducing device or permanent visible display such as the output of printed matter using a printer may be performed instead of the visible display or may be performed in combination.

In the above-described embodiments, a description has been given of a case where the irradiation position mark 136, the imaging position distance, the designated pixel three-dimensional coordinates, and the like are displayed on the display unit 86, but the technique of this disclosure is not limited thereto. For example, at least one of the irradiation position mark 136, the imaging position distance, the designated pixel three-dimensional coordinates, and the like may be displayed on a display unit (not shown) different from the display unit 86, and the remainders may be displayed on the display unit 86. The irradiation position mark 136, the imaging position distance, the designated pixel three-dimensional coordinates, and the like may be individually displayed on a plurality of display units including the display unit 86.

In the above-described embodiments, a laser beam has been described as light for distance measurement. However, the technique of this disclosure is not limited thereto, and the light for distance measurement may be directional light having directivity. For example, the light for distance measurement may be directional light obtained by a Light Emitting Diode (LED), a Super Luminescent Diode (SLD), or the like. It is preferable that directivity of the directional light is the same degree of directivity as that of the directivity of the laser beam and is usable in distance measurement, for example, within a range between several meters and several kilometers.

In addition, the imaging position distance derivation process and the three-dimensional coordinate derivation process described in the above-described embodiments are just examples. Therefore, it is needless to say that the deletion of unnecessary steps, the addition of new steps, and the change of processing order may be performed without departing from the scope of the invention. In addition, each processing included in the imaging position distance derivation process and the three-dimensional coordinate derivation process may be realized only by a hardware configuration such as ASIC, or may be realized by a combination of a software configuration and a hardware configuration using a computer.

Figure 41:
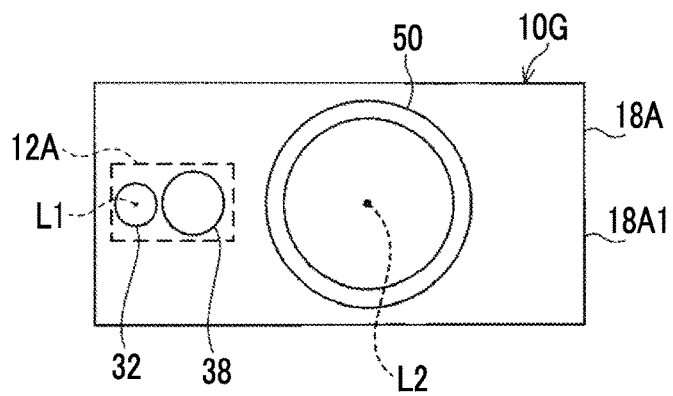
FIG. 41 is a front view illustrating a modification example of the appearance of the distance measurement device according to the first to sixth embodiments.

In the above-described embodiments, for convenience of description, a description has been given of a case where the distance measurement unit 12 is mounted on the side surface of the imaging device main body 18 included in the distance measurement device 10A and the like, but the technique of this disclosure is not limited thereto. For example, the distance measurement unit 12 may be mounted on the upper surface or the lower surface of the imaging device main body 18. In addition, for example, as illustrated in FIG. 41, a distance measurement device 10G may be applied instead of the distance measurement device 10A and the like. As illustrated in FIG. 41 as an example, the distance measurement device 10G is different from the distance measurement device 10A and the like in that a distance measurement unit 12A is provided instead of the distance measurement unit 12 and an imaging device main body 18A is provided instead of the imaging device main body 18.

In the example illustrated in FIG. 41, the distance measurement unit 12A is accommodated in a housing 18A1 of the imaging device main body 18A, and objective lenses 32 and 38 are exposed from the housing 18A1 on the front side (a side where the imaging lens 50 is exposed) of the distance measurement device 10G In addition, it is preferable that the distance measurement unit 12A is disposed such that optical axes L1 and L2 are set to be at the same height in the vertical direction. Meanwhile, an opening (not shown) through which the distance measurement unit 12A can be inserted into and removed from the housing 18A1 may be formed in the housing 18A1.

Meanwhile, the half angle of view α used in the processing of steps 206 and 207 included in the imaging position distance calculation process according to the first embodiment and the half angle of view α used in the processing of step 408 included in the imaging position distance calculation process according to the fourth embodiment are derived on the basis of the following Expression (10). In Expression (10), "$f_0$" denotes a focal length.

$$\alpha = a\tan\left\{\frac{(\text{dimension of imaging pixel})}{2 \times f_0}\right\} \quad (10)$$

All the documents, patent applications, and technical specifications described in the present specification are incorporated into the present specification by reference, to the same extent as in a case where the individual documents, patent applications, and technical specifications were specifically and individually described as being incorporated by reference.

With regard to the above-described embodiments, the following appendixes will be further disclosed.

(Appendix 1)

An information processing device including:

an acquisition unit that acquires a first captured image obtained by imaging a subject from a first imaging position, a second captured image obtained by imaging the subject from a second imaging position different from the first imaging position, and a distance from any one of a position corresponding to the first imaging position and a position corresponding to the second imaging position to the subject, the distance being measured by emitting directional light, which has directivity, to the subject and receiving reflected light of the directional light;

a derivation unit that derives irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the distance acquired by the acquisition unit; and an execution unit that executes a derivation process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the respective first and second captured images, the irradiation position real space coordinates, and a focal length of an imaging lens used in the imaging of the subject, and dimensions of imaging pixels included in an imaging pixel group for imaging the subject, in a case of a position unspecifiable state where the position of the pixel specified by the irradiation position pixel coordinates is a position of a pixel different from a position of a pixel which is specifiable at positions corresponding to each other in the respective first and second captured images.

(Appendix 2)

The information processing device according to Appendix 1, wherein the acquisition unit further acquires a plurality of pixel coordinates, and wherein the derivation process is a process of deriving the imaging position distance on the basis of the plurality of pixel coordinates acquired by the acquisition unit, the irradiation position real space coordinates, the focal length, and the dimensions.

(Appendix 3)

The information processing device according to Appendix 2, wherein the plurality of pixels are designated on the basis of first pixel designation information received by a first reception unit that receives first pixel designation information for designating a pixel from each of the first and second captured images, and wherein the acquisition unit acquires a plurality of coordinates for specifying the plurality of pixels designated on the basis of the first pixel designation information, as the plurality of pixel coordinates.

(Appendix 4)

The information processing device according to Appendix 2, wherein the plurality of pixel coordinates are coordinates for specifying a predetermined number of pixels which are present in the same planar region as the irradiation position on the real space and which are equal to or more than three pixels specifiable at positions corresponding to each other in the respective first and second captured images, the coordinates being coordinates for specifying each of a plurality of pixels for maximizing an area surrounded by the pixels.

(Appendix 5)

The information processing device according to Appendix 2, further including:

a first control unit that performs control for displaying at least one of the first and second captured images on a first display unit and displaying a corresponding region corresponding to the same planar region as the irradiation position within a display region so as to be distinguishable from other regions, wherein the acquisition unit acquires a plurality of pixel coordinates from a portion of a corresponding region designated on the basis of region designation information received by a second reception unit that receives the region designation information for designating a portion of the corresponding region in a state where the corresponding region is displayed on the first display unit.

(Appendix 6)

The information processing device according to any one of Appendixes 1 to 5, wherein the acquisition unit further acquires a reference distance to the subject which is measured by emitting directional light to the subject from the other one of the position corresponding to the first imaging position and the position corresponding to the second imaging position and receiving reflected light of the directional light, wherein the derivation unit further derives reference irradiation position real space coordinates for specifying the irradiation position of the directional light with respect to the subject, on the basis of the reference distance acquired by the acquisition unit, and wherein the execution unit derives a reference imaging position distance which is a distance between the first imaging position and the second imaging position on the basis of the plurality of pixel coordinates, the reference irradiation position real space coordinates, the focal length, and the dimensions, and adjusts the imaging position distance with reference to the derived reference imaging position distance, to execute a process of deriving a final imaging position distance which is finally adopted as the distance between the first imaging position and the second imaging position.

(Appendix 7)

The information processing device according to Appendix 6, wherein the execution unit executes a process of deriving final designated pixel real space coordinates finally adopted as coordinates at a position on the real space corresponding to a position of a designated pixel, which is designated as a pixel corresponding to a position on the real space in each of the first and second captured images, on the basis of the final imaging position distance.

(Appendix 8)

The information processing device according to Appendix 7, wherein the final designated pixel real space coordinates are specified on the basis of the final imaging position distance, designated pixel coordinates for specifying a pixel which is specifiable as the designated pixel at positions corresponding to each other in the respective first and second captured images, the focal length, and the dimensions.

(Appendix 9)

An information processing device comprising:
    a processor; and
    a memory storing instructions, which when executed by the processor perform a procedure, the procedure including:
    acquiring a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light;
    deriving irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the acquired distance; and
    executing a derivation process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the respective first and second captured images, the irradiation position real space coordinates, a focal length of an imaging lens used in the imaging of the subject, and dimensions of imaging pixels included in an imaging pixel group for imaging the subject, in a case of a position unspecifiable state where the position of the pixel specified by the irradiation position pixel coordinates is a position of a pixel different from a pixel which is specifiable at positions corresponding to each other in the respective first and second captured images.

(Appendix 10)

An information processing device comprising:
    a processor; and
    a memory storing instructions, which when executed by the processor perform a procedure, the procedure including:
    acquiring a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light, deriving irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the acquired distance; and
    executing a derivation process of deriving an imaging position distance on the basis of the irradiation position real space coordinates, the irradiation position pixel coordinates, a focal length of an imaging lens used in the imaging of the subject, and dimensions of imaging pixels included in an imaging pixel group for imaging the subject, in a case of a position specifiable state where the position of the pixel specified by the irradiation position pixel coordinates is a position of a pixel which is specifiable at positions corresponding to each other in the respective first and second captured images.

(Appendix 11)

The information processing device according to Appendix 10 or 11, wherein the processor is a circuitry.

What is claimed is:

1. An information processing device comprising:
    an acquisition unit that acquires a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light;
    a derivation unit that derives irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the distance acquired by the acquisition unit; and
    an execution unit that executes a derivation process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the respective first and second captured images, the irradiation position real space coordinates, a focal length of an imaging lens used in the imaging of the subject, and dimensions of imaging pixels included in an imaging pixel group for imaging the subject, in a case of a position unspecifiable state where the position of the pixel specified by the irradiation position pixel coordinates is a position of a pixel different from a pixel which is specifiable at positions corresponding to each other in the respective first and second captured images.

2. The information processing device according to claim 1,
wherein the execution unit further executes a position unspecifiable state notification process of giving notice of being the position unspecifiable state in a case of the position unspecifiable state.

3. The information processing device according to claim 1,
wherein the execution unit executes a process of deriving designated pixel real space coordinates which are coordinates of a position on the real space corresponding to a position of a designated pixel which is designated as a pixel corresponding to a position on the real space in each of the first and second captured images, on the basis of the imaging position distance.

4. The information processing device according to claim 3,
wherein the designated pixel real space coordinates are specified on the basis of the imaging position distance, designated pixel coordinates for specifying a pixel which is specifiable as the designated pixel at positions corresponding to each other in the respective first and second captured images, the focal length, and the dimensions.

5. The information processing device according to claim 1,
wherein the derivation process is a process of deriving a direction of a plane specified by a plane equation indicating the plane including coordinates on the real space which correspond to the plurality of pixel coordinates on the basis of the plurality of pixel coordinates, the focal length, and the dimensions, deciding the plane equation on the basis of the derived direction and the irradiation position real space coordinates, and deriving the imaging position distance on the basis of the decided plane equation, the plurality of pixel coordinates, the focal length, and the dimensions.

6. An information processing device comprising:
an acquisition unit that acquires a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light;
a derivation unit that derives irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the distance acquired by the acquisition unit; and
an execution unit that executes a derivation process of deriving an imaging position distance on the basis of the irradiation position real space coordinates, the irradiation position pixel coordinates, a focal length of an imaging lens used in the imaging of the subject, and dimensions of imaging pixels included in an imaging pixel group for imaging the subject, in a case of a position specifiable state where the position of the pixel specified by the irradiation position pixel coordinates is a position of a pixel which is specifiable at positions corresponding to each other in the respective first and second captured images.

7. The information processing device according to claim 6,
wherein the execution unit executes a derivation process using a plurality of pixels, the derivation process being a process of deriving the imaging position distance on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the respective first and second captured images, the irradiation position real space coordinates, the focal length, and the dimensions, in a case of a position unspecifiable state where the position of the pixel specified by the irradiation position pixel coordinates is a position of a pixel different from a pixel which is specifiable at positions corresponding to each other in the respective first and second captured images, and
wherein the derivation process is a process of deriving the imaging position distance on the basis of a plurality of parameters smaller than the number of parameters used for the derivation of the imaging position distance by the derivation process using a plurality of pixels.

8. The information processing device according to claim 6,
wherein the execution unit further executes a position specifiable state notification process of giving notice of being the position specifiable state in a case of the position specifiable state.

9. The information processing device according to claim 1, further comprising:
a measurement unit that measures the distance by emitting the directional light and receiving the reflected light,
wherein the acquisition unit acquires the distance measured by the measurement unit.

10. The information processing device according to claim 1, further comprising:
an imaging unit that images the subject,
wherein the acquisition unit acquires the first captured image obtained by imaging the subject by the imaging unit from the first imaging position, and the second captured image obtained by imaging the subject by the imaging unit from the second imaging position.

11. The information processing device according to claim 1, further comprising:
a control unit that performs control for displaying derivation results obtained by the execution unit on a display unit.

12. An information processing method comprising:
acquiring a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light;

deriving irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the acquired distance; and executing a derivation process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the respective first and second captured images, the irradiation position real space coordinates, a focal length of an imaging lens used in the imaging of the subject, and dimensions of imaging pixels included in an imaging pixel group for imaging the subject, in a case of a position unspecifiable state where the position of the pixel specified by the irradiation position pixel coordinates is a position of a pixel different from a pixel which is specifiable at positions corresponding to each other in the respective first and second captured images.

13. An information processing method comprising:

acquiring a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light, deriving irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the acquired distance; and executing a derivation process of deriving an imaging position distance on the basis of the irradiation position real space coordinates, the irradiation position pixel coordinates, a focal length of an imaging lens used in the imaging of the subject, and dimensions of imaging pixels included in an imaging pixel group for imaging the subject, in a case of a position specifiable state where the position of the pixel specified by the irradiation position pixel coordinates is a position of a pixel which is specifiable at positions corresponding to each other in the respective first and second captured images.

14. A non-transitory computer-readable storage medium storing a program for causing a computer to execute a process comprising:

acquiring a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light;

deriving irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the acquired distance; and executing a derivation process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the respective first and second captured images, the irradiation position real space coordinates, a focal length of an imaging lens used in the imaging of the subject, and dimensions of imaging pixels included in an imaging pixel group for imaging the subject, in a case of a position unspecifiable state where the position of the pixel specified by the irradiation position pixel coordinates is a position of a pixel different from a pixel which is specifiable at positions corresponding to each other in the respective first and second captured images.

15. A non-transitory computer-readable storage medium storing a program for causing a computer to execute a process comprising:

acquiring a first captured image obtained by imaging a subject from a first imaging position, a second captured image obtained by imaging the subject from a second imaging position different from the first imaging position, and a distance from a position corresponding to the first imaging position to the subject, the distance being measured by emitting directional light, which has directivity, to the subject and receiving reflected light of the directional light, deriving irradiation position real space coordinates for specifying an irradiation position of the directional light on a real space with respect to the subject and irradiation position pixel coordinates for specifying a position of a pixel corresponding to the irradiation position specified by the irradiation position real space coordinates in each of the first and second captured images, on the basis of the acquired distance; and executing a derivation process of deriving an imaging position distance on the basis of the irradiation position real space coordinates, the irradiation position pixel coordinates, a focal length of an imaging lens used in the imaging of the subject, and dimensions of imaging pixels included in an imaging pixel group for imaging the subject, in a case of a position specifiable state where the position of the pixel specified by the irradiation position pixel coordinates is a position of a pixel which is specifiable at positions corresponding to each other in the respective first and second captured images.

* * * * *